March 24, 1953  H. N. STEPHAN  2,632,365
HORIZONTAL BORING MACHINE
Filed July 30, 1947  12 Sheets-Sheet 2

INVENTOR.
HALLIS N. STEPHAN
BY
Kwis, Hudson, Boughton & Williams
ATTORNEYS

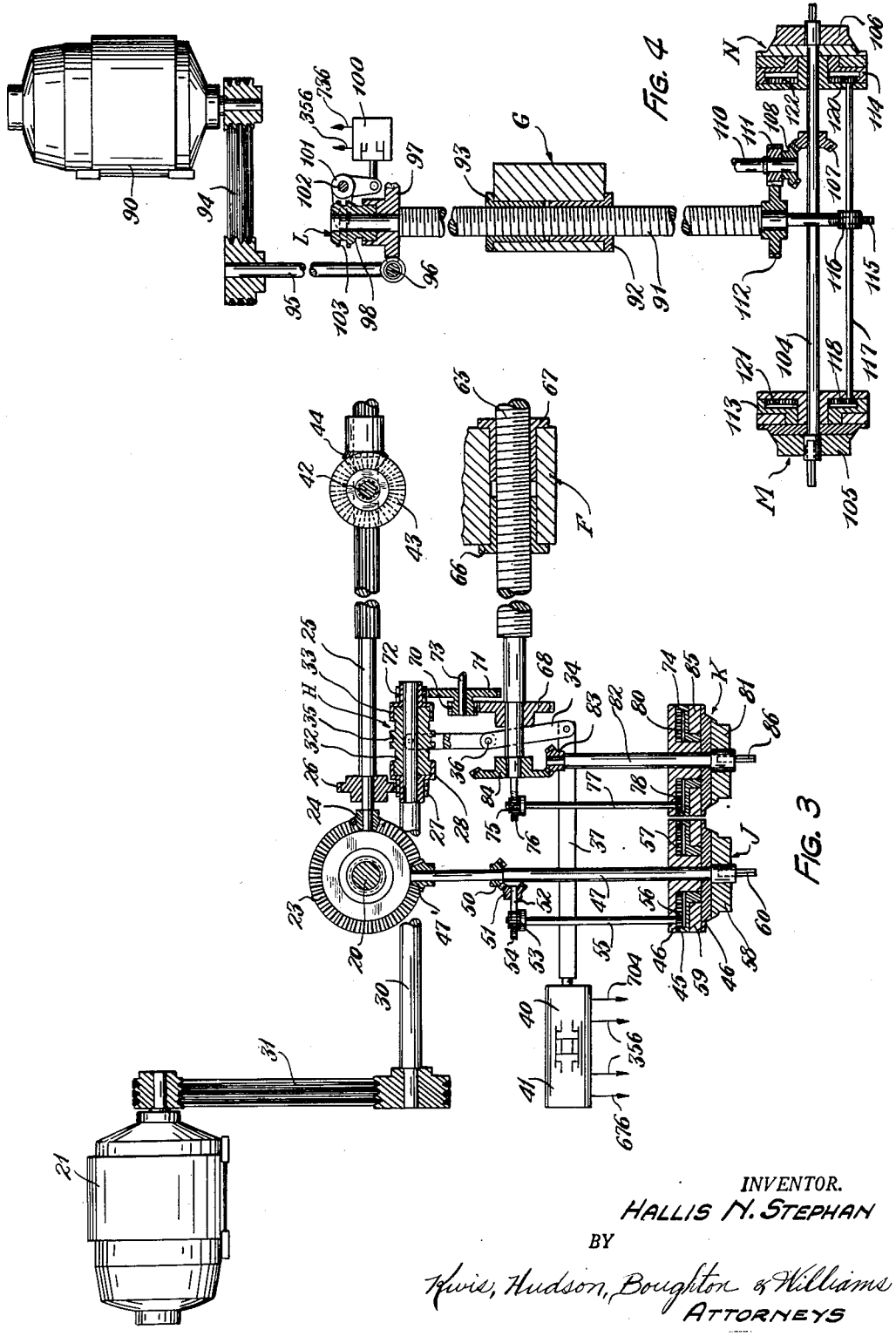

March 24, 1953 H. N. STEPHAN 2,632,365
HORIZONTAL BORING MACHINE
Filed July 30, 1947 12 Sheets-Sheet 4
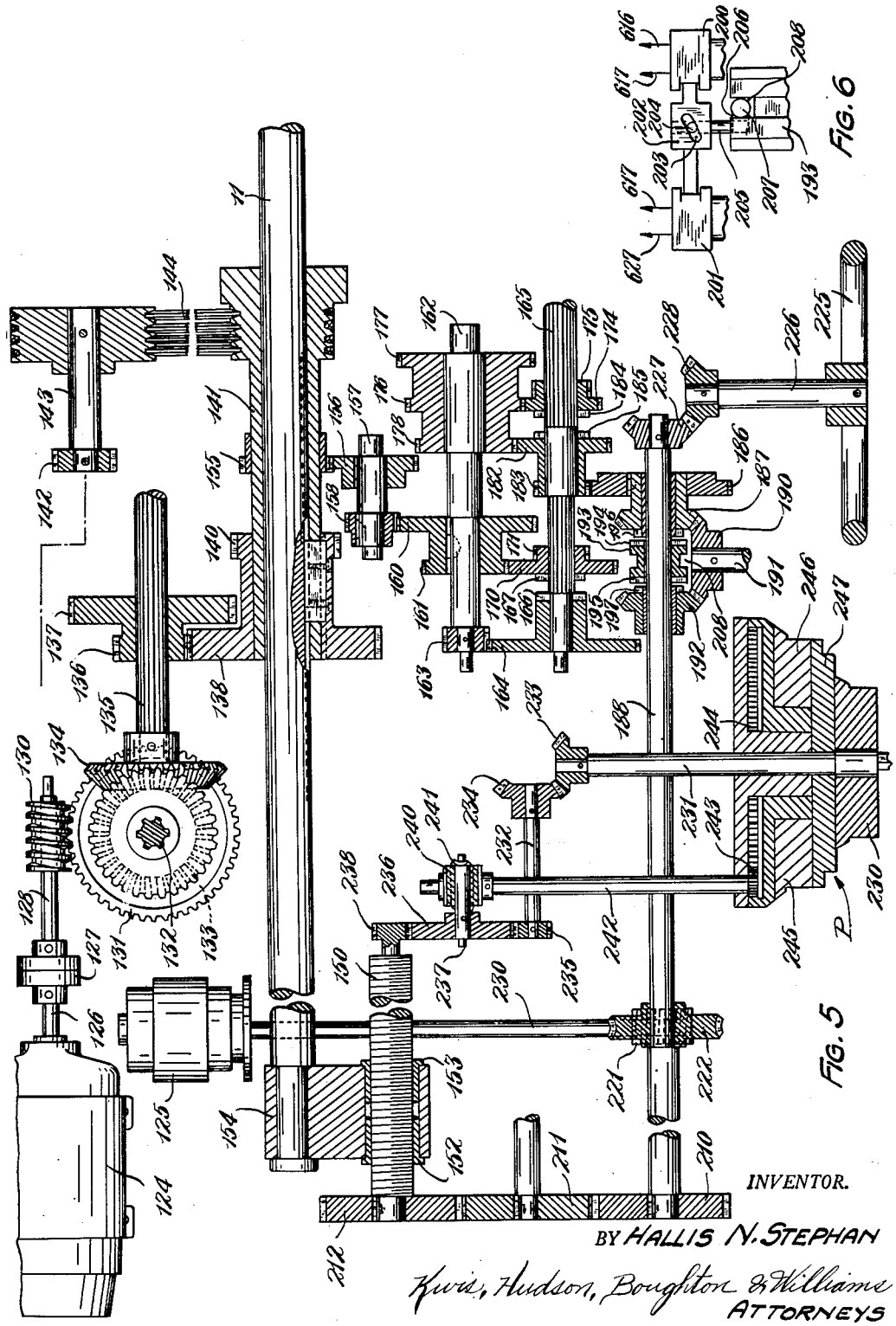
INVENTOR.
BY HALLIS N. STEPHAN
Kwis, Hudson, Boughton & Williams
ATTORNEYS

INVENTOR.
HALLIS N. STEPHAN

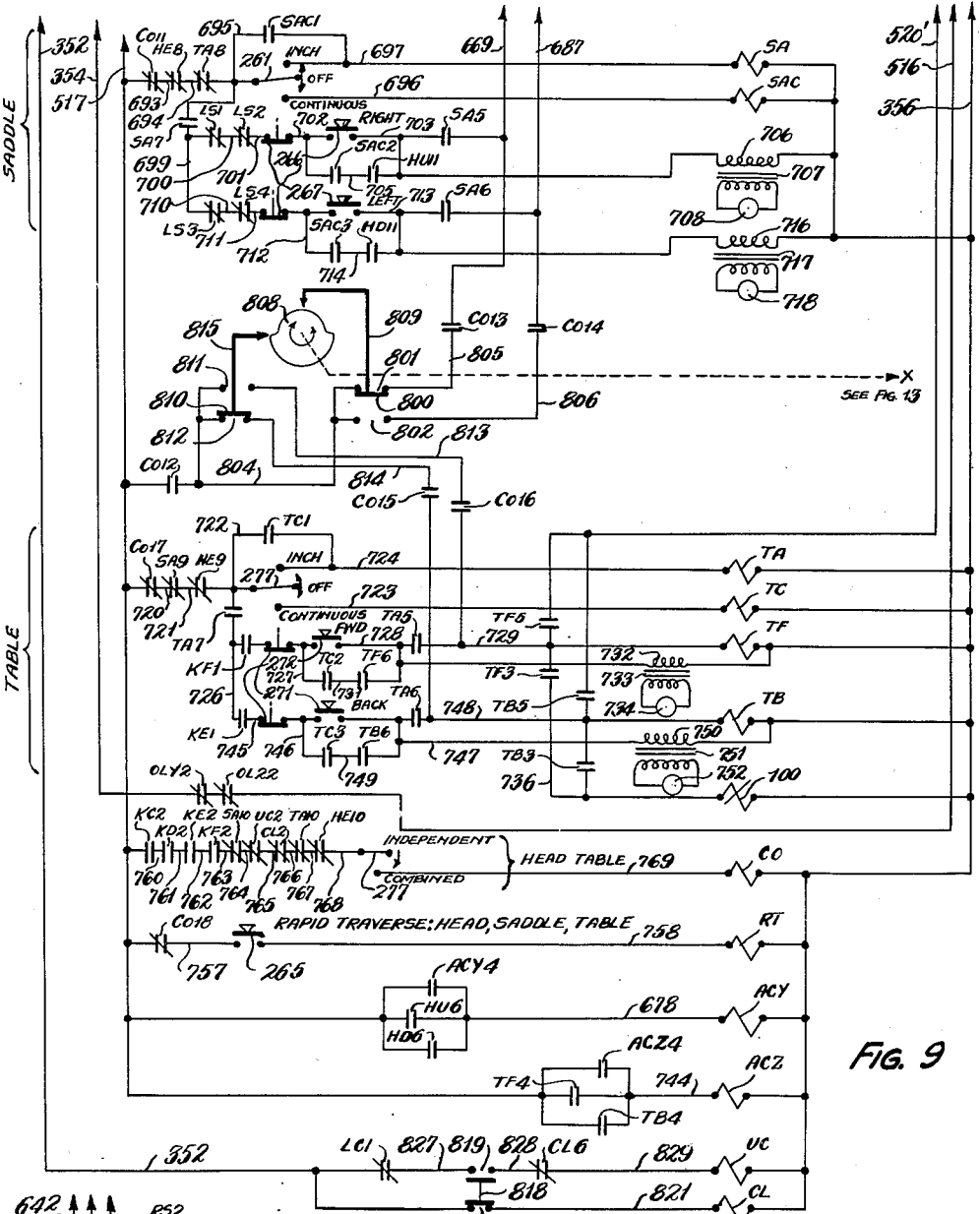
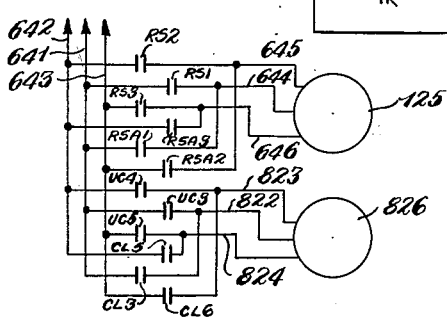
Fig. 9
Fig. 9A

INVENTOR.
HALLIS N. STEPHAN

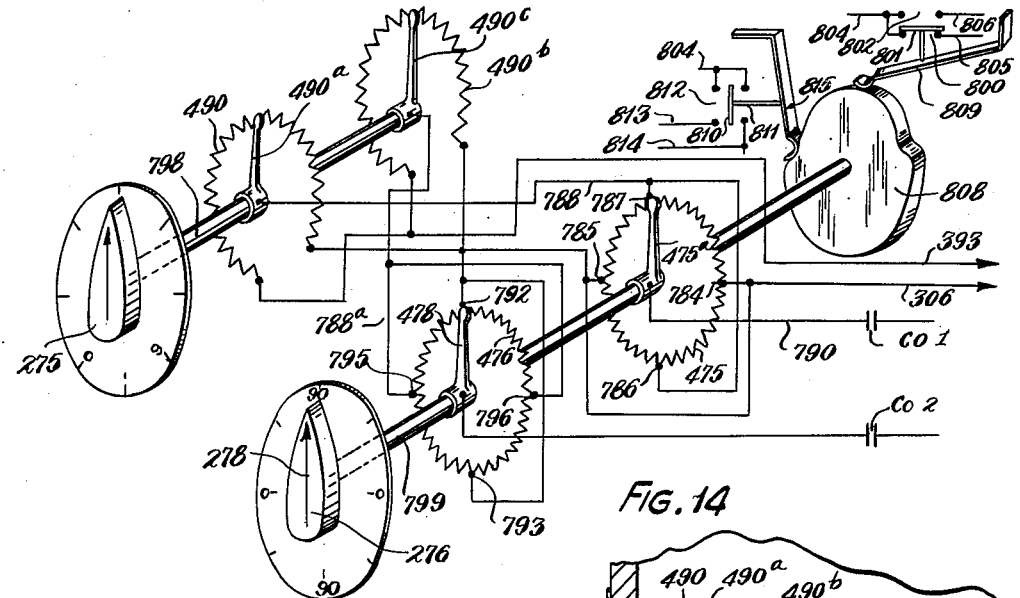
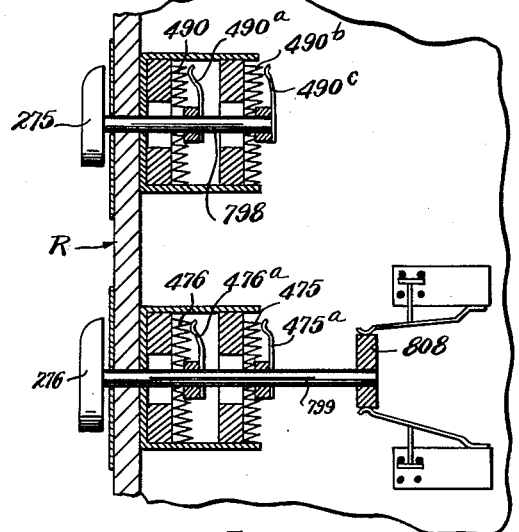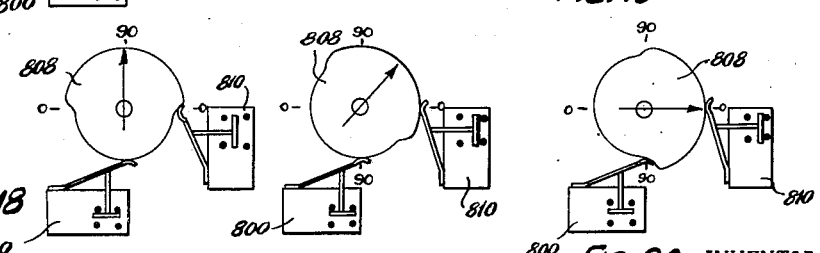

Patented Mar. 24, 1953

2,632,365

UNITED STATES PATENT OFFICE 2,632,365

HORIZONTAL BORING MACHINE

Hallis N. Stephan, Cleveland Heights, Ohio, assignor, by mesne assignments, to The New Britain Machine Company, New Britain, Conn., a corporation of Connecticut Application July 30, 1947, Serial No. 764,819

25 Claims. (Cl. 90—15)

The present invention relates to machine tools and to electric motor control systems for variable speed power devices, preferably electric motors, and more particularly to a system for controlling and coordinating the operations of a plurality of variable speed power actuators or transmissions, preferably variable speed electric motors, and, in turn, the movements of a plurality of relatively movable parts of a machine actuated thereby.

One of the objects of the invention is the provision of a novel and improved control system comprising means for simultaneously varying the speeds of a plurality of variable speed power actuators or transmissions, preferably variable speed electric motors, in a predetermined relationship, and preferably in such relationship that if represented vectorially the vectorial sum of the speeds of a plurality of the devices remains constant.

Another object of the invention is the provision of a novel and improved machine comprising a plurality of relatively movable members having individual variable speed power actuators or transmissions, preferably electric motors, for actuating the same, in combination with means for simultaneously varying the speeds of a plurality of the power means or motors whereby a plurality of the members are moved in predetermined relationship, and preferably in such relationship that the vectorial sum of the speeds at which the members are moved remains constant.

Another object of the invention is the provision of a novel and improved machine comprising a plurality of relatively movable members or elements having individual variable speed power actuators or transmissions, preferably variable speed electric motors, for actuating the same, in combination with means for simultaneously varying the speeds of a plurality of the power devices whereby the members actuated thereby may be moved at different speeds in predetermined relationships but at the same relative speed with reference to each other.

Another object of the invention is the provision of a novel and improved machine comprising a plurality of members movable in opposite directions along separate paths each at right angles to the other and individual variable speed power actuators or transmissions, preferably electric motors, for actuating the same, in combination with means for simultaneously varying the speeds of a plurality of the power devices in predetermined relationship whereby a plurality of the members may be moved in predetermined relationship but at the same relative speed with respect to each other.

Another object of the invention is the provision of a novel and improved machine tool having a plurality of machine tool elements movable in opposite directions along separate paths each at right angles to the other and individual variable speed power actuators or transmissions, preferably variable speed electric motors for actuating the same, in combination with means for simultaneously varying the speeds of a plurality of the power devices in predetermined relationship whereby a plurality of the members may be moved in predetermined relationship but at a variable predetermined speed relative to each other.

Still another object of the invention is the provision of a new and improved electric motor control system having a plurality of individual speed controls for each electric motor in combination with means for shifting from one control to the other and effecting a temporary variation in speed of any motor without disturbing the adjustment of any of the other speed controls.

Another object of the invention is the provision of a new and improved horizontal boring mill having a spindle and a spindle drive motor in combination with electronic means for controlling the amount of electrical energy supplied to the motor which automatically maintains the energy at such a level that the speed of the motor will remain substantially constant at a preset level through a wide range of work loads.

Another object of the invention is the provision of a novel and improved control system for a variable speed power actuator or transmission, preferably a variable speed motor, having a manually adjustable and rotatable speed control device which effects a substantially sinusoidal variation in the speed of the power device as the control device is rotated through an arc of 360° or any portion thereof.

Another object of the invention is the provision of a new and improved horizontal boring mill including a plurality of movable members and an electric motor in combination with controls including a clutch engageable upon operation of a particular control for selecting a particular member for movement, the clutch mechanically connecting the motor to that member.

A more specific object of the invention is the provision of a novel and improved machine comprising a plurality of relatively movable members having individual variable speed power devices, preferably electric motors, for actuating the same, in combination with manually rotatable directional control means for simultaneously controlling the direction of movement of the power devices or motors and varying the speeds thereof in such a manner that the speed and direction of movement of each power device or motor will be substantially a cosine function of the angular position of the control means from a maximum speed position for that power device or motor whereby the resultant movement of the movable members will be in a line substantially corresponding to the position of the rotatable means.

Another object of the invention is the provision of a novel and improved horizontal boring, milling, and drilling machine having a plurality of machine tool elements, such as a spindle, spindle head, table, and the like, movable in opposite directions along separate paths at right angles to each other and individual variable speed power devices, preferably electric motors, for simultaneously actuating a plurality of the elements, in combination with means for effecting a desired relative speed and direction of movement or rotation of said power devices or motors such that the resultant angle of movement of the elements and the resultant speed of movement may be conveniently selected and controlled.

The invention resides in certain constructions and combinations and arrangements of parts and further objects and advantages thereof will be apparent to those skilled in the art to which it relates from the following description of the preferred embodiment described with reference to the accompanying drawings forming a part of this specification in which similar reference characters designate corresponding parts, and in which:

Fig. 3 is a diagrammatic view of the spindle head and backrest block, and saddle feeding and rapid traversing mechanisms;

Fig. 4 is a diagrammatic view of the table feeding and rapid traversing mechanisms;

Fig. 5 is a diagrammatic view of the spindle driving, feeding, and rapid traversing mechanisms of the machine shown in Fig. 1;

Fig. 6 is a fragmentary diagrammatic view of a part of the spindle feeding mechanism;

Figs. 8 to 13 are wiring diagrams of the electric circuits, the various sheets being so arranged that if Fig. 9 is placed below Fig. 8 and Figs. 10 to 13 are placed consecutively to the right from Fig. 8, then the circuits shown will be complete and continuous;

Fig. 14 is an exploded schematic view of the combined rate and angular direction controls and their associated elements;

Fig. 15 is a partial sectional view on the line 15—15 of Fig. 7; and

Figs. 16 to 20 are schematic views of the angular direction controls in a plurality of positions.

Figure 1:
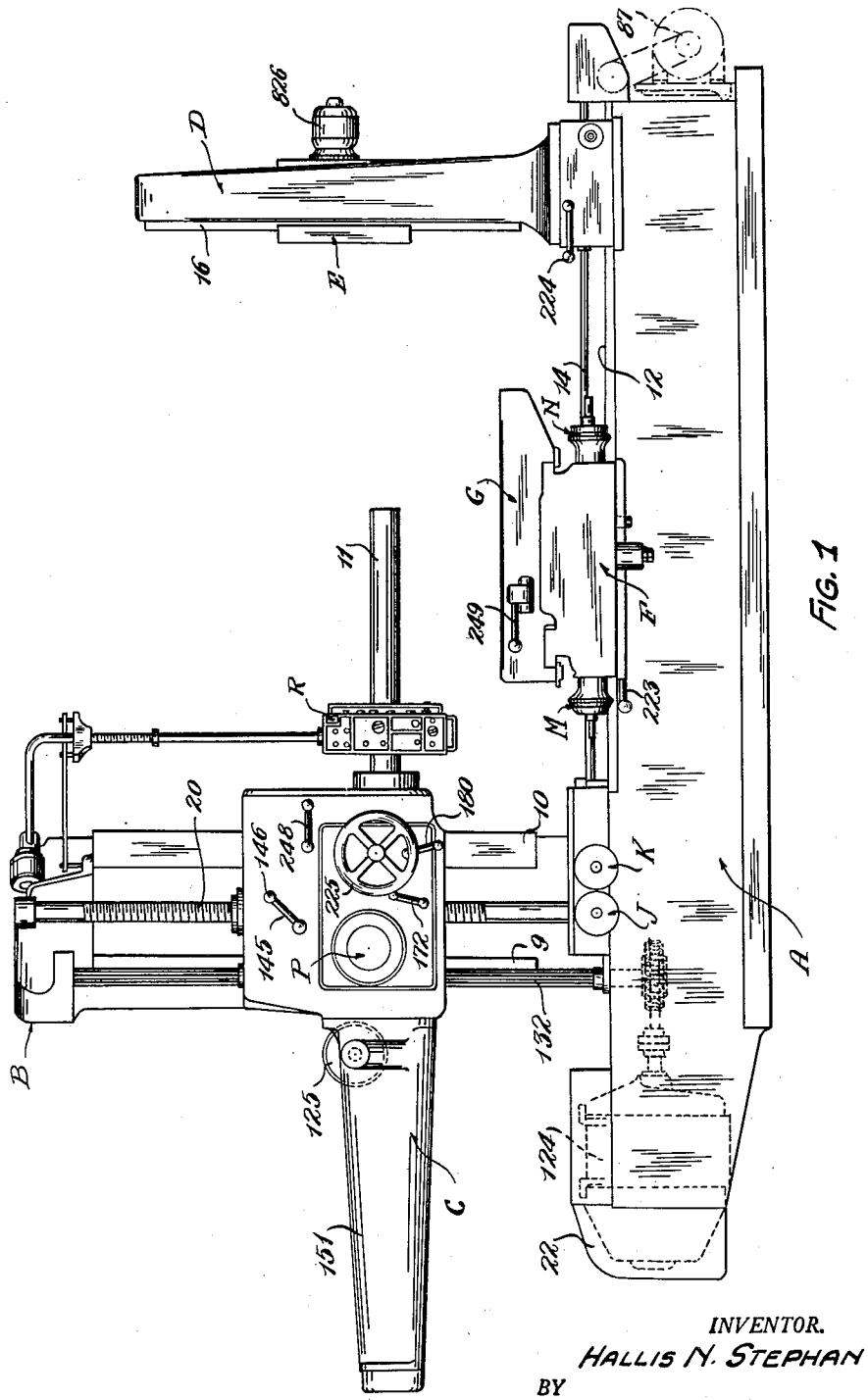
Fig. 1 is a front elevational view of a horizontal boring, milling, and drilling machine embodying the present invention.
Figure 2:
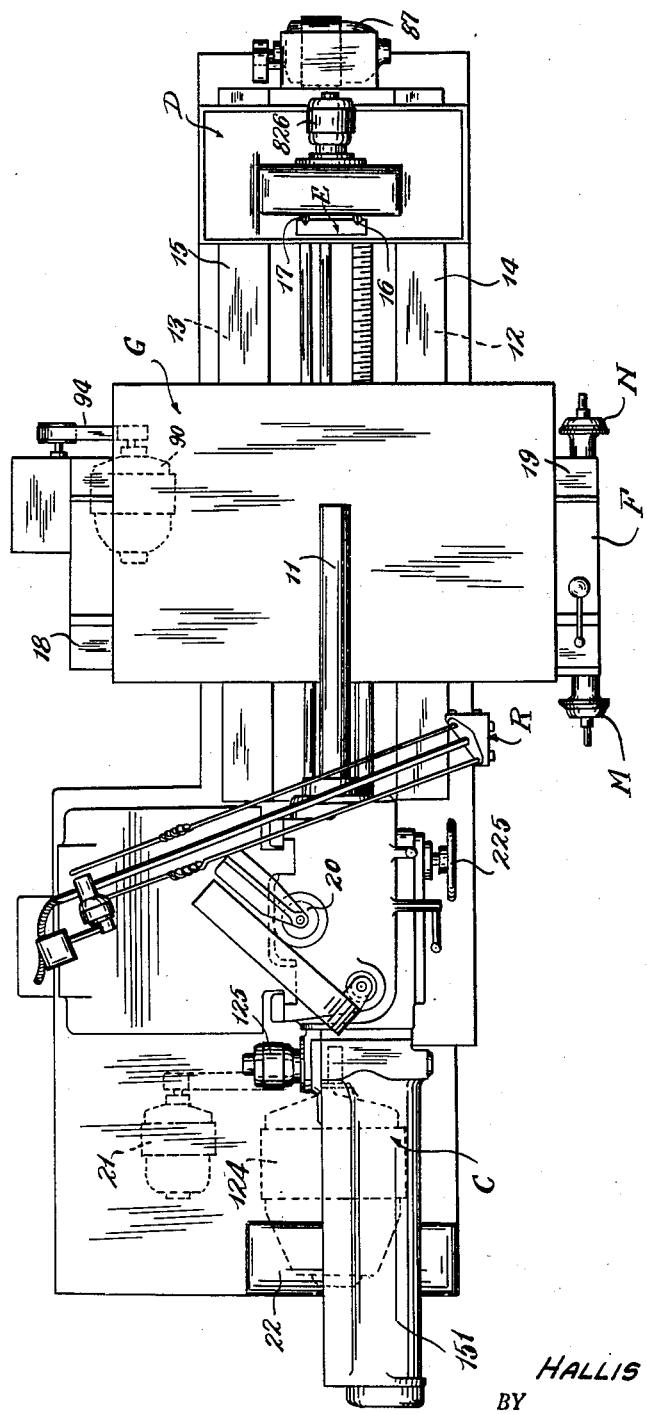
Fig. 2 is a plan view of the machine shown in Fig. 1.

While the invention is susceptible of various modifications and alternative constructions, it is particularly adaptable to machine tools and is herein shown and described as embodied in a horizontal boring, milling, and drilling machine of the general type shown in U. S. Patent No. 2,350,174, issued May 30, 1944.

Referring to the drawings, the machine shown therein comprises a rectangularly shaped base A provided at one end with a vertical spindle head column B having ways 9, 10 on its front face upon which a spindle head C provided with a tool spindle 11 is mounted for vertical movement and at the other end with a vertical backrest or outboard support column D slidably supported for movement towards and from the spindle head column B on the horizontal ways 12, 13 on the upper side of the bed A and underneath guards 14, 15 therefor. The backrest column D is provided with vertical ways 16, 17 upon which a backrest block E is mounted for vertical movement. In addition to the outboard support column D, the bed ways 12, 13 support a saddle F having on its upper side transversely extending horizontal ways 18, 19 which, in turn, support a work table G.

The spindle head C, which is counterbalanced, is moved vertically along the spindle head column ways 9, 10 by a lead screw 20 rotatably supported in the frame of the machine and secured therein against longitudinal movement, which lead screw has threaded engagement with a nut located within and carried by the spindle head C. The lead screw 20 is adapted to be rotated in opposite directions by a reversible, variable speed, feed motor 21 fixed to the bed A of the machine adjacent to its left-hand end and normally enclosed within a suitable guard 22.

The lower end of the lead screw 20 is provided with a bevel gear 23, see Fig. 3, continuously in mesh with a bevel pinion 24 fixed to the left-hand end of a horizontal shaft 25 extending lengthwise of the bed A and rotatably supported therein. The shaft 25 has a gear 26 keyed thereto, which gear is in mesh with a gear 27 formed integral with the driven element 28 of a friction clutch H. The clutch element 28 is rotatably supported upon a longitudinally extending shaft 30 also rotatably supported in the frame A, which shaft is connected to the motor 21 by a flexible drive connection 31. The driven clutch element 28 is adapted to be selectively connected to the shaft 30 to operatively connect the lead screw 20 to the motor 21 by a slidable clutch element 32 splined upon the shaft 30 intermediate the clutch element 28, previously referred to, and a driven clutch element 33, the purpose of which will be hereinafter referred to.

The movable clutch element 32 normally occupies a neutral position intermediate the clutch elements 28, 33, to which neutral position it is spring biased, and is selectively shifted in opposite directions to operatively connect the driven elements 28, 33 therewith by a lever 34, the upper or rear end of which is in the form of a yoke having inwardly extending pins which engage within a groove 35 in the slidable clutch element 32. The lever 34 is pivoted intermediate its ends in the frame A by a pivot pin 36 and the lower or front end of the lever is pivotally connected to a rod 37 slidably supported in the frame A. The left-hand end of the rod 37 is connected to the armature assembly of a double solenoid mechanism comprising solenoids 40, 41 selectively energized in a manner hereinafter referred to. Energization of the solenoid 40 shifts the rod 37 toward the right, as viewed in Fig. 3, and operatively connects the clutch element 28 with the shaft 30. Energization of the solenoid 41 shifts the rod 37 in the opposite direction to operatively connect the clutch element 33 with the shaft 30.

The backrest or outboard support E is adapted to be moved vertically along the backrest column ways 16, 17 simultaneously with the vertical movement of the spindle head C along the spindle head column ways 9, 10 by a vertical lead screw 42 located within the backrest column D and rotatably supporting thereby against longitudinal movement, which lead screw has threaded engagement with a nut located within the backrest block E. The lead screw 42 is operatively connected to the drive or mechanism for rotating the spindle head lead screw 20 by a bevel gear 43 keyed to the lower end of the lead screw 42 and in mesh with a bevel pinion 44 splined to the right-hand end of the shaft 25. From the foregoing it will be understood that the spindle head C and the backrest block E will be simultaneously moved vertically along their respective columns upon energization of the motor 21 and the solenoid 40. The direction in which the movement takes place and the speed thereof will depend upon the direction and speed of rotation of the motor 21.

The position of the spindle head C with respect to a reference point on the spindle head column B is always indicated on a full travel dial 45 of a dial indicator assembly J, which dial is rotatably supported upon a hub or boss on a stationary member coaxial with and adjacent to the front end of a transversely extending shaft 47 rotatably supported in the bed A, the rear end of which shaft is provided with a bevel pinion 47' continuously in mesh with the bevel gear 23. The full travel dial 45 has graduations on its circumference which cooperate with a reference line on the stationary member 46 and is operatively connected to the shaft 47 through miter gears 50, 51 fixed to the shaft 47 and to a short shaft 52 rotatably supported in the bed A. The shaft 52 is provided with a worm 53 continuously in mesh with a worm wheel 54 fixed to the rear end of a transversely extending shaft 55 rotatably supported in the base A, the forward end of which shaft is provided with a pinion 56 in mesh with an internal gear 57 on the dial 45. The forward end of the shaft 47 has a micrometer dial 58 adjustably fixed thereto which cooperates with a reference line on the member 46' fixed to the stationary member 46. The reference character 59 designates an adjustable dial supported on the hub of the dial 45 coaxially with the shaft 47. The forward end of the shaft 47 is provided with a square extension 60 adapted to receive a detachable hand crank for manually moving the spindle head and backrest block.

The saddle F is adapted to be moved longitudinally of the tool spindle 11 along the bed ways 12, 13 by a longitudinally extending lead screw 65 rotatably supported in the bed A and held therein against longitudinal movement. The lead screw has threaded engagement with a two-part nut 66, 67 located within the saddle and so arranged as to eliminate all backlash therebetween and the lead screw. The left-hand end of the lead screw 65, as viewed in Fig. 3, is provided with a gear 68 in mesh with a pinion 70 of a gear cluster including a gear 71 in mesh with a gear 72 formed integral with the driven clutch element 33, previously referred to. The gear cluster comprising the gears 70, 71 is rotatably supported on a shaft 73 fixed in the base A. The construction is such that upon energization of the solenoid 41, the lead screw 65 is operatively connected to the shaft 30 and, in turn, to the motor 21.

The left-hand end of the lead screw 65 is operatively connected to a dial indicator assembly K similar to the dial indicator assembly J. The full travel dial 74 of the dial assembly K is connected to the lead screw 65 by a worm 75 connected to the left-hand reduced end of the lead screw 65, which worm is continuously in mesh with a worm wheel 76 secured to the rear end of a transversely extending shaft 77 rotatably supported in the bed A, the front end of which shaft is provided with a pinion 78 in mesh with the internal gear 80 of the dial 74. The micrometer dial 81 is fixed to the outer end of a transversely extending shaft 82, the inner end of which is provided with a bevel pinion 83 in mesh with a bevel gear 84 fixed to the lead screw 65. The adjustable dial of the dial indicator assembly K is designated by the reference character 85 and the connection for the hand crank by the reference character 86. As an alternative construction, the gears 68, 70, 71, and 72, clutch element 33, and solenoid 41 may be omitted and the lead screw 65 driven by a separate reversible variable speed motor, such as the motor 87 connected to the right-hand end of the bed A and operatively connected to the right-hand end of the lead screw 65 in a manner similar to that in which the table feed motor 90 presently to be referred to is connected to the table lead screw 91.

The table G is adapted to be reciprocated transversely of the tool spindle 11 along the ways 18, 19 by a lead screw 91 rotatably supported in the saddle F and held therein against longitudinal movement, which lead screw has threaded engagement with a two-part nut 92, 93 similar to the nut 66, 67. The nut 92, 93 is located within and carried by the table G. The reversible, variable speed, table feed electric motor 90 is affixed to the underside of the rear end of the saddle and is connected by a flexible drive 94 to a longitudinally extending shaft 95 provided with a worm gear 96 in mesh with a worm wheel 97 rotatably supported on the rear end of the lead screw 91. The worm wheel 97 is automatically connected to the lead screw 91 upon energization of the motor 90 by a solenoid operated friction clutch L, the driving element of which is formed integral with the worm wheel 97. The driven element 98 of the clutch is splined to the rear end of the lead screw 91 and is adapted to be moved into operative engagement with the driving element by a solenoid 100 connected to the lower or forward arm of the bell crank lever 101 supported in the saddle F by a pin 102. The other arm of the bell crank lever is provided with a pin which continuously engages within a groove 103 in the driven element 98 of the clutch L. The clutch is normally disengaged so that the worm and worm wheel drive intermediate the motor 96 and the screw 91 will not interfere with the manual movement of the table.

The saddle F is provided with two dial indicator mechanisms M, N similar to the dial mechanisms J, K previously referred to for indicating the position of the table relative to a reference point on the saddle or some other part of the machine. The dial indicator mechanisms M, N are located at opposite sides of the saddle and the respective elements thereof are supported coaxially with respect to a longitudinally extending shaft 104 rotatably supported in the saddle and to the ends of which the micrometer dials 105, 106 of the dial indicator mechanisms M, N respectively are connected. The shaft 104 is provided with a bevel gear 107 intermediate its ends, which bevel gear is continuously in mesh with a bevel gear 108 keyed to the forward end of a short shaft 110 rotatably supported in the saddle. The shaft 110 has a gear 111 keyed thereto and continuously in mesh with a gear 112 keyed to the table lead screw 91 adjacent to its forward end. The full travel dials 113, 114 are connected to the lead screw 91 by a worm 115 keyed to the forwardly projecting reduced end of the lead screw and continuously in mesh with a worm wheel 116 fixed to a longitudinally extending shaft 117 intermediate its ends. The shaft 117 is rotatably supported in the saddle and its opposite ends are provided with pinion gears 118, 120 in mesh with the internal gears 121, 122 of the full travel dials 113, 114 respectively. The exposed ends of the shaft 104 are provided with driving connections for the reception of a hand crank when it is desired to manually move the table. The backrest or outboard support column D can be moved along the bed ways 12, 13 in a manner similar to that in which the outboard support column shown in the aforesaid patent is moved along the bed ways of the machine shown therein and will not be described in detail.

The spindle 11 is rotated in opposite directions and moved in opposite directions lengthwise of its axis of rotation at different speeds to effect different feeding movements thereof by a reversible, variable speed, spindle drive or main motor 124 housed within the bed A of the machine underneath the guard 22. The spindle is also adapted to be reciprocated by a reversible electric motor 125 to effect different rapid traverse movements thereof. The armature shaft 126 of the motor 124 is connected by a coupling 127 to a shaft 128 provided with a worm 130 continuously in mesh with a worm wheel 131 fixed to the lower end of a vertical shaft 132 rotatably supported in the base A and the spindle head column B. The upper end of the vertical shaft 132 is splined and provided with a bevel pinion 133 slidable thereon and carried by the spindle head C. The bevel pinion 133 is in mesh with a bevel gear 134 fixed to a shaft 135 rotatably supported in the spindle head. The splined connection between the bevel gear 133 and the shaft 132 permits vertical movement of the spindle head C while maintaining a drive connection between the shafts 132 and 135.

The shaft 135 has a gear cluster comprising the gears 136, 137 splined thereon, which cluster forms a part of the back gears of the machine and has three operative positions for rotating the spindle 11 at three different speeds for any given speed of the motor 124. The first position of the gear cluster 136, 137 is that shown in Fig. 5 with the gear 136 in mesh with a gear 138 of a gear cluster including a gear 140. The gear cluster 138, 140 is keyed to the spindle quill 141 within which the spindle 11 is slidably keyed in a conventional manner. The second or intermediate speed position of the gear cluster 136, 137 is with the gear 137 thereof meshing with the gear 140. The third or high speed position of the gear cluster 136, 137 is with the gear 137 in mesh with a gear 142 fixed to a shaft 143 rotatably connected to the spindle quill 141 by a flexible drive connection, designated generally as 144. The driven pulley of the flexible drive connection 144 is formed integral with the spindle quill. The back gears just described for rotating the spindle are similar to those shown in the aforesaid patent and the gear cluster 136, 137 is adapted to be selectively positioned in either of the three positions mentioned above by a hand lever 145 affixed to the front end of a short shaft 146 journaled in the spindle head, the rear end of which shaft carries a yoke member engageable with the gear cluster.

The spindle 11 is adapted to be fed or rapid traversed in either direction by a lead screw 150 rotatably supported in the spindle head extension 151 and having threaded engagement with a two-piece nut 152, 153 so constructed as to eliminate all backlash between the respective threads of the screw and nut. The nut 152, 153 is carried by a feed slide 154 slidably supported in the spindle head and connected to the left-hand end of the spindle 11. The lead screw 150 is adapted to be rotated from the spindle quill 141 in either direction at different speeds to effect different feeding movements thereof by a gear 155 fixed to the spindle quill and continuously in mesh with a gear 156 keyed to a short shaft 157, which shaft is rotatably supported in the spindle head and is provided with a second gear 158 fixedly secured thereto. The gear 158 is continuously in mesh with a gear 160 of a gear cluster comprising a gear 161, which gear cluster is keyed to a shaft 162 rotatably supported in the spindle head. The left-hand end of the shaft 162 has a pinion 163 keyed thereon and continuously in mesh with a gear 164 rotatably supported on a shaft 165 also rotatably supported in the spindle head C.

The right-hand side of the gear 164 is provided with clutch teeth 166 adapted to be selectively engaged with clutch teeth 167 to operatively connect the gear 164 to a gear cluster comprising the gears 170, 171 splined to an intermediate section of the shaft 165. The cluster 170, 171 has three operative positions into either of which it can be selectively positioned by a hand lever 172 fixed to the front end of a transversely extending shaft (not shown) journaled in the spindle head, the rear end of which shaft is provided with a yoke member engageable with the gear cluster. A suitable spring pressed detent is provided for keeping the lever 172 in one or the other of its three operative positions. The three positions rotate the shaft 165 at three different speeds for any given speed of rotation of the shaft 162. The first position, which is the slow speed position, is the one previously referred to with the clutch teeth 166, 167 engaged. The second or intermediate speed position is the position shown in the drawings with the gear 170 in mesh with the gear 161 of the gear cluster 160, 161. The third or high speed position is with the gear 171 in mesh with the gear 160.

The right-hand end of the shaft 165 is provided with a gear cluster comprising the gears 174, 175 slidably splined to a splined section thereof, which gears are adapted to be selectively engaged with gears 176, 177 of a gear cluster rotatably supported on the right-hand end of the shaft 162 and including a gear 178. The gear cluster 174, 175 has three operative positions and is adapted to be shifted from one to the other of its operative positions by a hand lever 180 fixed to the outer end of a transversely extending shaft (not shown) rotatably supported in the spindle head, the rear end of which shaft is provided with a yoke member engageable with the gear cluster. Suitable spring pressed detent means retain the hand lever 180 in one or the other of its operative positions. The gear 178 is continuously in mesh with a gear 182 of a gear cluster, including the gear 183, which gear cluster is rotatably supported on an intermediate portion of the shaft 165 to the left of the splined section which carries the gear cluster 174, 175. The gear cluster 182, 183 may be driven direct from the gear cluster 174, 175 through the medium of cooperating clutch teeth 184, 185 on the adjacent sides of the gear clusters 174, 175 and 182, 183 respectively. The clutch teeth 184, 185 are adapted to be engaged when the gear cluster 174, 175 is positioned in the right hand one of its three operative positions referred to above.

The gear 183 is continuously in mesh with a gear 186 fixed to the hub of a bevel gear 187 rotatably supported on a longitudinally extending shaft 188 rotatably supported in the spindle head, which bevel gear is continuously in mesh with a bevel gear 190 keyed to a short shaft 191 rotatably supported in the spindle head. The bevel gear 190 is also continuously in mesh with a bevel gear 192 rotatably supported on the shaft 188. The gears 187, 192 are adapted to be selectively connected to the shaft 188 by a double-acting clutch having a driven element 193 slidably keyed upon the shaft 188 and having clutch teeth 194, 195 on opposite faces thereof adapted to be engaged with cooperating clutch teeth 196, 197 on the adjacent faces of the gears 187, 192 respectively.

The slidable clutch element 193 is normally held in a neutral position intermediate the gears 187, 192 but is adapted to be selectively shifted to either of its operative positions by electric solenoids 200, 201 carried by the spindle head, the armatures of which are connected by a member 202 having a cam slot 203 within which a pin or cam follower 204 engages. The cam slot 203 is inclined with respect to the horizontal and a pin 204 is moved vertically upon the member 202 being shifted toward the right upon energization of the solenoid 200 or toward the left upon energization of the solenoid 201. Spring means, not shown, normally maintains the member 202 in the position shown in the drawings with the cam follower 204 midway between the ends of the slot 203. The pin or cam follower 204 is carried by a vertical rod 205, the lower end of which is connected to one arm of a bell crank lever 206, the other arm of which is provided with a pin 207 which engages within the groove 208 of the shiftable clutch element 193.

The construction just described is such that when neither of the solenoids 200, 201 is energized, the parts assume the position shown in the drawings with the drive to the shaft 188 disengaged but upon energization of one or the other of the solenoids in a manner hereinafter referred to, one or the other of the gears 187, 192 is operatively connected to the shaft 188 depending upon which of the solenoids is energized. The left-hand end of the shaft 188 is provided with a gear 210 continuously in mesh with an idler gear 211, which idler gear is in turn in mesh with a gear 212 fixed to the left-hand end of the lead screw 150. Alternatively, the shaft 188 may be connected to the lead screw 150 in a manner similar to that in which the corresponding shaft in United States Patent No. 2,271,171 is connected to the spindle lead screw shown therein.

The spindle 11 may be rapid traversed in either direction by the reversible rapid traverse motor 125, previously referred to, which motor is located at the back of the spindle head and is operatively connected to the shaft 188 by a transversely extending shaft 220, the rear end of which is connected to the armature of the motor and the front end of which is provided with a worm 221 continuously in mesh with a worm wheel 222 keyed to the shaft 188. The worm and worm wheel drive 221, 222 is not of the self-locking type.

When the slidable clutch element 193 is in neutral position, the spindle 11 may be manually moved by a hand wheel 225 fixed to the front end of a transversely extending shaft 226 rotatably supported in the spindle head, the rear end of which shaft is connected to the right-hand end of the shaft 188 by miter gears 227, 228 fixed to the shafts 188, 226, respectively.

The position of the spindle 11 with respect to some reference point on the machine or the spindle head is indicated by a dial indicator mechanism P similar to the dial mechanisms J, K, M and N, previously referred to. The micrometer dial 230 of the dial indicator mechanism P is fixed to the forward end of a transversely extending shaft 231 rotatably supported in the spindle head and connected to a longitudinally extending shaft 232 also rotatably supported in the spindle head by miter gears 233, 234 fixed to the adjacent ends of the shafts 231, 232, respectively. The left-hand end of the shaft 232 is provided with a pinion 235 continuously in mesh with a gear 236 keyed to a shaft 237 rotatably supported in the spindle head and continuously in mesh with a gear 238 fixed to the right-hand end of the lead screw 150. The shaft 237 to which the gear 236 is secured is also provided with a worm 240 continuously in mesh with a worm wheel 241 fixed to the rear end of a transversely extending shaft 242. The front end of the shaft 242 is provided with a gear 243 continuously in mesh with the internal gear 244 of the full travel dial 245 of the dial indicator mechanism P. The adjustable dial is designated as 246 and the stationary members 247, 247'.

The spindle head and backrest block, table, saddle, backrest column clamps, and the operating mechanisms therefor are similar to those shown in either of the aforesaid patents and are not herein shown and described in detail other than to say that the control levers therefor are designated on the drawings by the reference characters 248, 249, 223 and 224, respectively.

After the hand levers 145, 172 and 180 have been set in the desired positions, the remaining operations of the machine are controlled from an electric control station in the form of a pendant R, supported for universal movement in a manner similar to that in which the pendant control station H of the aforementioned Patent No. 2,350,174 is supported. Insofar as possible, the various switches, etc., of the pendant R are arranged so that their position or direction of movement corresponds to the direction of movement of the machine tool element initiated or controlled thereby.

Figure 7:
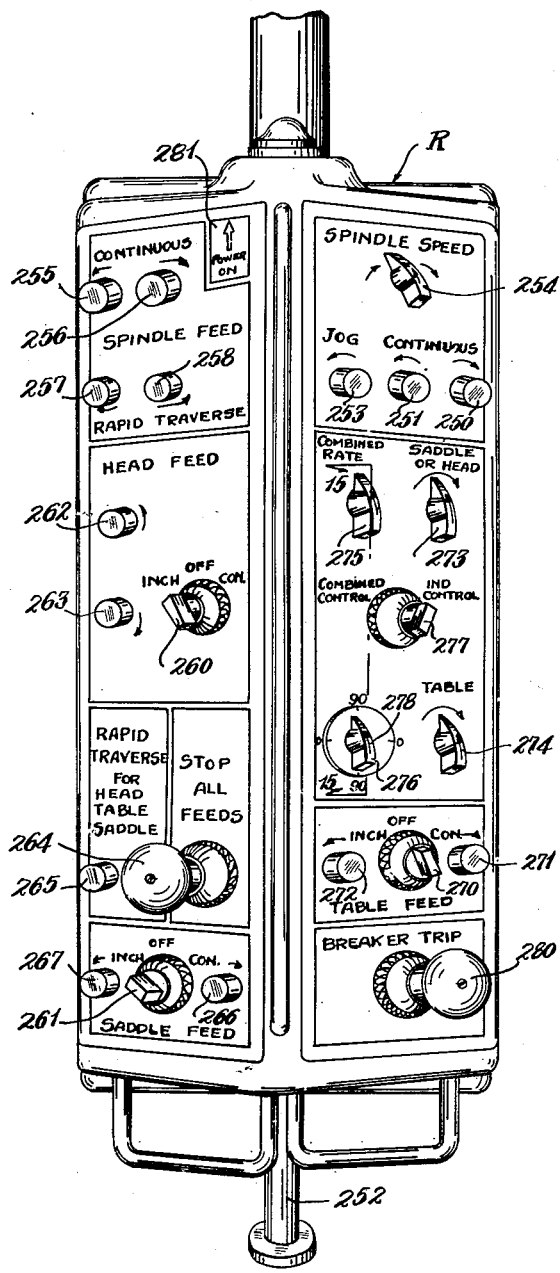
Fig. 7 is an enlarged view of the control pendant for the machine.

The control for the spindle drive motor 124 is similar to that employed in the aforesaid Patent No. 2,350,174 for controlling the spindle drive motor 23 shown therein and will not be herein shown and described in detail. Suffice it to say that the motor can be rotated in opposite directions to effect continuous rotation of the spindle in the direction indicated on the pendant, see Fig. 7, by instantaneous actuation of the spindle rotation push button switches 250, 251 located on the right-hand side face of the pendant. The spindle can be jogged in the direction indicated by actuation of the jog push button switch 253. When rotation of the spindle is initiated by actuation of either of the push button switches 250, 251, rotation thereof can be stopped only by pushing the stop push button switch 252 or the spindle jog push button 253. The speed at which the spindle rotates is determined by the setting of the hand lever 145 on the spindle head and the potentiometer control knob 254 on the pendant.

The feed movement of the spindle is initiated by instantaneous actuation of the illuminated push button switches 255, 256 located on the front face of the pendant R. The right-hand switch 256 initiates feed movement toward the right and the left-hand switch 255 toward the left. The rate of feed relative to the speed of rotation of the spindle is determined by the setting of the hand levers 172, 180 on the spindle head.

The spindle can be rapid traversed in opposite directions by actuation of the push button switches 257, 258 located below the continuous feed push button switches 255, 256. When either of the switches 257, 258 is depressed, the clutch 193 is disengaged and the spindle will be traversed in the direction indicated on the pendant so long as the respective push buttons are held down. Upon release of either of the rapid traverse switch 257 or 258 the clutch 193 returns to its original feed position, if a feed position had previously been selected by operation of the appropriate spindle feed push button switch 255 or 256, and the spindle continues to feed at the rate which has been chosen by the adjustment of the spindle feed potentiometer control knob on the pendant and the setting of the hand levers 172 and 180 on the spindle head. With this construction it is possible to select the proper spindle speed and feed with the cutting tool removed a suitable distance from the work to be machined, rapid traverse the spindle to the cutting position, release the rapid traverse push button switch, and have the spindle continue feeding at the predetermined speed.

In the embodiment shown, the spindle head C and backrest block E which move as a unit and the saddle F are selectively driven from the motor 21 under the control of selecting switches 260, 261 on the front face or panel of the pendant R. Each selection switch has three positions; an "off" position, an "inching" or "jog" position, and a "continuous" position, and are so interlocked that when one switch is in either the "inch" or "continuous" position, the other switch is automatically rendered inoperative. The selecting switches 260, 261 are illuminated, that is, have small electric bulbs therein which indicate which of the switches is effective in the event neither switch is in the "off" position. Alternatively, a single multiple selecting switch could be employed. Assuming that the head has been selected for movement, the feed movement thereof is initiated by instantaneous actuation of one of the illuminated push button switches 262, 263, located on the front face of the pendant, the upper switch 262 initiating movement of the head at a feed rate in an upward direction and the lower switch 263 in a downward direction. In the event the selecting switch 260 is in the "inch" position, the motor 21 operates merely while the push buttons 262 or 263 are held depressed, but in the event the selecting switch 260 is in the "continuous" position when the push button switch 262 or 263 is depressed, the movement of the spindle head is continuous but can be stopped at any time by depressing the "stop all feeds" push button switch 264. While the feed movement is in operation, the spindle head can be rapid traversed in the direction in which the head is feeding by actuation of the "rapid traverse" push button switch 265. Upon release of the "rapid traverse" push button, the spindle head C and backrest lock E will continue to move or feed at the previously chosen speed as indicated by the speed control potentiometer knob 273.

In the event the saddle is selected for movement by proper manipulation of the selecting switches 260, 261, movement of the saddle is under the control of the illuminated push button switches 266, 267, the rapid traverse push button switch 265, and the "stop all feeds" push button switch 264. The illuminated push button switches 266, 267 are located on the front panel of the pendant at opposite sides of the selecting switch 261.

Actuation of the switch 266 located to the right of the selecting switch initiates movement of the saddle toward the right while actuation of the switch 267 located to the left of the selecting switch 261 initiates movement toward the left. The movement is either "inch" or "continuous" depending upon the position of the selecting switch 261.

Movement of the table G, which is effected by the motor 99, is under the control of a selecting switch 270 similar to the selecting switches 260, 261 and preferably normally interlocked therewith in such a manner that only one of the three machine tool elements, spindle head, saddle and table, can be operated at one time. In addition to the selecting switch 270, the table control comprises the illuminated push button switches 271, 272, the "stop all feeds" push button switch 264, and the rapid traverse push button switch 265. The selecting switch 270 and the illuminated push button switches 271, 272 are on the right-hand side or face of the pendant R and the push button switches are located at opposite sides of the selecting switch. The rear push button switch 271 initiates movement of the table G toward the rear of the machine, and actuation of the front push button switch 272 initiates movement of the table toward the front of the machine. Whether the movement initiated by the switches 271, 272 is "inch" or "continuous" depends upon the setting of the selecting switch 270.

In the usual or normal operation of the machine, that is, with only one of the machine tool elements, spindle head, saddle or table operating, the speed of the motors 21 and 90 during the feed operations is controlled by the control knobs 273, 274, respectively, of potentiometers hereinafter referred to. Whether the motor 21 and the motor 90 are under the independent control of the speed control knobs 273, 274 or whether the speed of the motors is subject to the control of the combined rate control knob 275 and the direction control knob 276 depends upon the position of the illuminated selecting switch 277 having two positions indicated as "individual" and "combined." If the selecting switch is turned to "individual," either the motor 21 or the motor 90 may be operated but not both, and the speed of either motor 21 or 90 is under the individual control of the potentiometer control knobs 273, 274, respectively. If the selecting switch 277 is in the "combined" position, both motors operate simultaneously at a predetermined total speed depending upon the setting of the potentiometer control knob 275 and the total speed is proportioned between the motors so as to effect a relative feed in the direction indicated by the arrow 278 of the direction control knob 276, that is, if the arrow 278 points in an upward direction, the motor 21 alone operates effecting a relative movement between the spindle head and table in a vertical direction with the spindle head moving upwardly. If the arrow points in a horizontal direction and toward the right, the motor 90 operates to move the table toward the rear. If the arrow 278 points in the reverse direction, the direction of movement is opposite to that referred to. For any position of the arrow 278 intermediate a vertical position or a horizontal position, both motors 21 and 90 operate at such relative speeds as to effect relative movement between the spindle head and table in the direction indicated by the arrow 278. The controls 273 to 277 are on the right-hand side or face of the pendant R.

In addition to the controls referred to, the pendant R includes a master breaker trip switch 280 which when depressed disconnects all of the electric power to the machine whether the master breaker is "on" or "off." The master breaker is located at the rear of the machine and whether it is open or closed is indicated by a power "on" light 281 located at the top of the pendant, which light is lit when the power is on and all motors ready for operation, that is, when the master breaker is closed, and certain time delay circuits which will be described hereinafter and the field coils of the motors 21, 90, and 124 are properly excited.

The controls on the pendant are all so arranged and interconnected with suitable interlock circuits such that neither the head, table, nor saddle feed can be engaged until the motor 124 driving the spindle is being supplied with electrical energy. The selection of any of the feed or movement selecting switches automatically locks out the operation of all other feed or movement selecting switches as well as the spindle feed, whether or not the feed push buttons on the feed selected have actually been actuated. Similarly, when the spindle feed is actuated, all other feeds are automatically prevented from operating.

Figs. 8 to 13 are wiring diagrams of the electrical hook-up of the motor for driving the spindle, the motors for moving the spindle head or the saddle and the table, the electrical power supply, the pendant control station, and the limit switches.

Figure 8:
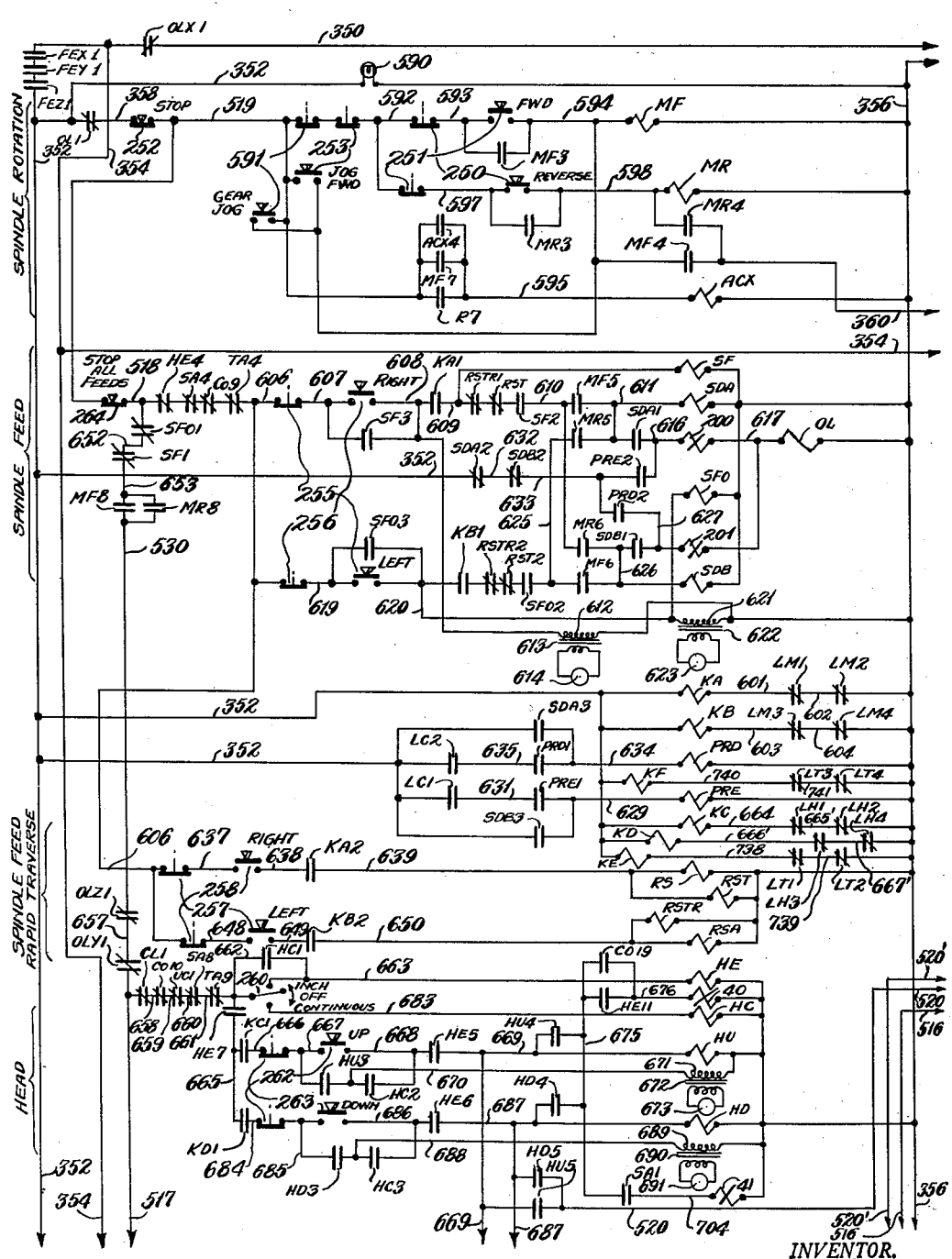
Figure 10:
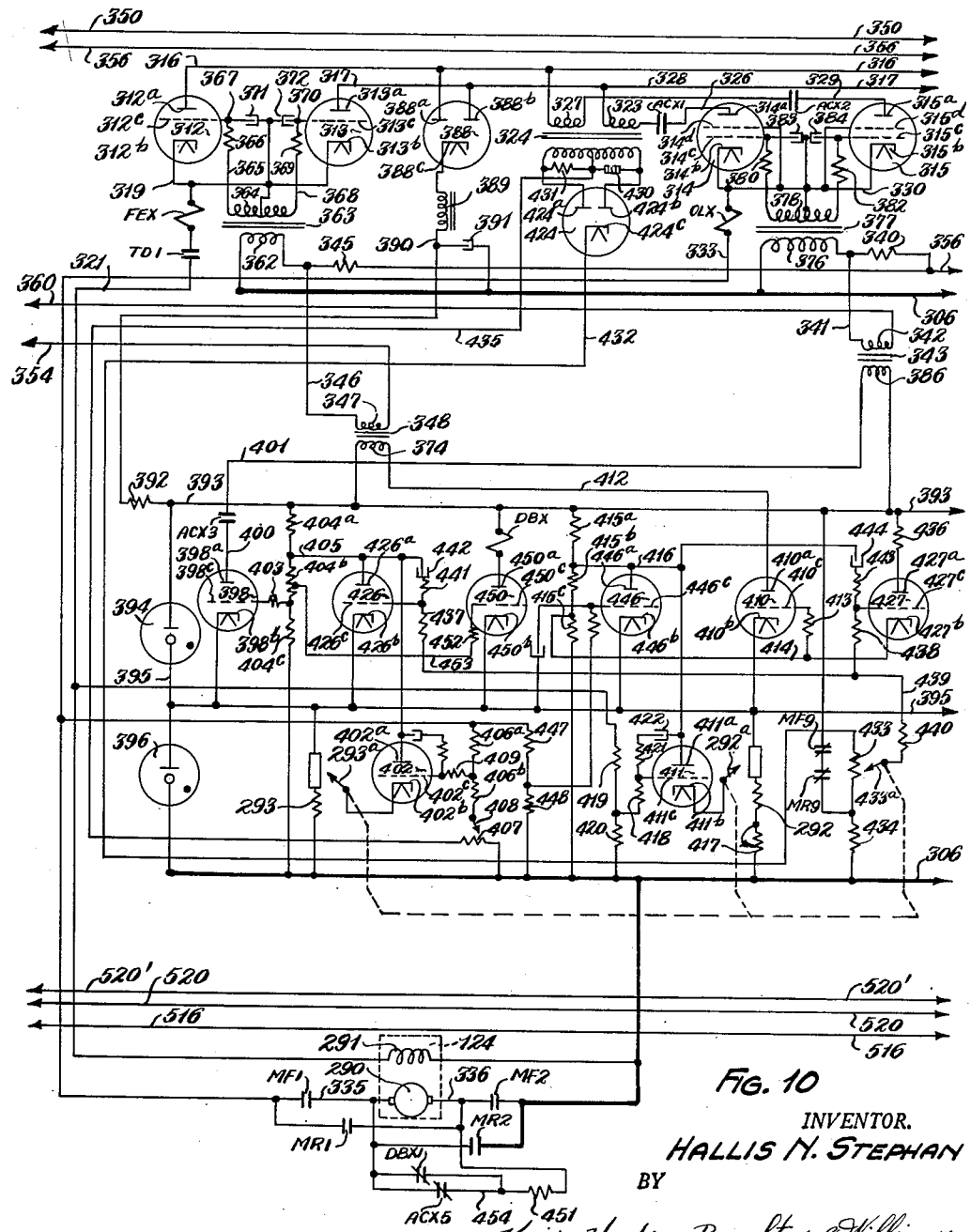
Figure 11:
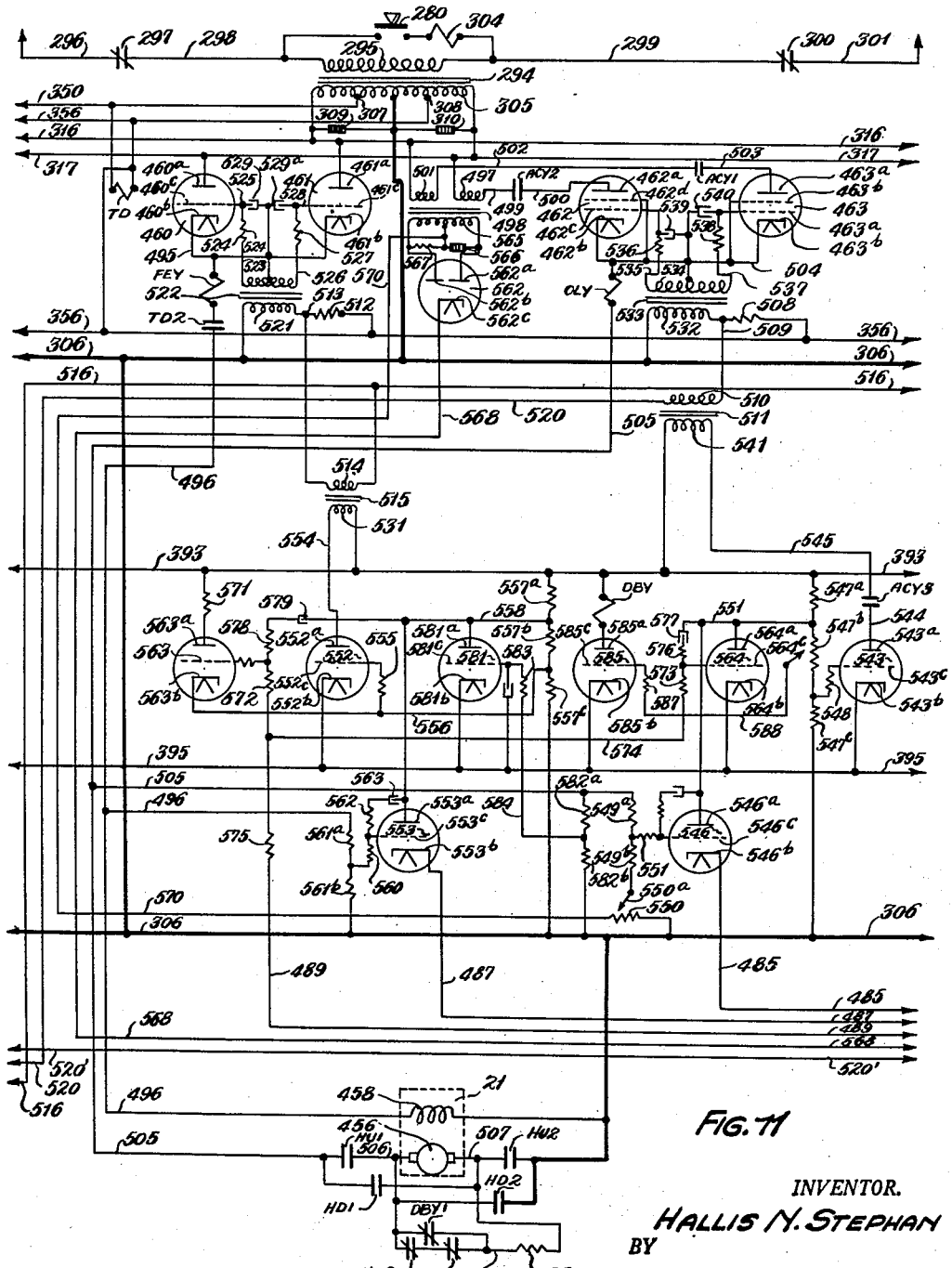
Figure 12:
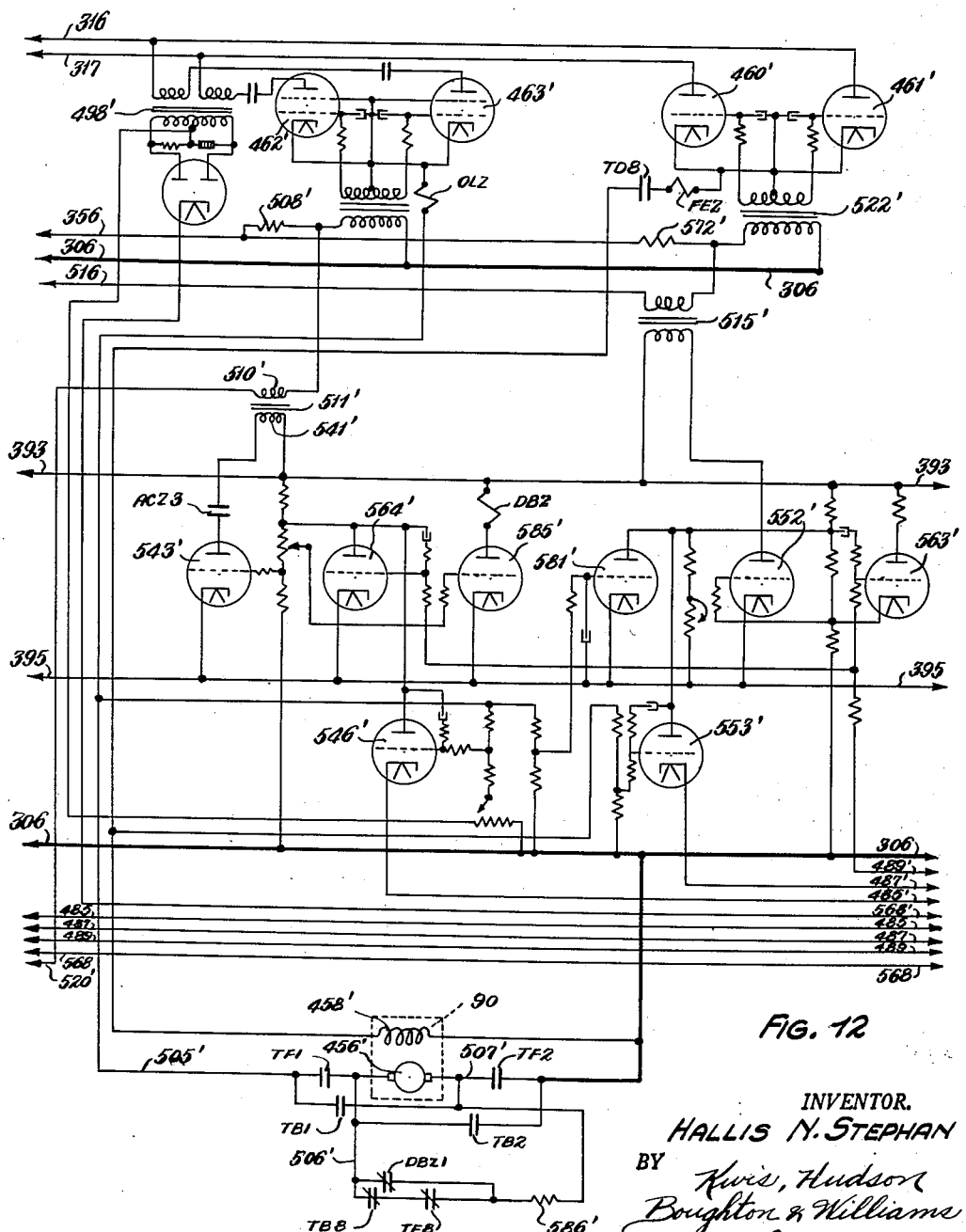

More specifically, Figs. 8 and 9 indicate diagrammatically the circuits associated with the push button switches and selection switches in the pendant R together with the associated relays having contacts for closing or opening the circuits necessary to start and stop the various driving motors, operate the various clutches, and interlock the various circuits for preventing damage to the machine by improper operation of the push button switches. Fig. 9A shows the back rest clamp motor 326 and the spindle rapid traverse motor 125 and their associated controls; Fig. 10 the spindle drive motor 124 and its associated power supply equipment; Fig. 11 the spindle head or saddle drive motor 21 together with the associated power supply equipment; Fig. 12 the table drive motor 90 together with its associated power supply equipment; and Fig. 13 the speed controlling potentiometers for both the motors 21 and 90.

In the preferred embodiment of the invention, relays having one or more contacts are utilized as a means of opening and closing appropriate circuits for starting, stopping, or shifting the speed controls of the motors 21, 90, as well as for providing interlocks to prevent any operation of the motors which might cause damage to the machine. For the purposes of clarity and to aid a better understanding of the invention, the energizing coils of the various relays are designated in the drawings by letters of the alphabet which insofar as possible designate in an abbreviated form the principal function which the relay will perform when energized. The contacts on each relay are designated by the same letter designation followed by a numeral indicating which contact of the individual relay is being referred to.

In the preferred embodiment of the invention the spindle drive motor 124 is of a type having a continuously variable speed range from zero or some suitable minimum value to some other suitable maximum value. To satisfactorily obtain wide speed variations in electric motors, it is generally preferable that they be of the direct current type, variation of the D. C. voltage applied thereto effecting a variation in the speed of rotation. In most industrial plants today, however, where machine tools of the type to which the invention refers are utilized, the source of electrical energy is generally alternating current, which of course must be converted to D. C. before being used in a direct current motor. The invention contemplates a means for converting altrnating current electrical energy to direct current for application to the spindle drive motor 124, means for controlling the amount of direct current which reaches the motor for controlling the speed thereof, and means for varying it to automatically compensate for load variations. While these means may take a number of different forms, in the embodiment shown the spindle drive motor 124 is of the direct current type having a separately excited armature 290 and a separately excited field 291. To obtain the speed variations required, the electrical energy is supplied through suitable electric valve apparatus adapted to accurately control the amount of electrical energy reaching the individual field or armature. The method of control shown is preferred primarily because the accuracy of speed control obtainable is high, and the control for adjusting the speed is required to dissipate very little or no electrical energy and may be made sufficiently small to be positioned in the pendant R without unduly crowding the parts therein. Additionally, the control shown enables automatic compensation for the IR drop of the armature winding whereby the speed of the motor may be held constant regardless of the variations of the load thereon. The starting, stopping, and reversing of the motor 124 is, as has been pointed out above, under the control of the push button switches 250, 251, 253 located on the pendant R, while the speed thereof may be controlled by proper positioning of the spindle speed control knob 254 also located on the pendant. In the embodiment shown, rotation of the spindle speed control knob 254 varies the position of a slider on suitable ganged potentiometers 292, 293 which operate in a manner to be described to control the field voltage and armature voltage respectively.

Alternating current energy from a source not shown is supplied to the motors 21, 90, and 124 and the associated control apparatus through a common supply transformer 294, although separate supply transformers could be utilized, or if voltages of the appropriate amount are available no transformer at all need be provided. A single phase alternating current supply system is shown, although it will be appreciated that a system for a plurality of phases could be provided. The primary coil 295 of the supply transformer 294 is connected across the alternating current energy source through wire 296, normally open contact 297, wire 298, the primary coil 295, the wire 299, normally open contact 300, and wire 301. Additionally, the supply voltage appears across the normally closed breaker trip switch 289 in series with the breaker trip relay energizing coil 304 such that when the breaker trip switch 280 is open the breaker trip relay coil 304 is deenergized, thus opening the normally open contacts 297, 300, breaking the circuit of the source of alternating current voltage to the primary 295. Preferably these contacts are of the type that when once opened will remain opened and must be subsequently closed by hand or otherwise. By such an arrangement it is possible for the operator, in case of any unknown trouble in the electrical circuits of the machine, or at the end of the day's work, to completely isolate the entire electrical circuits from the source of alternating current energy. When it is desired to restart the equipment, it will be necessary to reset the contacts 297, 300 by hand.

The supply transformer 294 has a secondary winding 305 with a midtap connected to a bus 306 which becomes the negative side of the direct current system, i. e., the negative armature terminals, the negative field terminals, and the negative control valve terminals for the entire electrical system. Assuming that the motor 124 is designed for operation on 250 volts, the full secondary voltage of the transformer should be approximately 620 volts. Two 57½ volt taps, 307 and 308, on either side of the center tap provide a 115 volt tapped source of control power for filaments, transformers, phase shift bridges, and relay excitation presently to be referred to. Any other voltages could, of course, be used.

Suitable non-linear resistance units 309, 310 are connected across each half of the secondary winding 305. These non-linear resistances may be made of any suitable material having a non-linear characteristic but are preferably made of a composition of silicon carbide crystals which are held together by a suitable binder. The purpose of these non-linear resistances is to protect the inductive winding from high voltage surges which sometimes occur in tube circuit operations. The non-linear resistance provides a low resistance shunt path to voltages higher than a predetermined normal, and a very high resistance path to voltages less than normal. Thus normal voltages are unaffected by the units while voltages higher than normal are presented with a low resistance load effectively preventing further rise thereof.

The spindle motor 124 has an armature 290 and a shunt field winding 291 energized through the transformer 294 and suitable electric valve apparatus comprising electric valves 312, 313, 314, 315.

The current supplied to the field winding 291 is controlled by the electric valves 312, 313 having anodes 312a, 313a, cathodes 312b, 313b, and control grids 312c, 313c, respectively. As shown, the anodes 312a, 313a are connected by means of conductors 316, 317, respectively, to opposite terminals of the secondary winding 305 of the supply transformer 294. The wires 316, 317 may be referred to as A. C. high voltage supply buses. The cathodes 312b, 313b may be heated by any suitable means, but preferably through a filament transformer (not shown) receiving its supply of alternating current voltage from the secondary winding 305, and are interconnected by wire 319. The electric valves 312, 313 are preferably of the rectification type possessing the capability of passing electrical current in one direction only and are connected for bi-phase rectification such that an alternating current applied to their anodes 312a, 313a results in a positive direct current voltage appearing at the interconnected cathodes 312b, 313b relative to the negative bus 306 with a value approximately equal to one-half of the total voltage appearing across the total secondary winding 305. This positive voltage is fed to the field coil 291 of the motor 124 from the conductor 319 through a field overload protective relay FEX, the normally open contact TD1 of a time delay relay TD having additional normally open contacts TD2, TD3, wire 321, and thence through the spindle motor field winding 291 to the negative conductor 306.

The supply of current to the armature 290 of the motor 124 is controlled by means of the electric valves 314, 315, also preferably connected in a bi-phase rectification circuit and having anodes 314a, 315a, cathodes 314b, 315b, and control grids 314c, 315c, respectively. As shown, the anode 314a is connected to the A. C. high voltage supply bus 317 through a primary winding 323 of a special control transformer 324, normally open contact ACX1, and wire 326, while the anode 315a is connected to the other high voltage supply bus 316 through another primary winding 327 of the special control transformer 324, wire 328, normally open contact ACX2, and wire 329. The cathodes 314b, 315b of these valves are heated by any suitable means and are interconnected by wire 330 which is the positive terminal of the armature supply voltage. This voltage may be traced to the armature from the wire 330, the heating element of an overload protective relay OLX, wire 333, and thence dependent upon which way the motor will rotate through either normally open forward contact MF1, wire 335, the armature winding, wire 336, and normally open forward contact MF2 to the negative bus 306, or, normally open reverse contact MR1, wire 336, the armature winding, wire 335, and normally open reverse contact MR2 to the negative bus 306. If desired, a smoothing reactor (not shown) may be connected in the positive direct current motor armature lead 333.

Although the electric valves 312, 313, 314, 315 may be of any suitable type, they are preferably grid controlled mercury vapor thyratron tubes. The cathodes 314b, 315b of the valves 314, 315 which control the supply of current to the armature are preferably of the indirectly heated type, and these valves may be provided with shield grids 314d, 315d as well as with the control grids 314c, 315c, respectively. The valves 312, 313 which control the supply of current to the field winding may have directly heated filamentary cathodes, although they are shown schematically as having the indirectly heated type of cathode and may have only single grids 312c, 313c. In thyratron valves of the type which it is preferred to use, the function of the control grid is only to initiate the flow of current between the anode and cathode during each positive half-cycle of anode voltage. Once current has started to flow, the grid exercises no further control until the conductivity of the valve has been interrupted by some means external to the valve itself, such as the anode voltage going negative as a result of the A. C. cycle. Once the current has ceased to flow, the grid will again determine the point in the positive half-cycle of anode voltage at which the valve will again become conducting. These valves may, therefore, be termed grid controlled arc rectifiers.

The flow of current through the thyratron valves 312, 313, 314, 315, or more exactly the point in the positive half-cycle of anode voltage where the current commences to flow, may be controlled by any suitable method, such as controllably varying a negative D. C. bias voltage or as shown using a method of phase shift control of the grid voltage, i. e., an alternating current grid voltage is applied to the control grids and its phase varied relative to the phase of the anode voltage. With such an arrangement the grid voltages should have a value sufficiently large that when 180° out of phase with the anode voltage it will prevent the tubes from conducting. Then as the phase of the grid voltage is varied, and dependent upon the degree of the shift, the thyratrons will conduct for greater or smaller periods of time of the latter portions of the positive alternating current cycle applied to their anodes and energizing the field or armature with greater or less current. For the carrying out of this method of control, a pair of phase shifting networks, one for the armature thyratrons and one for the field thyratrons, are provided.

The phase shifting network for the armature thyratrons comprises a resistor 349 connected in series by wire 341 with an alternating current winding 342 of a saturable core type reactor 343, while the network for the field thyratrons 312, 313 comprises a resistor 345 connected in series by wire 346 with an alternating current winding 347 of a saturable core type reactor 348. The network for the field thyratrons is connected across the low voltage terminals 307, 308 of the secondary winding through the wire 350, normally closed overload contact OLX1, wire 354, winding 347, wire 346, resistor 345, and thence through wire 356 to the opposite transformer terminal 308. The network for the armature thyratrons 314, 315 is connected across the low voltage terminals 307, 308, and this circuit may be traced from the wire 354 through the normally open contacts FEX1, FEY1, FEZ1, all of which contacts are closed when the motor fields are energized and the motors ready for operation, wire 352, normally closed overload contact OL1, wire 358, contacts of the spindle jog, forward, reverse, and stop push button switches and associated contacts which will be detailed later on, normally open interlocking contacts MR4 or MF4, the wire 360, coil 342, wire 341, the resistor 349, and wire 356, to the tap 308.

The field control voltage or the voltage between the wire 346 and the ground bus 306 is applied across the primary winding 362 of a grid transformer 363 having a center tap secondary winding 364 connected at the center tap terminal to the cathode interconnecting wire 319. One of the outer terminals is connected to the grid 312c through wire 365, isolating resistor 366, and wire 367, and at the other outer terminal to the grid 313c, through wire 368, isolating or current limiting resistor 369, and wire 370. The grids 312c, 313c are bypassed to the cathodes by capacitors 371, 372, respectively. The voltages supplied to the primary 362 of the grid transformer 363 through the resistor 345 and the current winding 347 is such that as the inductance of the current winding 347 is varied from a maximum to a minimum, the phase of the alternating current voltage reaching the primary 362 can be made to vary through an angle of approximately 180° with respect to the supply voltage appearing at the low voltage terminals 307, 308 of the supply transformer and thus the voltage applied to the anodes 312a, 313a. Thus by varying the inductance of the current winding 347, it is possible to control the exact point in the positive half-cycle of anode voltage at which these tubes will commence to conduct and supply current to the field winding 291. The length of time each tube conducts in each half-cycle will determine the field current. The inductance of the current winding 347 is controlled by varying the D. C. saturation of the reactor 348 by varying the D. C. current flowing in a saturation coil 374.

Similarly, the armature control voltage or the voltage between the wire 341 and the ground bus 306 is applied across the primary winding 376 of a grid transformer 377 having a center tap secondary winding 378 connected at its center tap to the cathode interconnecting wire 330. One of the outer terminals of the winding 378 is connected to the grid 314c through a current limiting resistor 380, while the other outer terminal is connected to the grid 315c through a current limiting resistor 382. These grids may also be bypassed to the cathodes by capacitors 383, 384 respectively. The voltages applied to the primary 376 of the grid transformer 377 through the resistor 340 and the current winding 342 are such that as the inductance of the current winding 342 is varied from a maximum to a minimum, the phase of the alternating current voltage reaching the primary 376 can be made to vary through an angle of approximately 180° with respect to the supply of voltage appearing at the low voltage terminals 307, 308 of the supply transformer, as well as the voltage applied to the anodes 314a, 315a. By varying the inductance of the current winding 342, it is possible to control the phase of the voltage applied to the grids 314c, 315c and the exact point in the positive half-cycle of anode voltage at which the valves 314, 315 will commence to conduct and supply current to the armature 290. In the same manner as with the field voltage supply, the inductance of the current winding 342 is controlled by varying the D. C. saturation of the reactor 343 by varying the D. C. current flowing in a saturation coil 386.

The control is such that when the saturable reactors are saturated, the voltages of the grid transformers tend to be in phase with the anode transformer voltage, and when the reactors are unsaturated, the voltages of the grid transformers tend to be out of phase and lagging. Intermediate values of saturation produce intermediate phase relationships. Thus, when the saturable reactors 348, 343 are fully saturated, the thyratrons 312, 313, 314, 315 are fully conducting, and conversely when the reactors are unsaturated the thyratrons are non-conducting. For intermediate values of saturation, the thyratrons have corresponding intermediate values of conductivity.

To the same anode transformer terminals as those at which the anodes of the thyratrons are connected, there is also connected a small auxiliary rectifier valve 388 on a bi-phase rectification circuit having a pair of anodes 388a, 388b connected to the high voltage supply buses 316, 317, respectively, and a common cathode 388c heated by any suitable means which furnishes a separate source of direct voltage from which electric valves for controlling the saturation of the saturable core reactors 348, 343 are energized. This positive control voltage may be traced from the cathode 388c through a smoothing inductor 389, the wire 390, which is bypassed to the ground or negative bus 306 by a smoothing capacitor 391, and thence through a voltage stabilizing circuit comprising a resistor 392, wire 393, voltage stabilization tube 394, wire 395, and thence through voltage stabilization tube 396 to the negative bus 306. These stabilization tubes are preferably gaseous discharge devices which operate in that region of their characteristic in which the voltage drop across the tube is substantially constant across a wide range of current. Thus the voltage between the wire 393 and the wire 395 is fixed in magnitude by the type of stabilization tube used, and within the operating limits thereof this voltage will be independent of variations in the alternating supply voltage. Any difference in voltage between the voltage drop across the capacitor 391 and the constant voltage drop across the regulator tubes 394, 396 is absorbed by the resistor 392. The voltage across the regulator tube 394 is used to stabilize the voltage on certain amplifier valves to be described for controlling the degree of saturation of the saturable core reactors 348, 343, which valves are connected between the wire 393 and the wire 395, while the voltage drop across the regulator tube 396, and thus between the wire 395 and the negative bus 306, is the voltage standard with which signal voltages or the voltages applied to the armature 290 and the field 291 are compared for controlling purposes. The wire 393 thus constitutes the positive control voltage bus, while the wire 395 constitutes the amplifier cathode return bus or the positive voltage standard bus.

For the purpose of varying the direct current which flows in the saturating winding 386, a suitable amplifying electric valve 398 is provided having an anode 398a, a cathode 398b, and a control grid 398c. The anode 398a is connected to the voltage supply bus 393 through wire 400, normally open contact ACX3, wire 401, and thence through the saturating winding 386 to the supply bus 393. The cathode is connected to the cathode return bus 395, thus placing the direct current winding of the saturable reactor 386 and the valve 398 in series across the voltage stabilizing tube 394. The control of the current through the direct current winding of the armature saturable reactor 386 is achieved by proper choice of the grid-to-cathode voltage of the valve 398. As the voltage of the grid 398c is made less negative with respect to the voltage of the cathode 398b, the current transmitted by the valve will increase, thereby increasing the saturation of the armature saturable reactor 386 which, as pointed out in the foregoing, results in increasing the voltage applied to the armature 290 of the motor 124. Conversely, as the voltage of the grid 398c is made more negative with respect to the voltage of the cathode 398b, the current transmitted by the valve will decrease and this will decrease the voltage supplied to the armature of the motor. An additional amplifying electric valve 402, having an anode 402a, a cathode 402b, and a control grid 402c, is provided for the purpose of varying the voltage on the grid 398c so that the speed of the spindle motor 124 is maintained constant at a preset value which is correlated with the position of the slider 293a on the armature speed controlling potentiometer 293. In other words, the electric valve 402 serves as a connecting link between the potentiometer 293 and the electric valve 398 which controls the saturation of the armature saturable reactor 343, and hence controls the armature voltage and speed of the motor 124. The grid 398c of valve 398 is connected through a current limiting resistor 403 to the junction of resistors 404b, 404c of a voltage divider comprising resistors 404a, 404b, 404c connected in series, respectively, between the control voltage bus 393 and the ground bus 395. The cathode 402b of valve 402 is connected to the slider 293a, and the anode 402a is connected to the junction point of the resistors 404a, 404b by wire 405. When the voltage of the grid 402c is made less negative with respect to its cathode, the current transmitted by the valve 402 is correspondingly increased, and, since this current flows through the resistor 404a, the voltage drop across this resistor is correspondingly increased and consequently the voltage of the grid 398c is correspondingly decreased so that the current transmitted by valve 398 is decreased and the armature voltage and speed are correspondingly decreased. Thus, increasing the conductivity of electric valve 402 has the effect of decreasing the voltage supplied to the armature 290 of motor 124 and, conversely, decreasing the current transmitted by electric valve 402 has the effect of increasing the voltage supplied to the armature 290.

Since the lower terminal of resistor 404c and one electrode of tube 396 are connected together to the ground bus 306, and since the upper terminal of resistor 404c is connected to the grid 398c and the upper electrode of valve 396 is connected to the cathode 398b, the valve 398 compares the voltage drop across the resistor 404c with the voltage drop across the tube 396.

If the armature voltage or a portion of the armature voltage is impressed on the grid 402c, an increase in armature voltage will increase the conductivity of valve 402 thereby decreasing the conductivity of valve 398 and decreasing the output of thyratrons 314, 315 and thereby correcting the increase in armature voltage. If the armature voltage decreases, the reverse action takes place and the decrease in armature voltage is corrected. The position of the slider 293a on the armature speed control potentiometer 393, which is connected in parallel across the voltage regulating tube 396 determines the percentage of the total voltage drop thereacross which is to be derived and used as a preset indication of speed. The voltage that is so derived and used as a reference voltage is the voltage between the slider and the negative bus 306. Since the cathode 402b of the valve 402 is connected to the slider, then the position of the slider will determine the voltage of the cathode relative to the negative bus 306. A signal voltage is derived from the armature voltage by means of a voltage divider connected at one end to the wire 333 which comprises resistors 406a, 406b and that portion of a resistor 407 between a variable slider 408 thereon and the negative bus 306. The signal voltage used is the voltage from the junction point of the resistors 406a, 406b to the negative bus 306, and this signal voltage is impressed on the grid 402c of valve 402 through a current limiting resistor 409. Thus the grid-to-cathode voltage of the valve 402 is the difference between the signal voltage and the voltage from the slider 293a to the negative bus 306. The tendency of the circuit will be to maintain the signal voltage approximately equal to the reference voltage, i. e., the voltage from the slider 293a to the negative bus 306. Hence, the armature voltage and the speed of the motor will be approximately proportional to the reference voltage tapped off by the slider 293a of the speed control potentiometer.

The voltage selected by the position of the slider 293a is a portion of the constant voltage drop across the glow tube 396 and is therefore constant. As the slider is moved from a position near the ground bus 306 potential to a position toward the potential of the bus 395, the preselected speed levels are progressively increased.

For the purpose of varying the saturating current of the field saturable reactor 348, a pair of electric valves 410, 411 corresponding, respectively, in function to the valves 393, 402 of the armature control, is provided. The electric valve 410 has an anode 410a, a cathode 410b, and a control grid 410c, and similarly the valve 411 has an anode 411a, a cathode 411b, and a control grid 411c. For the purpose of varying the saturating current, the anode 410a is connected to the positive control voltage bus 393 through the wire 412 and the saturating coil 374 of the saturable core reactor 348, while the cathode 410b is connected directly to the cathode return bus 395, placing the valve 410 in series with the saturating coil 374 across the voltage supply buses 393 and 395 whereby any current flowing in the valve also flows in the saturating current winding 374. The control grid 410c is connected through a current limiting resistor 413 and wire 414 to the junction of resistors 415b, 415c of a voltage divider comprising the resistors 415a, 415b, 415c connected in series, respectively, between the positive control bus 393 and the negative control bus 396. Here, as with the armature control valve 399, the voltage divider is so proportioned that the voltage applied to the control grid 410c with respect to the cathode 410b is of such a value that the valve 410 is conducting a sufficient amount of current to saturate the saturable core reactor 348. The anode 411a of the valve 411 is connected through the wire 416 to the junction of the resistors 415a, 415b, and the cathode is connected to the slider 292a of the field weakening potentiometer 292 connected in series with a potentiometer 417 between the intermediate control voltage bus 395 and the ground bus 306, respectively. The grid 411c is connected through a resistor 418 to the junction of resistors 419, 420 which comprise a voltage divider connected from the field voltage supply wire 321 to the ground bus 306. As shown, an additional resistor 421 and a capacitor 422 are connected in series between the grid 411c and the anode 411a which tends to stabilize the current in the valve 411, reducing the effects of sudden voltage surges. The valves 410, 411 operate to compare the voltage across the field winding 291 or a selectable portion thereof with an adjustable reference voltage which is derived from the voltage of the glow tube 396 by means of the position of the slider 292a on the field weakening potentiometer 292. The difference between the signal voltage derived from across the field winding by the voltage divider circuits 419, 420 is impressed on the grid-cathode circuit of the valve 411 and compared with the difference between the voltage on the slider 292a and the ground bus 396 in such a manner as to always maintain these voltages the same. That is, as the field voltage increases, the voltage on the grid 411c is less negative and the conductivity of the valve 411 increases, resulting in an increase of current flowing therethrough. This increase of current flows through the resistor 415a and increases the voltage drop thereacross and decreases the voltage on the grid 410c, thereby decreasing the conductivity of the valve 410, decreasing the saturation of the field saturable reactor 348 which acts to decrease the voltage supply to the field winding. Conversely, a decrease in the voltage across the field winding will have the effect of decreasing the conductivity of the valve 411, thereby decreasing the voltage drop across the resistor 415a, increasing the voltage on the grid 410c, and increasing the conductivity of the valve 410. This increase of conductivity increases the saturation of the saturable core reactor and increases the field voltage. Thus, by adjustment of the slider 292a on the field weakening potentiometer 292, the field current may be made to vary from a maximum to a minimum, which minimum is limited by the adjustable resistor 417 connected between the negative terminal of the field weakening potentiometer 292 and the ground bus 306, making it impossible for the voltage on the cathode 411b to ever be reduced to zero. As shown, the resistor 417 is adjustable in order to compensate for different capacity or type motors used for the spindle drive.

If it should be desirable to use field current rather than field voltage as the signal voltage, this may be done by substituting a voltage proportional to current for that portion of the field voltage which is impressed on the grid circuit of the electric valve 411.

In the embodiment of the invention shown, the armature speed control potentiometer 293 and the field weakening control potentiometer 292 each preferably comprise a resistance portion and a non-resistance portion or contact strip arranged circumferentially on which rotatable sliders 293a, 292a, respectively, make contact as they are rotated, tapping off greater or less portions of the voltage across the valve 396 as the case may be when they are in contact with the resistance portion and a constant voltage equal to the voltage on the bus 395 when in contact with the non-resistance portion. The sliders and speed control knob 254 are preferably mounted on a common shaft and so oriented that with the speed control knob in the zero position, the sliders will also be in the zero speed position, which position is such that the field has full voltage applied thereto and the armature has no voltage applied thereto; or, in other words, the armature voltage control slider 293a is at the potential of the ground bus 306 on the resistance portion of its potentiometer while the field voltage control slider 292a is at the potential of the signal voltage control bus 395 or, in other words, on the non-resistance portion of the potentiometer. As the speed control knob 254 is initially advanced from the zero or minimum speed position, the field voltage control slider contacts the non-resistance portion of its potentiometer maintaining the field voltage constant at its full value, while the armature voltage control slider contacts the resistance portion of its potentiometer and taps off more and more of the voltage standard across the tube 396 thereby supplying the armature with more and more voltage and causing the armature 290 to rotate at greater and greater speeds. When the speed control knob 254 is moved beyond approximately the half way point so as to further advance the speed of the motor 124, the armature voltage control slider contacts its non-resistance portion and the armature receives its full voltage, while the field voltage control slider contacts its resistance portion and taps off less and less of the voltage standard across the tube 396, thus supplying the field with less and less voltage and causing the speed of the motor to become greater and greater within the limits permitted by the resistor 417.

It will be appreciated that when the speed control knob has been advanced beyond the center position and the field voltage commences to decrease, the available torque output of the spindle motor 124 will, within limits, also decrease. Inasmuch as it is possible to obtain a coarse speed adjustment by use of the spindle drive change speed gears and as the torque requirements on the motor may be rather high at any speed of the spindle, the field voltage may be set at a constant value and only the armature voltage varied, which while reducing the overall variable speed range of the spindle motor 124 still gives in conjunction with the gearing a full continuous speed range of the spindle.

For the purpose of limiting the armature current to a maximum permissible value, means are provided for comparing a signal voltage derived from the anode current of the armature thyratrons with a reference voltage and utilizing the difference of these signal and reference voltages to control both the armature and field thyratrons in such a manner as to limit the armature current to the desired value. These means are illustrated as comprising the anode current transformer 324, the bi-phase rectifying electric valve 424, and control amplifier valves 426, 427. As shown, the two primary windings 326, 327 of the anode current transformer 324 are connected in series with the anode circuits of each of the armature thyratron valves, and this transformer is polarized in such a manner that when one of the armature thyratrons conducts the flux in the core is in one direction, and when the other thyratron conducts the flux is reversed. As a result, an alternating current voltage is induced across the secondary winding 429 and the magnitude of this induced voltage will be determined by the resistance load connected to the secondary and by the turn ratio between primary and secondary windings. A non-linear resistance 430 which is similar to the non-linear resistances 309, 310 is connected between a midtap and one outer terminal of the secondary winding to absorb the voltage surges which are induced in the secondary winding when the load current changes abruptly. A resistor 431 which is connected between the same midtap and the other outer terminal of the secondary winding 429 determines the magnitude of the alternating current voltage that will be developed for a given direct current in the armature circuit. This alternating current voltage is applied to the anodes 424a, 424b of an electric valve 424 rectified, and appears as a positive direct voltage at the cathode 424c connected to the ground bus through wire 432 and a voltage divider comprising the resistance element of potentiometer 433 and resistor 434. The negative direct voltage on the midtap is connected to the ground bus 306 through wire 435 and the resistance element of potentiometer 407.

The electric valves 426, 427 are provided with anodes 426a, 427a, cathodes 426b, 427b, and grids 426c, 427c, respectively. The anode 426a of valve 426 is connected to the wire 405 and junction point between the sections of the voltage divider to which the grid of valve 398 is connected, and the cathode 427b is connected to the cathode return bus 395 to which the cathode of valve 398 is connected. The anode 427a is connected to the positive control voltage bus 393 through resistor 436 while the cathode 427b is connected to the wire 414 and is normally at the same direct potential as the grid 410c of the field control valve 410, which wire, as shown, is connected to the junction point between the resistance sections 415b, 415c. The ratio of the resistance sections 415a, 415b, 415c is such that the voltage of the cathode 427b is slightly more negative than the voltage of cathode 426b. The grids 426c, 427c are connected to a slider 433a of the potentiometer 433 through current limiting resistors 437, 438, respectively, and wire 439 in series with a second current limiting resistor 440. Grid 426c is also connected with its anode 426a through resistor 441 in series with a capacitor 442, while the grid 427c is connected to wire 416 through a resistor 443 in series with a capacitor 444.

When small amounts of current flow in the armature circuit, the voltage developed across the secondary of the current transformer 324 and the voltage rectified by the valve 424 will be so small that the portion which is utilized as a signal voltage, i. e., the voltage between the slider 433a and the negative bus 306, will be substantially less than the voltage across the tube 396, and consequently the grids of the valves 426, 427 will be very much negative with respect to their cathodes 426b, 427b. An increase of armature current will cause the voltage across the secondary of the current transformer to increase, and the voltage rectified by the valve 424 will increase correspondingly so that the voltage between the slider 433a and the negative bus 306 will ultimately reach a value approximately equal to the voltage across the valve 396 and the negative grid voltage of valves 426, 427 will be reduced to the value at which these valves begin to conduct current.

When valve 426 conducts current, it has the same effect as if valve 402 were conducting current, which is to decrease the current conducted by valve 398 and thereby decrease the saturation of the armature saturable reactor 343 and decrease the voltage supplied to the armature.

The operation of valve 427 is slightly different in that its cathode is connected to the grid of valve 410 instead of to the cathode, and its anode is connected through a resistor 436 to the positive bus 393. When the grid of valve 427 is made sufficiently less negative to cause current to flow in the anode circuit, the effect of current flow through valve 427 is to raise the voltage of the junction point of resistors 415b, 415c to which the grid 410c of valve 410 is connected. This has the effect of increasing the conductivity of valve 410 with the result that the field 291 will be strengthened if it has been in a field weakened condition. Since the cathode 427b of valve 427 is more negative than the cathode 426b of valve 426, the valve 410 will be controlled slightly ahead of valve 398, with the result that the field will be strengthened before the armature voltage is decreased.

In a typical installation, the current limit control may be set, by adjustment of the slider 433a, for 150 per cent normal full load current. In this case, the current limit control will be inactive up to approximately 150 per cent full load current because that portion of the direct current voltage proportional to armature current between the slider 433a and the negative bus 306 is less than the voltage drop across the valve 396 with which it is being compared. Therefore, the grids of valves 426, 427 will be very much negative with respect to their cathodes and these valves will be cut off. To allow for a range of adjustment, the resistor 433 is made in the form of a potentiometer with the resistance element circumferentially arranged and the circuit in which it is included is so designed that with the slider at the junction point between resistors 433, 434, maximum voltage must be produced across the secondary of the current transformer 324 before the voltage between the slider 433a and the negative bus 306 will be sufficiently near equality with the voltage drop across the valve 396 to effect control of the valves 426, 427. With the slider 433a at the opposite end of the resistor, only the minimum value of voltage need be developed across the secondary of the current transformer to control the valves 426, 427. The slider 433a may be rotated by the speed control knob 254 and so oriented that as the knob is advanced toward the zero speed position the maximum armature current is reduced, preventing overheating of the armature at low speeds when there is very little windage for cooling purposes.

For the purpose of accurately maintaining the speed of the motor 124 at the level which is preset upon the speed controlling potentiometers 292, 293, means are provided for compensating for the RI drop in the armature circuit. In effect, these means subtract an increment of voltage from the armature terminal voltage so that the resultant voltage which is used as a signal of speed is approximately equal to the countervoltage of the motor. That is to say, to hold constant armature countervoltage is to hold constant speed, and this is possible when the armature terminal voltage is increased by an amount equal to the RI drop of the armature circuit.

The potentiometer 407 serves to subtract the increment of voltage from the terminal voltage of the motor. The slider 408 of this potentiometer is connected to the negative end of the armature voltage dividing resistance network resistors 406a, 406b. The voltage across resistor 407 is proportional to the armature current. The end of resistor 407 which is connected to the negative bus 306 is positive, and the end connected to the midtap of the secondary winding 429 of the current transformer by wire 435 is negative so that the slider is always negative with respect to the negative bus 306, and this negative voltage is added at the lower end of resistor 406b. The circuit functions in such a manner that as the armature current increases, the voltage of the lower end of resistor 406b is made more negative with respect to the negative bus 306, thus tending to make the junction point between resistors 406a, 406b negative with respect to the voltage of the slider 293a. This has the effect of decreasing the conductivity of the valve 402 and thereby increasing the armature voltage.

This voltage must increase to such an extent that the voltage of the grid of valve 402 is raised to the level at which it operated before the lower terminal of the resistor 406b was made negative by the voltage drop between the negative bus 306 and the slider 408. Thus, an increase of current through potentiometer 407 has a tendency to make the grid 402c negative, and that tendency causes an increased armature voltage to re-establish the voltage of the grid at its former level. Since the voltage drop across the resistance 407 is proportional to armature current and since the RI drop is also proportional to armature current, it is possible by adjustment of the slider 408 to select the voltage drop which will cause the armature terminal voltage to be increased by an amount equal to the internal RI drop of the motor plus the RI drop of all connecting leads.

When a motor is operated at rated armature voltage and at maximum rated field current and is carrying rated full load, it is said to be operating at base speed. If it be assumed that the motor 124 is being operated in the field weakened range, e. g., three times base speed, and if then the speed controlling potentiometers 292, 293 are suddenly changed to a position of lower speed, e. g., one-half base speed, the control would function to decrease the voltage supplied by the armature thyratrons 314, 315 and to increase the voltage supplied to the field winding by the field thyratrons 312, 313, as a result of the action of electric valves 398, 402 and 410, 411. With the motor running at three times base speed and full field applied as quickly as the time constant of the magnetic circuit will permit, the tendency is for the armature countervoltage to increase to a value which is approximately three times full terminal voltage, i. e., 750 volts in the case of a 250-volt motor. To prevent such an undesirable increase in the armature voltage, an additional electric valve 446 is provided. This valve is provided with an anode 446a, a cathode 446b, and a grid 446c. The anode 446a of this valve is connected to the junction point of the resistors 415a, 415b, and the cathode 446b is connected to the conductor 395. The grid 446c is connected to the junction point of a voltage divider circuit comprising resistors 447, 448 conected in series across the armature supply bus 333. As thus connected, this valve 446 measures a fixed portion of the armature voltage, and when this portion exceeds the voltage drop across the reference voltage valve 396 the valve 446 becomes conducting, thereby increasing the voltage drop across the resistor 415a and decreasing the voltage of the grid 410c of valve 410 to prevent the saturation of the saturable reactor 348 which controls the field thyratrons 312, 313. The action of valve 446 upon valve 410 is very similar to the action of valve 411 except that the valve 446 receives its voltage signal from the armature circuit, whereas the valve 411 receives its voltage signal from the field circuit. Thus, valve 446 acts as a cross connection between the armature circuit and the field circuit to prevent the field thyratrons 312, 313 from increasing the field strength to a point at which the armature voltage would exceed a safe limiting value. In practice, this limit of armature voltage should be set at some value between 300 and 350 volts for a motor whose operating voltage is 250 volts. At voltages below the voltage limit setting the grid of valve 446 is rendered inactive because its grid voltage is very much negative relative to its cathode.

In order to prevent the motor 124 coasting for a long time at high speed when the speed controlling knob 254 is moved from a high speed position to a low speed position, means are provided for dynamically braking the motor from the higher speed level to the lower speed level. Such means may comprise an electric valve 450 and a contact DBX1 controlled thereby for completing a dynamic braking circuit through a resistor 451 in parallel with the armature. The electric valve 450 is provided with an anode 450a, a cathode 450b, and a control grid 450c. The anode-cathode circuit extends from the positive direct current control bus 393 through the operating coil of a relay DBX to the anode 450a and from the cathode 450b to the cathode return bus 395. The grid 450c of valve 450 is connected through a current limiting resistor 452 and wire 453 to an intermediate point on the resistor 404b, the value of the voltage applied to the control grid 460c being such that for normal and steady operation of the motor 124 sufficient current flows in the anode circuit to energize the relay DBX and maintain the normally closed contact DBX1 open. If at any time the grid potential on the valve becomes sufficiently negative, the anode current will be substantially cut off and the relay DBX de-energized whereby the normally closed contact DBX1 will close and connect a dynamic braking resistance 451 across the armature terminals, the circuit being traced from the wire 335, the normally closed contact DBX1, wire 454, and thence through the dynamic braking resistor 451 to the wire 336. In the embodiment shown the grid 460c will be driven negative and the relay DBX de-energized when the speed control knob 254 is rotated suddenly from a high speed to a low speed position, at which time the grid of the valve 462 will be quite positive with respect to its cathode, drawing relatively large amounts of current through the resistor 464a.

As has been indicated above, the head and table driving motors 21 and 90, respectively, may be made to feed simultaneously by positioning the combined control selector switch 277 to the position "combined control" in such a manner and at such relative speeds that the resultant movement of the work on the table relative to the spindle will be at an angle as determined by the angular feed control 276. To increase and insure the accuracy of this relative angular movement, it is preferred that the head or saddle drive motor 21 and the table drive motor 90 be of identical construction and of a type having a continuously variable speed range from zero or some minimum value to some suitable maximum value, which speed when once set on either motor will remain substantially constant regardless of the load variations thereon. To satisfactorily obtain such wide speed variations, it is preferable that these motors be of the direct current type wherein variation of the D. C. voltage applied thereto effects a corresponding variation in the speed of rotation and that the means for supplying such D. C. voltage be capable of supplying a voltage such that the speeds of the motors will remain constant through a maximum range of torque demands on the motors. Further, it is also preferred that the means for supplying and controlling the D. C. voltage to each motor be as clearly alike in their characteristics as possible, although of course different means could be employed. While the motors 21 and 90 have been referred to above as rotating simultaneously so as to produce an angular movement of the work relative to the spindle, it will be appreciated that either one or both may be operated singly by positioning the combined control selection switch on individual control and operating the appropriate individual feed controls positioned elsewhere on the pendant.

The means for supplying the D. C. voltage to the motors 21 and 90 may take a number of different forms, such as variable voltage output motor generator installations or, as shown, by providing the motors with separately excited armatures 456, 456', respectively, and separately excited fields 458, 458', respectively, the electrical energy being supplied from the common power supply transformer 285 through suitable electric valve apparatus comprising electric valves 460, 461, 462, 463 for the motor 21 and electric valves 460', 461', 462', 463' for the motor 90, adapted to accurately control the amount of electrical energy reaching the individual field or armature. The method of controlling shown is preferred primarily because the accuracy of speed control obtainable is high, and the speed control is required to dissipate very little or no electrical energy, and may be made sufficiently small to be positioned in the pendant R without unduly crowding the parts therein. Additionally, the control shown enables automatic compensation for the IR drop of the armature winding whereby the speed of the motor may be held constant regardless of the variations of the load thereon. The starting, stopping, and reversing of the motors 21, 90 are, as has been pointed out above, under the control of the push button switches located on the pendant R. The speeds of the motors 21, 90 are under the control of suitable speed controlling potentiometers positioned in the pendant R and controlled by the respective speed control knobs shown thereon.

Thus when the head or saddle feed has been selected for operation by positioning the head feed selection switch 260 or the saddle feed selection switch 261, respectively, in either the "inch" or "continuous" position, the motor 21 will operate and the speed thereof is controlled by the speed control knob 273, rotation of which rotates ganged sliders 468a, 469a, 470a in contact, respectively, on armature voltage controlling potentiometer 468, field voltage controlling potentiometer 469, and armature current limiting control potentiometer 470.

Similarly, when the table feed has been selected for operation by proper positioning of the feed selection switch 270 in either the "inch" or "continuous" position, the speed of the motor 90 which drives the table feed is under the control of the table feed speed control knob 274 on the pendant R, rotation of which moves sliders 471a, 472a, 473a all ganged therewith on a common shaft over the preferably circular resistance elements of an armature voltage controlling potentiometer 471, a field voltage controlling potentiometer 472, and a current limiting control potentiometer 473, all respectively.

When the head and table have been selected for simultaneous or combined operation by positioning the combined control selection switch in the combined control position, the relative speed of the motors 21, 90 is controlled by the direction control knob 276, rotation of which varies the position of contact of ganged sliders 475a, 476a on the respective resistance elements on head motor armature voltage controlling potentiometer 475 and table motor armature voltage controlling potentiometer 476, and the combined rate control knob 275, rotation of which rotates ganged sliders 490a, 490c of potentiometers 490, 490b, respectively. While sliders on potentiometers for controlling the field voltage on the motors 21, 90 could also be ganged and controlled by the direction control knob 276, it is preferred that the field voltage be controlled independently and adjustable to some fixed value which is preferably maintained constant for any particular installation of the machine. Thus the field voltage of the motor 21 is under the control of slider 477a on potentiometer 477, while the field voltage of the motor 90 is under the control of slider 478a on potentiometer 478. As will be explained hereinafter, the sliders 477a, 478a are adjusted to supply the motors 21, 90, respectively, with their full rated field voltage at all times, although it will be appreciated that slight variations may be necessitated due to variations between the individual motors or the individual control circuits. In a similar manner, the maximum current which may be supplied to the armatures of the motors 21, 90 is under the control of sliders 479a, 480a preferably in fixed adjustable relationship, respectively, with head motor armature current limiting potentiometer 479 and table motor current limiting potentiometer 480. While it is possible to gang the sliders 479a, 480a with the field voltage control sliders 477a, 478a and/or the armature voltage controlling sliders 475a, 476a, all respectively, it is preferred that this adjustment be made independently and when once made remain fixed for the particular installation.

When the head or saddle feed motor 21 has been selected for operation at its rapid traverse speed by depressing the push button switch 265, the speed of the motor 21 is under the control of field voltage control slider 481a, armature voltage control slider 481b, adjustably in contact with the resistance element of potentiometer 481, the position of which sliders on the resistance element determines the speed of the motor during rapid traverse movement. While these sliders are shown engaged on the same resistance element, it will be appreciated that individual or separate resistance elements could readily be provided and, if desired, the sliders could be ganged on a common shaft rotatable by a suitable rapid traverse speed control knob providing flexibility of operation. For any particular installation, however, it is considered desirable to preadjust the rapid traverse speed. The maximum current which may be conducted through the armature is under the control of slider 482a on motor 21 armature current limiting potentiometer 482. If desired, the slider 482a could be ganged with the sliders 481a, 481b.

When the table feed motor 90 has been selected for rapid traverse by positioning the table feed selection switch in either the "inch" or "continuous" position and depressing the rapid traverse control push button switch 265, the speed of the motor 90 is under the control of field voltage controlling slider 481c and armature voltage controlling slider 481d in contact with the resistance element of the potentiometer 481 in such positions that the armature is receiving substantially full voltage and the field is in a weakened condition whereby the motor will operate at a speed considerably above its base speed, which speed may be adjusted by suitably positioning the sliders 481c, 481d. The current through the armature may be limited by a slider 483a adjustably in contact with the resistance element of a current limiting potentiometer 483.

Figure 13:
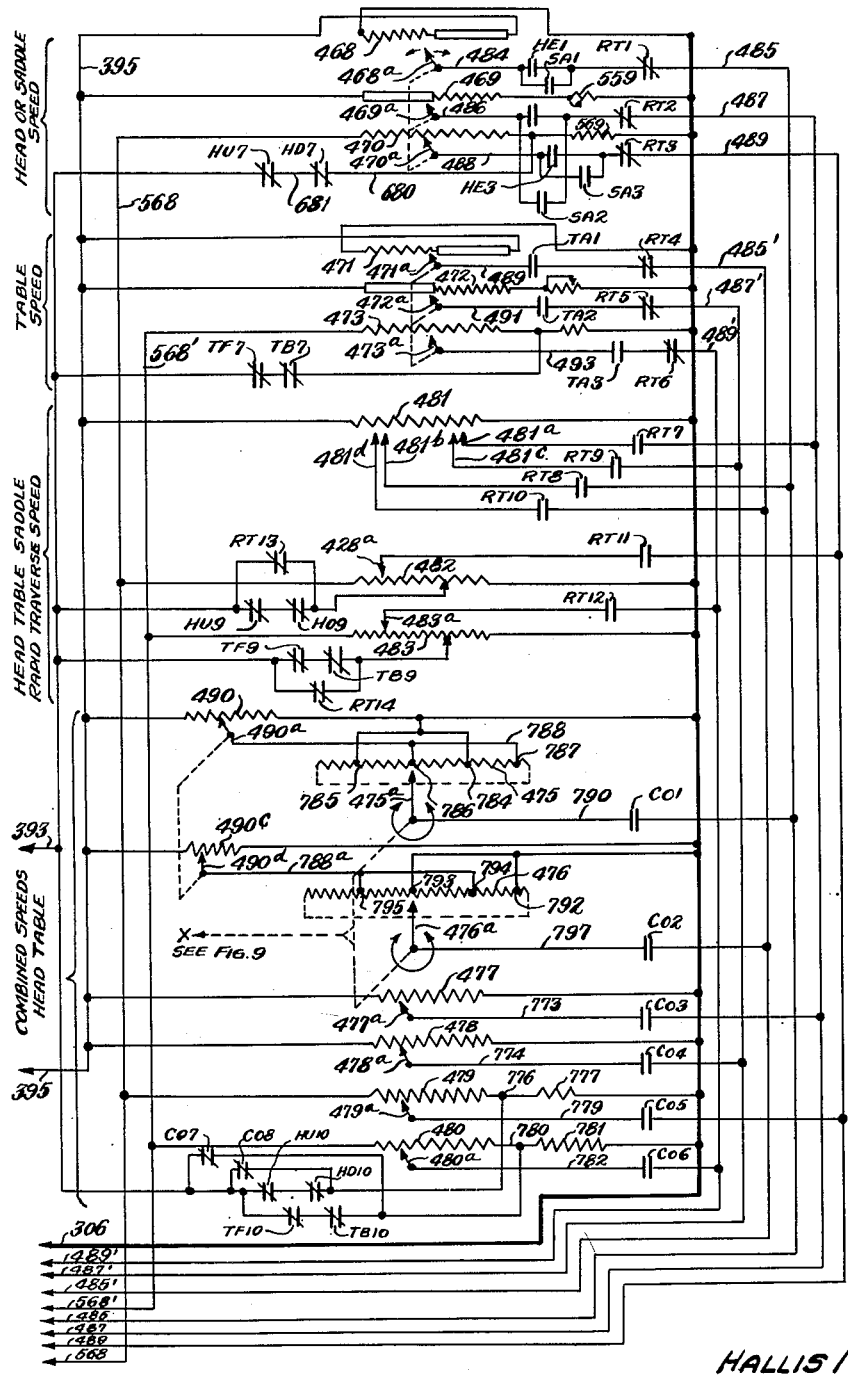

As will be seen from an examination of Fig. 13, the various sliders above referred to are only effective when the appropriate feed control switch or switches on the control pendant R have been operated, and as will be explained hereinafter the controls are so interlocked that only one set of sliders can control the speed of any one motor at any one time. For the purpose of describing the means for supplying the D. C. voltage to the motors 21, 90, it will be assumed that the potentiometers controlling the speed of the motors will be those potentiometers which are effective when the motors are in individual control, i. e., the speed of the motor 21 will be under the control of the sliders 468a, 469a, 470a, on potentiometers 468, 469, 470 respectively, and the speed of the motor 90 will be under the control of sliders 471a, 472a, 473a, on potentiometers 471, 472, 473 respectively. Thus, as will be explained hereinafter, when the motor 21 has been selected for individual operation by movement of either the head feed selection switch 260 or the saddle feed selection switch 261 to either the "inch" or "continuous" position, either the normally open contacts HE1, HE2, HE3 or SA1, SA2, SA3 and the normally closed contacts RT1, RT2, RT3 would be closed completing circuits respectively from the slider 468a, wire 484, to wire 485; slider 469a, wire 486, to wire 487; and slider 470a, wire 488, to wire 489. Similarly, it will be assumed that when the table feed motor 90 has been selected for operation by proper positioning of the table feed selection switch 270, the speed of the motor 90 will be controlled by the position of the sliders 471a, 472a, 473a on their respective potentiometers 471, 472, 473. When the table feed selection switch 270 is so positioned, the normally open contacts TA1, TA2, TA3 and the normally closed contacts RT4, RT5, RT6 will be closed completing circuits respectively from the slider 471a, wire 490, to the wire 485'; slider 472a, wire 491, to the wire 487'; slider 473a, wire 493, to the wire 489'. Preferably the HE or SA relays are so interlocked, as will be described, with the TA relays just referred to that only one relay may be energized at a time, whereby only one of the speed control knobs 273 or 274 may be operable. It will be appreciated that, if desired, the interlock could be removed permitting these motors to be operated simultaneously at a speed indicated by their individual control knobs 273, 274.

As stated above, the means for supplying and controlling the D. C. voltage to the motors 21, 90 are preferably as nearly alike in their characteristics as possible and in the embodiment of the invention shown are identical, like parts performing like functions and like wires carrying like currents, with a single exception which will be pointed out later. Accordingly, corresponding parts exclusive of the relays and contacts have been numbered alike, the parts controlling and supplying the D. C. power for the table feed motor 90 having a prime added thereto. Inasmuch as the function of the contacts and their relation to their actuating relay is considered more important than the relationship between the two power supplying means, they are lettered in accordance with the designation of their actuating relay. The other exception in the numbering occurs in the numbering of the speed controlling and current limiting potentiometers referred to above.

As stated, the current supplied to the field winding 458 is controlled by the electric valves 460, 461, having anodes 460a, 461a, cathodes 460b, 461b, and control grids 460c, 461c, respecttively. The cathodes 460b, 461b may be heated by any suitable means, but preferably through a filament transformer (not shown) receiving its supply of alternating current voltage from the secondary winding 305, and are interconnected by wire 495. The electric valves 460, 461 are preferably of the rectification type possessing the capability of passing electrical current in one direction only and are connected for bi-phase rectification such that an alternating current applied to their anodes 460a, 461a from the A. C. high voltage buses 317, 318, respectively, results in a positive direct current voltage appearing at the interconnected cathodes 460b, 461b relative to the negative bus 306 with a value approximately equal to one-half of the total voltage appearing across the total secondary winding 305. This positive voltage is fed to the field circuit of the motor 21 from the conductor 495 through the energization coil of a field protective relay FEY, the normally open contact TD2, of time delay relay 7D, wire 496, and thence through the field winding 458 to the negative conductor 306.

The supply of current to the armature 456 of the motor 21 is controlled by means of the electric valves 462, 463, also preferably connected in a bi-phase rectification circuit and having anodes 462a, 463a, cathodes 462b, 463b, and control grids 462c, 463c, respectively. As shown, the anode 462a is connected to the A. C. high voltage supply bus 317 through a primary winding 497 of a special control transformer 498, wire 499, normally open contact ACY2, and wire 500, while the anode 463a is connected to the other high voltage supply bus 316 through another primary winding 501 of the special control transformer 498, wire 502, normally open contact ACY1, and wire 503. The cathodes 462b, 463b of these valves are heated by any suitable means and are interconnected by wire 504 which thus becomes the positive terminal of the armature supply voltage. This voltage may be traced to the armature from the wire 504, the heating element of an overload protective relay OLY, wire 505, and thence dependent upon which way the motor will rotate through either normally open contact HU1, wire 506, the armature winding, wire 507, and normally open contact HU2 to the negative bus 306, or, normally open contact HD1, wire 507, the armature winding, wire 506, and normally open contact HD2 to the negative bus 306. If desired, a smoothing reactor (not shown) may be connected in the positive direct current motor armature lead 505.

Although the electric valves 460, 461, 462, 463 may be of any suitable type, they are preferably grid controlled mercury vapor thyratron tubes. The cathodes 462b, 463b of the valves 462, 463 which control the supply of current to the armature are preferably of the indirectly heated type, and these valves may be provided with shield grids 462d, 463d connected to the cathode wire 504 as well as with the control grids 462c, 463c, respectively. The valves 460, 461 which control the supply of current to the field winding may have directly heated filamentary cathodes, although they are shown schematically as having the indirectly heated type of cathode and may have only single grids 460c, 461c.

The flow of current through the thyratron valves 460, 461, 462, 463, or more exactly the point in the positive half-cycle of anode voltage where the current commences to flow, may be controlled by any suitable method, such as controllably varying a negative D. C. bias voltage or as shown using a method of phase shift control of the grid voltage similar to that used for the spindle drive motor 124.

The phase shifting network for the armature thyratrons comprises a resistor 508 connected in series by wire 509 with an alternating current winding 510 of a saturable core type reactor 511, while the network for the field thyratrons 460, 461 comprises a resistor 512 connected in series by wire 513 with an alternating current winding 514 of a saturable core type reactor 515. The network for the field thyratrons is connected across the low voltage terminals 307, 308 of the secondary winding 305 through the wire 516, the normally closed contacts OLY2, OLZ2 in series, to wire 354, the circuit to which has previously been traced from the secondary terminal 308. The network for the armature thyratrons 462, 463 is connected across the low voltage terminals 307, 308, and this circuit may be traced from the wire 356, resistor 508, wire 509, winding 510, wire 520, through a series of interlocking contacts of suitable relays and of the switches controlling the starting, stopping, and direction of rotation of the motor 21, which will be detailed hereinafter in the description of the head and saddle operating switches, wire 517, normally closed overload contacts OLY1, OLZ1 in series, wire 533, normally open contacts MF8 or MR8 in parallel, either one of which is closed when the spindle motor is rotating, normally closed contacts SF1, SFO1 in series, wire 518, the normally closed contacts of "stop all feeds" switch 264, wire 519, the normally closed contacts of stop push button switch 252, the wire 358, and thence to the low voltage tap 307 through the circuit which has previously been traced. In this connection, the single discrepancy in the wiring diagram of the power supply for the motor 90 from the power supply for the motor 21 appears wherein the circuit for the network of the armature thyratrons 462', 463' may be traced from the wire 356, resistor 508', wire 509', winding 510', wire 520', to the wire 517 through a series of interlocking relay contacts and switch contacts controlling the rotation of the motor 90, which will be detailed hereinafter in the description of the operation of the table operating switches. The purpose of the exception herein noted permits energizing the armatures of the motors 21, 90 independently of each other and for other reasons which will appear. While the armatures may be separately and independently energized or de-energized, the field energizing and controlling phasing networks are simultaneously energized from the wire 354, and so long as this wire is energized the field coils of the respective motors will be continuously energized. Overloading of either motor 21 or 90 automatically opens normally closed contacts OLY1, OLY2, OLZ1, OLZ2 and completely de-energizes the fields and armatures of the two motors.

The field control voltage or the voltage between the wire 513 and the ground bus 398 is applied across the primary winding 521 of a grid transformer 522 having a center tap secondary winding connected at the center tap terminal to the cathode interconnecting wire 495. One of the outer terminals is connected to the grid 460c through wire 523, isolating resistor 524, and wire 525, and at the other outer terminal to the grid 461c, through wire 526, isolating or current limiting resistor 527, and wire 528. The grids 460c, 461c may be bypassed to the cathodes by capacitors 529, 529a, respectively. The voltages supplied to the primary 521 of the grid transformer 522 through the resistor 512 and the current winding 514 are such that as the inductance of the current winding 514 is varied from a maximum to a minimum, the phase of the alternating current voltage reaching the primary 521 can be made to vary through an angle of approximately 180° with respect to the supply voltage appearing at the low voltage terminals 307 and 308 of the supply transformer and thus the voltage applied to the anodes 460a, 461a. Varying the inductance of the current winding 514 controls the exact point in the positive half-cycle of anode voltage at which these tubes will commence to conduct and supply current to the field winding 458. The length of time each tube conducts in each half cycle determines the field current. The inductance of the current winding 514 is controlled by varying the D. C. saturation of the reactor 515 by varying the D. C. current flowing in a saturation coil 531.

Similarly, the armature control voltage or the voltage between the wire 509 and the ground bus 306 is applied across the primary winding 532 of a grid transformer 533 having a center tap secondary winding 534 connected at its center tap to the cathode interconnecting wire 504. One of the outer terminals of the winding 534 is connected to the grid 462c through wire 535 and current limiting resistor 536, while the other outer terminal is connected to the grid 463c through wire 537 and current limiting resistor 538. These grids may also be bypassed to the cathodes by capacitors 539, 540 respectively. The voltages applied to the primary 532 of the grid transformer 533 through the resistor 508 and the current winding 510 are such that as the inductance of the current winding 510 is varied from a maximum to a minimum, the phase of the alternating current voltage reaching the primary 532 can be made to vary through an angle of approximately 180° with respect to the supply of voltage appearing at the low voltage terminals 397 and 308 of the supply transformer, as well as the voltage applied to the anodes 462a, 463a. Variation of the inductance of the current winding 510 controls the phase of the voltage applied to the grids 462c, 463c and the exact point in the positive half-cycle of anode voltage at which the valves 462, 463 commence to conduct and supply current to the armature 456. In the same manner as with the field voltage supply, the inductance of the current winding 510 is controlled by varying the D. C. saturation of the reactor 511 by varying the D. C. current flowing in a saturation coil 541.

The control is such that when the saturable reactors are saturated, the voltages of the grid transformers tend to be in phase with the anode transformer voltage, and when the reactors are unsaturated, the voltages of the grid transformers tend to be out of phase and lagging. Intermediate values of saturation produce intermediate phase relationships. Thus, when the saturable reactors 515, 511 are fully saturated, the thyratrons 460, 461, 462, 463 are fully conducting, and conversely when the reactors are unsaturated the thyratrons are non-conducting. For intermediate values of saturation, the thyratrons have corresponding intermediate values of conductivity. Similarly, if the voltage should be removed from the wire 516 or 520, i. e., if the circuit between these wires and the low voltage tap 397 on the secondary winding 305 is interrupted, the thyratrons will be non-conducting. Should the voltage from the low voltage tap suddenly be applied to either the wire 516 or 520, however, the phase of the voltage applied to the grids of the respective thyratrons will not change instantaneously but will change at a slower rate dependent upon the inductance of the circuit and the coils 514, 510 respectively.

For the purpose of varying the direct current which flows in the saturating winding 541, a suitable amplifying electric valve 543 is provided having an anode 543a, a cathode 543b, and a control grid 543c. The anode 543a is connected to the voltage supply bus 393 through wire 544, normally open contact ACY3, wire 545, and thence through the saturating winding 541 to the supply bus 393. The cathode is connected to the cathode return bus 395, thus placing the direct current winding of the saturable reactor 541 and the valve 543 in series across the voltage stabilizing tube 394. The control of the current through the direct current winding of the armature saturable reactor 541 is achieved by proper choice of the grid-to-cathode voltage of the valve 543. As the voltage of the grid 543c is made less negative with respect to the voltage of the cathode 543b, the current transmitted by the valve will increase, thereby increasing the saturation of the armature saturable reactor 541 which, as pointed out in the foregoing, results in increasing the voltage applied to the armature 456 of the motor 21. Conversely, as the voltage of the grid 543c is made more negative with respect to the voltage of the cathode 543b, the current transmitted by the valve will decrease and this will decrease the voltage supplied to the armature of the motor.

An additional amplifying electric valve 546, having an anode 546a, a cathode 546b, and a control grid 546c, is provided for the purpose of varying the voltage on the grid 543c so that the speed of the motor 21 is maintained constant at a preset value, which is correlated with the position of the slider 468a on the armature speed controlling potentiometer 468 connected between the signal voltage control bus 395 and the ground bus 306. The electric valve 546 serves as a connecting link between the speed controlling potentiometer 468 and the electric valve 543 which controls the saturation of the armature saturable reactor 541 and hence controls the armature voltage and speed of the motor 21. The anode 546a is connected by wire 551 to the junction of resistors 547a, 547b of a voltage divider comprising resistors 547a, 547b, 547c, connected in series between the control voltage bus 393 and the ground bus 306. The cathode 546b is connected to the wire 485, which wire may be connected to any one of several speed controlling potentiometers referred to above, but which for the purpose of this description is assumed to be the slider 468a. When the voltage of the grid 546c is made less negative with respect to its cathode, the current transmitted by the valve 546 is correspondingly increased, and, since this current flows through the resistor 547a, the voltage drop across this resistor is correspondingly increased, and consequently the voltage of the grid 543c which is connected to the junction of resistors 547b, 547c through current limiting resistor 548 is correspondingly decreased so that the current transmitted by valve 543 is decreased and the armature voltage and speed are correspondingly decreased. Thus, increasing the conductivity of electric valve 546 has the effect of decreasing the voltage supplied to the armature 456 of motor 21 and, conversely, decreasing the current transmitted by electric valve 546 has the effect of increasing the voltage supplied to the armature 456.

Since the lower terminal of resistor 547c and one electrode of tube 396 are connected together to the ground bus 306, and since the upper terminal of resistor 547c is connected to the grid 543c and the upper electrode of valve 396 is connected to the cathode 543b, the valve 543 compares the voltage drop across the resistor 547c with the voltage drop across the tube 396.

If the armature voltage or a portion of the armature voltage is impressed on the grid 546c, an increase in armature voltage will increase the conductivity of valve 546 thereby decreasing the conductivity of valve 543 and decreasing the output of thyratrons 462, 463, and thereby correcting the increase in armature voltage. If the armature voltage decreases, the reverse action takes place and the decrease in armature voltage is corrected. The position of the slider 468a on the armature speed control potentiometer 468, which is connected in parallel across the voltage regulating tube 396, determines the percentage of the total voltage drop thereacross which is to be derived and used as a preset indication of speed. The voltage that is so derived and used as a reference voltage is the voltage between the slider and the negative bus 306. Since the cathode 546b of the valve 546 is connected to the slider 468a, then the position of the slider will determine the voltage of the cathode relative to the negative bus 306. A signal voltage is derived from the armature voltage by means of a voltage divider connected at one end to the wire 505 which comprises resistors 549a, 549b and that portion of a resistor 550 between a variable slider 550a thereon and the negative bus 306. The signal voltage used is the voltage from the junction point of the resistors 549a, 549b to the negative bus 306, and this signal voltage is impressed on the grid 546c of valve 546 through a suitable current limiting resistor. Thus the grid-to-cathode voltage of the valve 546 is the difference between the signal voltage and the voltage from the slider 468a to the negative bus 306. The tendency of the circuit will be to maintain the signal voltage approximately equal to the reference voltage, i. e., the voltage from the slider 468a to the negative bus 306. Hence, the armature voltage and the speed of the motor will be approximately proportional to the reference voltage tapped off by the slider 468a of the speed control potentiometer.

The voltage selected by the position of the slider 468a is a portion of the constant voltage drop across the glow tube 396 and is therefore constant. As the slider is moved from a position near the ground bus 306 potential to a position toward the potential of the bus 395, the preselected speed levels are progressively increased.

For the purpose of varying the saturating current of the field saturable reactor 515, a pair of electric valves 552, 553 corresponding, respectively, in function to the valves 543, 546 of the armature control, is provided. The electric valve 552 has an anode 552a, a cathode 552b, and a control grid 552c, and similarly the valve 553 has an anode 553a, a cathode 553b, and a control grid 553c. For the purpose of varying the saturating current, the anode 552a is connected to the positive control voltage bus 393 through the wire 554 and the saturating coil 531 of the saturable core reactor 515, while the cathode 552b is connected directly to the cathode return bus 395, placing the valve 552 in series with the saturating coil 531 across the voltage supply buses 393, 395 whereby any current flowing in the valve also flows in the saturating current winding 531. The control grid 552c is connected through a current limiting resistor 555 and wire 556 to the junction of resistors 557b, 557c of a voltage divider comprising the resistors 557a, 557b, 557c connected in series between the positive control bus 393 and the negative control bus 306. Here, as with the armature control valve 543, the voltage divider is so proportioned that the voltage applied to the control grid 552c with respect to the cathode 552b is of such a value that the valve 552 is conducting a sufficient amount of current to saturate the saturable core reactor 515. The anode 553a of the valve 553 is connected through the wire 558 to the junction of the resistors 557a, 557b. The cathode 553b may be connected through wire 487 to the sliders on any one of the field voltage control potentiometers, which for the purposes of describing this preferred embodiment has been assumed to be the slider 469a on the field voltage potentiometer 469, which potentiometer is connected in series with a variable resistance 559 between the signal voltage control bus 409 and the ground bus 306. The grid 553c is connected through a resistor 560 to the junction of resistors 561a, 561b, which comprise a voltage divider connected from the field voltage supply wire 496 to the ground bus 306. As shown, an additional resistor 562 and a capacitor 563 are connected in series between the grid 553c and the wire 558 which tends to stabilize the current in the valve 553, reducing the effects of sudden voltage surges. The valves 552, 553 operate to compare the voltage across the field winding 458 or a selectable portion thereof with an adjustable reference voltage which is derived from the voltage of the glow tube 396 by means of the position of the slider 469a on the field weakening potentiometer 469. The difference between the signal voltage derived from across the field winding by the voltage divider circuits 561a, 561b is impressed on the grid-cathode circuit of the valve 553 and compared with the difference between the voltage on the slider 469a and the ground bus 306 in such a manner as to always maintain these voltages the same. That is, as the field voltage increases, the voltage on the grid 553c is less negative and the conductivity of the valve 553 increases, resulting in an increase of current flowing therethrough. This increase of current flows through the resistor 557a and increases the voltage drop thereacross and decreases the voltage on the grid 552c, thereby decreasing the conductivity of the valve 552, decreasing the saturation of the field saturable reactor 515 which acts to decrease the voltage supply to the field winding. Conversely, a decrease in the voltage across the field winding will have the effect of decreasing the conductivity of the valve 553, thereby decreasing the voltage drop across the resistor 557a, increasing the voltage on the grid 552c, and increasing the conductivity of the valve 552. This increase of conductivity increases the saturation of the saturable core reactor and increases the field voltage. Thus, by adjustment of the slider 469a, the field current may be made to vary from a maximum to a minimum, which minimum is limited by the adjustable resistor 559 connected between the negative terminal of the potentiometer and the ground bus 306, making it impossible for the voltage in the cathode 553b to ever be reduced to zero when this potentiometer is selected for control of the speed of the motor 21. The resistor is made adjustable in order to compensate for different capacity or type motors used for the head or saddle drive.

If it should be desirable to use field current rather than field voltage as the signal voltage, this may be done by substituting a voltage proportional to current for that portion of the field voltage which is impressed on the grid circuit of the electric valve 553.

In the embodiment of the invention shown, the armature speed control potentiometer 468 and the field weakening control potentiometer 469 each preferably comprises a resistance portion and a non-resistance portion or contact strip arranged circumferentially and on which rotatable sliders 468a, 469a, respectively, make contact as they are rotated, tapping off greater or less portions of the voltage across the valve 396 as the case may be when they are in contact with the resistance portion and a constant voltage equal to the voltage on the wire 395 when in contact with the non-resistance portion. As stated, the sliders are mounted on a common shaft and so oriented that with the speed control knob 273 in the zero position, they will also be in the zero speed position, which position is such that the field has full voltage applied thereto and the armature has no voltage applied thereto; or, in other words, the armature voltage control slider 468a is at the potential of the ground bus 306 on the resistance portion of its potentiometer while the field voltage control slider 469a is at the potential of the signal voltage control bus 395 or, in other words, on the non-resistance portion of the potentiometer. As the speed control knob 273 is initially advanced from the zero or minimum speed position, the field voltage control slider contacts the non-resistance portion of its potentiometer maintaining the field voltage constant at its full value, while the armature voltage control slider contacts the resistance portion of its potentiometer and taps off more and more of the voltage standard across the tube 396 thereby supplying the armature with more and more voltage and causing the armature 456 to rotate at greater and greater speeds. When the speed control knob 273 is moved beyond approximately the half way point so as to further advance the speed of the motor 21, the armature voltage control slider contacts its non-resistance portion and the armature receives its full voltage, while the field voltage control slider contacts its resistance portion and taps off less and less of the voltage standard across the tube 396, thus supplying the field with less and less voltage and causing the speed of the motor to become greater and greater within the limits permitted by the resistor 559.

For the purpose of limiting the armature current to a maximum permissible value, means are provided for comparing a signal voltage derived from the anode current of the armature thyratrons with a reference voltage and utilizing the difference of these signal and reference voltages to control both the armature and field thyratrons in such a manner as to limit the armature current to the desired value. These means are illustrated as comprising the anode current transformer 498, the bi-phase rectifying electric valve 562, and control amplifier valves 563, 564. As shown, the two primary windings 501, 497 of the anode current transformer 498 are connected in series with the anode circuits of each of the armature thyratron valves 462, 463 and this transformer is polarized in such a manner that when one of the armature thyratrons conducts, the flux in the core is in one direction, and when the other thyratron conducts, the flux is reversed. As a result, an alternating current voltage is induced across the secondary winding 565 and the magnitude of this induced voltage will be determined by the resistance load connected to the secondary and by the turn ratio between primary and secondary windings. A non-linear resistance 566 which is similar to the non-linear resistances 309, 310 is connected between a midtap and one outer terminal of the secondary winding to absorb the voltage surges which are induced in the secondary winding when the load current changes abruptly. A resistor 567 which is connected between the same midtap and the other outer terminal of the secondary winding 565 determines the magnitude of the alternating current voltage that will be developed for a given direct current in the armature circuit. This alternating current voltage is applied to the anodes 562a, 562b of an electric valve 562 rectified, and appears as a positive direct voltage at the cathode 562c connected to the ground bus through wire 568 and a voltage divider comprising the resistance element of potentiometer 470 and resistor 569. The negative direct voltage on the midtap is connected to the ground bus 306 through wire 570 and the resistance element of potentiometer 558.

The electric valves 563, 564 are provided with anodes 563a, 564a, cathodes 563b, 564b, and grids 563c, 564c, respectively. The anode 564a of valve 564 is connected to the wire 551 and junction point between the sections of the voltage divider to which the grid of valve 543 is connected, and the cathode 564b is connected to the cathode return bus 395. The anode 563a is connected to the conductor positive control voltage bus 393 through resistor 571 and the cathode 563b is connected to the wire 556 and is normally at the same direct potential as the grid 552c of the field control valve 552, which wire, as shown, is connected to the junction point between the resistance sections 557b, 557c. The ratio of the resistance sections 557a, 557b, 557c is such that the voltage of the cathode 563b is slightly more negative than the voltage of cathode 564b. The grids 563c, 564c are connected to wire 489 and the slider 470a of the potentiometer 470 through current limiting resistors 572, 573, respectively, and wire 574, in series with a second current limiting resistor 575. Grid 564c is also connected with its anode through resistor 576 in series with a capacitor 577 and wire 551, while the grid 563c is connected to wire 558 through a resistor 578 in series with a capacitor 579.

When small amounts of current flow in the armature circuit, the voltage developed across the secondary of the current transformer 498 and the voltage rectified by the valve 562 will be so small that the portion which is utilized as a signal voltage, i. e., the voltage between the slider 470a and the negative bus 306, will be substantially less than the voltage across the tube 396, and consequently the grids of the valves 564, 563 will be very much negative with respect to their cathodes 564b, 563b. An increase of armature current will cause the voltage across the secondary of the current transformer to increase, and the voltage rectified by the valve 562 will increase correspondingly so that the voltage between the slider 470a and the negative bus 306 will ultimately reach a value approximately equal to the voltage across the valve 396 and the negative grid voltage of valves 563, 564 will be reduced to the value at which these valves begin to conduct current.

When valve 564 conducts current, it has the same effect as if valve 546 were conducting current, which is to decrease the current conducted by valve 543 and thereby decrease the saturation of the armature saturable reactor 511 and decrease the voltage supplied to the armature.

The operation of valve 563 is slightly different in that its cathode is connected to the grid of valve 552 instead of to the cathode, and its anode is connected through a resistor 571 to the positive bus 393. When the grid of valve 563 is made sufficiently less negative to cause current to flow in the anode circuit, the effect of current flow through valve 563 is to raise the voltage of the junction point of resistors 557b, 557c to which the grid 552c of valve 552 is connected. This has the effect of increasing the conductivity of valve 552 with the result that the field 458 of the motor 21 will be strengthened if it has been in a field weakened condition. Since the cathode 563b of valve 563 is more negative than the cathode 564b of valve 564, the valve 552 will be controlled slightly ahead of valve 543, with the result that the field will be strengthened before the armature voltage is decreased.

In a typical installation, the current limit control may be set, by adjustment of the slider 47a, for 150 per cent normal full load current. In this case, the current limit control will be inactive up to approximately 150 per cent full load current because that portion of the direct current voltage proportional to armature current between the slider 470a and the negative bus 306 is less than the voltage drop across the valve 396 with which it is being compared. Therefore, the grids of valves 563, 564 will be very much negative with respect to their cathodes and these valves will be cut off. To allow for a range of adjustment, the resistor 470 is made in the form of a potentiometer with the resistance element circumferentially arranged and the circuit in which it is included is so designed that with the slider at the junction point between resistors 470, 569, maximum voltage must be produced across the secondary of the current transformer 498 before the voltage between the slider 470a and the negative bus 306 will be sufficiently near equality with the voltage drop across the valve 396 to effect control of the valves 563, 564. With the slider 470a at the opposite end of the resistor, only the minimum value of voltage need be developed across the secondary of the current transformer to control the valves 563, 564. The slider 470a may be rotated by the speed control knob 273 and so oriented that as the knob is advanced toward the zero speed position the maximum armature current is reduced, preventing overheating of the armature at low speeds when there is very little windage for cooling purposes.

For the purpose of accurately maintaining the speed of the motor 21 at the level which is preset upon the speed controlling potentiometers 468, 469, means are provided for compensating for the RI drop in the armature circuit. In effect, these means subtract an increment of voltage from the armature terminal voltage so that the resultant voltage which is used as a signal of speed is approximately equal to the countervoltage of the motor. That is to say, to hold constant armature countervoltage is to hold constant speed, and this is possible when the armature terminal voltage is increased by an amount equal to the RI drop of the armature circuit.

The potentiometer 550 serves to subtract the increment of voltage from the terminal voltage of the motor. The slider 550a of this potentiometer is connected to the negative end of the armature voltage dividing resistance network resistors 549a, 549b. The voltage across resistor 550 is proportional to the armature current. The end of resistor 550 which is connected to the negative bus 306 is positive, and the end connected to the midtap of the secondary winding 498 of the current transformer is negative so that the slider is always negative with respect to the negative bus 306, and this negative voltage is added at the lower end of resistor 549b. The circuit functions in such a manner that as the armature current increases, the voltage of the lower end of resistor 549b is made more negative with respect to the negative bus 306, thus tending to make the junction point between resistors 549a, 549b negative with respect to the voltage of the slider 468a. This has the effect of decreasing the conductivity of the valve 546 and thereby increasing the armature voltage.

This voltage must increase to such an extent that the voltage of the grid of valve 546 is raised to the level at which it operated before the lower terminal of the resistor 549b was made negative by the voltage drop between the negative bus 306 and the slider 550a. Thus, an increase of current through potentiometer 550 has a tendency to make the grid 546c negative, and that tendency causes an increased armature voltage to re-establish the voltage of the grid at its former level. Since the voltage drop across the resistance 550 is proportional to armature current and since the RI drop is also proportional to armature current, it is possible by adjustment of the slider 550a to select the voltage drop which will cause the armature terminal voltage to be increased by an amount equal to the internal RI drop of the motor plus the RI drop of all connecting leads.

When a motor is operated at rated armature voltage and at maximum rated field current and is carrying rated full load, it is said to be operating at base speed. If it be assumed that the motor 21 is being operated in the field weakened range, e. g., three times base speed, and if then the speed controlling potentiometers 468, 469 are suddenly changed to a position of lower speed, e. g., one-half base speed, the control would function to decrease the voltage supplied by the armature thyratrons 462, 463 and to increase the voltage supplied to the field winding by the field thyratrons 460, 461, as a result of the action of electric valves 543, 546 and 552, 553, respectively. With the motor running at three times base speed and full field applied as quickly as the time constant of the magnetic circuit will permit, the tendency is for the armature countervoltage to increase to a value which is approximately three times full terminal voltage, i. e., 750 volts in the case of a 250-volt motor. To prevent such an undesirable increase in the armature voltage, an additional electric valve 581 is provided. This valve is provided with an anode 581a, a cathode 581b, and a grid 581c. The anode 581a of this valve is connected to the junction point of the resistors 557a, 557b through wire 558, and the cathode 581b of valve 581 is connected to the conductor 395. The grid 581c of valve 581 is connected through the current limiting resistor 583 and wire 584 to the junction point of two resistors 582a, 582b which constitute a voltage divider connected in series across the armature supply bus 505 of motor 21. As thus connected, this valve 581 measures a fixed portion of the armature voltage, and when this portion exceeds the voltage drop across the reference voltage valve 396, the valve 581 becomes conducting, thereby increasing the voltage drop across the resistor 557a and decreasing the voltage of the grid 552c of valve 552 to prevent the saturation of the saturable reactor 515 which controls the field thyratrons 460, 461. The action of valve 581 upon valve 552 is very similar to the action of valve 553 except that the valve 581 receives its voltage signal from the armature circuit, whereas the valve 553 receives its voltage signal from the field circuit. Thus, valve 581 acts as a cross connection between the armature circuit and the field circuit to prevent the field thyratrons 460, 461 from increasing the field strength to a point at which the armature voltage would exceed a safe limiting value. In practice, this limit of armature voltage would be set at some value between 300 and 350 volts for a motor whose operating voltage is 250 volts. At voltages below the voltage limit setting, the grid of valve 581 is rendered inactive because its grid voltage is very much negative relative to its cathode.

In order to prevent the motor 21 coasting for a long time at high speed when the speed controlling knob 273 is moved from a high speed position to a low speed position, means are provided for dynamically braking the motor from the higher speed level to the lower speed level. These means are illustrated as comprising an electric valve 585 and a contact DBY1 controlled thereby for completing a dynamic breaking circuit through the resistor 586 in parallel with the armature. The electric valve 585 is provided with an anode 585a, a cathode 585b, and a control grid 585c. The anode-cathode circuit extends from the positive direct current control bus 393 through the operating coil of a relay DBY to the anode 585a and from the cathode 585b to the cathode return bus 395. The grid 585c of valve 585 is connected through a current limiting resistor 587 and wire 588 to an intermediate point on the resistor 547b, the value of the voltage applied to the control grid 585c being such that for normal and steady operation of the motor 21 sufficient current flows in the anode circuit to energize the relay DBY and maintain the normally closed contact DBY1 open. If at any time the grid potential on the valve becomes sufficiently negative, the anode current will be substantially cut off and the relay DBY de-energized whereby the normally closed contact DBY1 will close and connect a dynamic braking resistance 586 across the armature terminals, the circuit being traced from the wire 506, the normally closed contact DBY1, wire 589, and thence through the dynamic braking resistor 586 to the wire 507. In the embodiment shown the grid 585c will be driven negative and the relay DBY de-energized when the speed control knob 273 is rotated suddenly from a high speed to a low speed position, at which time the grid of the valve 546 will be quite positive with respect to its cathode and will draw relatively large amounts of current through the resistor 547a.

In the embodiment shown, a time delay relay TD is connected across the low voltage terminals 307, 308 of the supply transformer 294, the purpose of which is to allow time for the initial heating of the cathodes of all of the electric valves before power is applied to their anode circuits.

The switches on the pendant for selecting and controlling the direction of feed of the movable members of the boring mill are all preferably of the push button type having a pair of normally closed contacts and a pair of normally open contacts.

To place the system in operation, the contacts 297, 300 are first closed connecting the source of alternating current voltage to the primary 295 of the power supply transformer 294 and simultaneously energizing the time delay relay TD and the cathode heating circuits. After a predetermined length of time, which should be sufficient to allow all cathodes to reach their full operating temperature, the time delay relay TD closes its normally open contacts TD1, TD2, TD3, completing the circuit from the field supply electric valves 312, 313; 460, 461; 460', 461' to the fields 291, 458, 458', respectively, of each electric drive motor through the energizing coil of the respective field protective relays FEX, FEY, FEZ. The energization of these protective relays closes normally open contacts FEX1, FEY1, FEZ1, completing the circuit from the low voltage tap 307 through the wire 350, normally closed contact OLX1, wire 354, the now closed contacts FEX1, FEY1, FEZ1, the wire 352, the "Power on" light 590 which illuminates the "Power on" signal 281 in the pendant R, and the wire 356 to the other low voltage terminal 308. The contacts OLX1, FEX1, FEY1, FEZ1 are in series with the energizing wire 352 for all of the control circuits which, as will be subsequently described, control the starting and stopping of all of the motors and the speed thereof. Interruption of the field excitation of any one of the motors or excessive overload of the spindle motor armature 290 thus effects a complete shutdown of the machine tool, preventing damage which might otherwise occur. The contacts FEY1, FEZ1 might well be placed otherwise so that in the event of the failure of field excitation for their respective motors they would only interrupt the operation of that one motor. With the contacts so placed, the operator of the machine has a visual signal as to when the fields of all of the feed and spindle drive motors are excited and when the machine is ready for operation. This alternative arrangement has been embodied in the armature current overload relays wherein overload of the spindle motor armature effects an opening of the normally closed overload contact OLX1 of the overload relay OLX which stops the whole machine, while overload of either of the armatures of the feed motors 21 or 90 effects an opening of either the normally closed contact OLY1 or OLZ1 which are so positioned in the control circuit that, when opened, only the feed motors are stopped from further operation.

Energization of the wire 352 energizes the wire 519 through the normally closed overload contact OL1, wire 358, and the normally closed contacts of the stop switch 252.

If it be assumed that it is desired to operate the spindle motor 124 in the forward direction, the speed thereof at which it is desired to operate it is first set by rotating the spindle speed controlling knob 254 to the desired speed, which positions the slider 292a and the slider 293a on their respective potentiometers such that the field 291 will receive the proper amount of energization for that speed and so that the armature will when energized receive the proper amount of voltage for that speed when energized. For the purposes of illustration it will be assumed that it is desired to operate the spindle motor 124 above its base speed, i. e., in a field weakened condition, the field then receiving a voltage less than its rated or normal voltage.

To start the spindle motor in the forward direction, the forward push button switch 251 is depressed, completing a circuit from the wire 519, the energization of which has previously been traced, through the normally closed gear jog switch 591, the normally closed contacts of the jog forward switch 253, wire 592, the normally closed contacts of reverse push button switch 250, wire 593, the now closed contacts of forward push button switch 251, wire 594, and thence through the energization coil of relay MF to the wire 356. In response to energization, the relay MF closes the normally open contacts MF1 through MF8, comprising main armature contacts MF1, MF2 and normally open interlock contacts MF3, MF4, MF7, MF8, and opens its normally closed contacts MF9. Main contacts MF1, MF2 in closing complete a circuit from the armature supply bus 333 through the armature 290 to the ground bus 396. Since the slider 293a is on the maximum voltage position, the valve 398, if its anode-cathode circuit were completed at this point in the operation, would be fully conducted and the armature thyratrons 314, 315 would tend to supply maximum voltage. The anode circuit of valve 398, however, is open at the contact ACX3 of the anode contact energizing relay ACX. Consequently, the phase of the grid voltage of the armature thyratrons 314, 315 is fully retarded so that when the contacts ACX1, ACX2 are subsequently closed, the output of armature thyratrons starts from a minimum value. If the anode circuit of the valve 398 were completed and the grid voltage of the armature thyratrons fully advanced when the contacts ACX1, ACX2 were closed, the armature current for the first few cycles might be undesirably high until sufficient voltage had been built up through the current transformer 324 to initiate the operation of the current limiting valves 426, 427.

The closing of contact MF4 completes a circuit from the wire 594 through the normally open contact MF4, the wire 360, thus energizing the alternating current winding 342 of the saturable core reactor 343, to the remainder of the circuit which has previously been traced.

Contact MF3 completes a holding circuit in parallel with the normally open contacts of push button switch 250 from the wire 593 to the wire 594, thus maintaining the relay MF energized when the push button switch 250 is released.

The closing of normally open contact MF8 completes a circuit from the wire 519 through the normally closed contacts of the "stop all feed" switch 254, wire 518, the normally closed contacts SFO1, SF1, and thence through the now closed normaly open contact MF8 to the wire 530 and in turn 517, which wire supplies the energization for the control circuits for the motors 21, 90. Thus, the contact MF8 provides an interlock in conjunction with the contact MR8 which will be referred to hereinafter, preventing operation of the feed motors 21 or 90 unless the spindle motor is energized.

Contact MF7 in closing completes a circuit from the wire 519 through the now closed normally open contact MF7, the wire 595, and the energization coil of the anode contacting relay ACX to the wire 356.

In response to energization, the anode contacting relay closes its normally open contacts ACX1, ACX2, ACX3, ACX4 and opens the normally closed contact ACX5. Closing of contact ACX4 completes a holding circuit for the relay ACX from the wire 519 to wire 595. The contacts ACX1, ACX2 in closing complete the anode circuits of the armature thyratrons 314, 315, and contact ACX3 in closing completes the direct current saturating circuit of the armature saturable reactor 343 through the valve 398, and thus armature current is allowed to build up at a time rate determined by the inductance of the direct current winding 386 of the armature saturable reactor 343.

Prior to the opening of the normally closed contact MF9, the junction point between the resistors 433, 434 is connected through the normally closed contacts MR9, MF9 in series to the control voltage bus 393. As a result a positive voltage is applied to the grids of the armature current limiting control valves 426, 427 so that the circuit is given the impression of operating under conditions of excessive armature current and the control valves tend to de-saturate the armature saturable reactor 343 and to saturate the field saturable reactor 346. When the normally closed contact MF9 is opened this false signal circuit is interrupted, and after the contacts MF1, MF2 have closed the armature current is allowed to build up at a rate determined by the inductance of the direct current winding of the armature saturable reactor 343.

As a result of the completion of the armature circuit the motor begins to accelerate to a speed determined by the setting of the speed control potentiometers. During acceleration, before the armature countervoltage has built up to a value corresponding to the preset speed which it is desired to maintain, the phase of the grid voltage of the armature thyratrons tends to be fully advanced, and hence the armature thyratrons tend to supply a current to the armature which is many times full load value. The current limiting control, however, acting through valves 426, 427 decreases the output of the armature thyratrons to the value determined by the setting of the slider of the current limiting potentiometer 433. If during acceleration the field control has been set for a speed in the field weakening range, as assumed, then the current limit control acting through valve 427 will tend to maintain full field voltage until the armature current tends to fall below the preset limiting value. Thus, during acceleration to preset speed within the field weakening range, the armature voltage is first allowed to build up at a rate determined by the load on the motor and by the value of the armature current which has been set upon the current limiting potentiometer 433 until full armature voltage is reached. At this point, there is a tendency for the armature current to tend to decrease. This tendency, however, will make the grid voltage of the valve 427 more negative thereby decreasing the conductivity of the valve and making the voltage of the grid 410c of valve 410 more negative with the result that the field thyratrons 312, 313 will supply less current to the field. This results in maintaining the armature current constant until that preset field weakened speed is reached, at which point the armature current will drop to that value which is necessary to drive the load. Since the system operates to maintain the maximum permissible value of armature current during the acceleration, the load is accelerated to the preselected speed in the minimum possible time consistent with the armature current limit at which the control is set to operate.

If, while the motor is operating at the preselected high speed assumed, it should be desired to reduce the speed to a substantially lower value, the speed controlling potentiometer is moved to a lower speed position. Assuming that the new speed is less than the base speed of the motor, the control will operate to strengthen the field of the motor and to decrease the voltage supplied to the armature. With some types of load, the motor would tend to coast for some time at the higher speed after which the speed would gradually be reduced to the new preset value. Such a delay in changing from a higher speed level to a lower speed level is undesirable, and in the present control this delay is eliminated by means of the dynamic braking circuit which is under the control of the electric valve 450. This circuit functions in the following manner: When the electric valve 398 is conducting and controlling the current through the armature saturable reactor 343, the grid of valve 450 is more positive than the grid of valve 398 owing to its bias adjustment on the resistor 404b. Consequently, the grid of valve 450 will be sufficiently positive to cause valve 450 to conduct sufficient current through the energization coil of dynamic braking relay DBX to maintain the normally closed contact DBX1 open. When the speed control knob 254 is adjusted for a lower speed, the grid of valve 393 is made more negative and the grid of valve 450 becomes sufficiently negative to reduce the current through valve 450 to the value at which the dynamic braking relay DBX drops out and closes its contact DBX1 to complete a dynamic braking circuit for the armature 290 through the dynamic braking resistor 451. As a result, a large braking torque is developed and the speed of the motor is rapidly reduced to the new value. As the speed of the motor reaches the new value, the grid voltage of valve 402 is reduced to a value corresponding to the new setting of slider 293a with the result that valve 402 conducts less current so that the grid voltages of valves 398 and 450 increase. The increase in the grid voltage of valve 450 increases the current conducted by the valve 450 to the value at which the relay DBX picks up and opens its contacts DBX1 to interrupt the dynamic braking circuit for the armature.

To stop the spindle drive motor 124, the stop switch 252 on the bottom of the pendant R may be pressed inwardly or, as shown, upwardly, thus breaking the circuit from the wire 358 to the wire 519 and interrupting the circuit of the alternating current winding of the armature saturable reactor 343, which was previously traced through the normally closed contacts of the switch 252. As a result, the phase of the grid voltage of the armature thyratrons 314, 315 is retarded, thereby rendering the armature thyratrons nonconducting so that when the contacts MF1, MF2 open due to the de-energization of the energization coil of the relay MF, and the contacts ACX1, ACX2 open due to the deenergization of the energization coil of the relay ACX, the contacts will not be required to interrupt any current. As a result, the construction of the contacts MF1, MF2, ACX1, ACX2 can be of a very light relay construction. De-energization of the relay ACX also permits the normally closed contact ACX5 to close and complete the dynamic braking circuit through the resistor 451 in parallel with the armature 290. As a result a dynamic braking torque is developed which rapidly brakes the motor 124 to rest.

Should the armature 290 be subjected to an overload such that the overload relay OLX in series with the armature supply voltage bus 333 opens its normally closed contact OLX1, the alternating current circuits of both saturable reactors 348, 343 would be opened with the result that the phase of the grid voltages of both the field thyratrons 312, 313 and the armature thyratrons 314, 315 would be retarded and the armature and field currents would be reduced substantially to zero at a rate dependent upon the decay of inductance in the reactors. Opening of the normally closed contact OLX1 would also effect the de-energization of all of the operating relays, thus completely stopping all of the drive motors.

To operate the spindle in the reverse direction, which is clockwise as viewed from the work to be machined, the push button switch 250 is depressed closing its normally open contacts and completing a circuit from the wire 592 through the normally closed contacts of the forward push button switch 251, the wire 597, the now closed contacts of the push button switch 250, wire 598, and thence through the energization coil of the relay MR to the wire 356. In depressing the push button switch 250 it will be noted that the normally closed contacts thereof are opened, thus interrupting the circuit energizing the relay MF and causing it to be de-energized if it should have been previously energized. Similarly, it will be noted that if the forward and reverse push button switches are depressed simultaneously, the normally closed contacts thereof will be opened and no circuits will be completed. The energization of the relay MR closes the normally open contacts MR1 to MR8 and opens the normally closed contact MR9. The closing of contacts MR1, MR2 completes the armature circuit from the armature supply voltage bus 333 through the armature to the ground bus 366 in the opposite direction from that caused by the closing of contacts MF1, MF2, thus completing the circuit so that the armature 290 will rotate in the opposite direction. Closing of contact MR3 completes a holding circuit in parallel with the normally open contacts of the reverse push button switch 250 which may then be released and maintains the relay MR energized. The closing of contact MR4 completes a circuit from the wire 598 to the wire 360 and thence to the alternating current winding 342 of the armature saturable core reactor 343, with a result similar to the closing of the contact MF4. The closing of normally open contact MR6 completes a circuit from the wire 518 to the wire 517 in a similar manner as that described with reference to the contact MF6 and permitting energization and operation of the feed motors 21, 90. The energization of the normally open contact MR7 completes a circuit from the wire 591 to the wire 595, energizing the anode contacting relay ACX, thus closing the contacts ACX1 to ACX4 and opening the normally closed contact ACX5 which function in the same manner and in the same order as that described for the operation of the forward push button switch 251.

Should it be desired to jog the spindle motor 124 in the forward direction, the jog push button switch 253 is depressed, opening its normally closed contacts, completing a circuit from the wire 519 to wire 592, breaking this circuit, and de-energizing the relays MF or MR if they had previously been energized. Depressing of the jog push button switch 253 also closes normally open contacts, completing a circuit from the wire 519 to the wire 594 and energizing the energization coil of the relay MF, with the same sequence of events occurring as was described with reference to the depressing of the push button switch 251, thus causing the armature 290 to rotate in a forward direction at a speed as indicated by the position of the spindle speed control knob 254. Release of the jog push button switch 253 interrupts the circuit to the wire 594, de-energizing the alternating current winding 342 of the armature saturable core reactor 343 and the relay MF, thus de-energizing the armature 290 and stopping the spindle drive motor 124. It will be appreciated that normally depressing of the jog forward switch 253 after either the continuous push button switches 250 or 251 have been actuated will de-energize the holding circuit and effect stoppage of the motor 124 upon release of the switch 253.

For moving the spindle motor 124 slightly to facilitate the shifting of the change speed gears, a gear jog switch 591 positioned on the frame A is provided. Depressing of the gear jog switch 591 opens its normally closed contacts in series with the normally closed contacts of the jog forward switch, breaking the holding circuit for either the relay MF or MR if they had previously been energized and closing its normally open contacts in parallel with the normally open contacts of the jog forward switch 253, completing a circuit from the wire 519 to the wire 594 and energizing the relay MF and performing the same function as though the jog forward switch had been depressed. The gear jog switch also provides a means on the machine for stopping the spindle drive from continuous operation should the operator desire to do so.

As indicated, the spindle feed is driven by the spindle drive motor 124 through the spindle speed gears and the spindle feed change-speed gears through a solenoid operated directional clutch 193 and when the spindle is rotating may be made to feed either to the right or to the left by depressing either the push button switch 255 or 256, respectively, which energizes the clutch 193 in an appropriate manner.

Limit switches are provided to prevent the spindle from over-feeding in either direction, yet are so interlocked with the feed control buttons that if the spindle reaches the limit of its travel in one direction it still may be caused to feed in the opposite direction. In the embodiment shown, limit switch LM1 controls the limit of travel of the spindle toward the right while limit switch LM2 is adjustably positioned on the dial indicator P for providing an accurate adjustable micrometer controlled stoppage of the spindle feed at any desired position in its movement toward the right. These limit switches are normally closed, and when closed maintain the relay KA continuously energized, the circuit being traced from the wire 352, the energization coil of the relay KA, wire 601, limit switch LM1, wire 602, and thence through limit switch LM2 to the wire 356. To control movement of the spindle to the left, limit switch LM3 is mounted in the head and limit switch LM4 is adjustably positioned in the dial indicator P, and when closed maintain the relay KB energized, the circuit being traced from the wire 352, the energization coil of the relay KB, wire 603, limit switch LM3, wire 604, and thence through limit switch LM4 to the wire 356. Energization of the relay KA closes normally open contacts KA1 and KA2, while energization of the relay KB closes normally open contacts KB1 and KB2. As will be noted, contact KA1 is in series with the right hand spindle feed circuits and contact KA2 is in series with the right hand rapid traverse spindle feed circuit. Thus, de-energization of the relay KA, by opening of either the limit switch LM1 or the limit switch LM2, opens these contacts and prevents further feeding of the spindle to the right. The circuits controlling the feeding of the spindle to the left either normally or in rapid traverse are unaffected by the opening of the contacts in the relay KA, and the spindle may be made to feed continuously to the left or may be rapid traversed in that direction. Movement of the spindle to the left, however, allows either the limit switch LM1 or the limit switch LM2 to close, thus re-energizing the relay KA. Continued movement of the spindle to the left will open either the limit switch LM3 or the limit switch LM 4, de-energizing the relay KB and opening the contacts KB1 and KB2. These contacts are in series with the left hand feed control circuits and upon opening prevent further movement of the spindle to the left, either in continuous or rapid traverse feed.

Assuming that the spindle is rotating in a forward direction and its is desired to have the spindle feed out or to the right, the push button switch 256 is depressed, completing a circuit from the wire 519, the circuit to which has been previously traced, through the stop feed switch 264, wire 518, the normally closed interlock contacts HE4, SA4, CO9, TA4, wire 606, normally closed contacts of the push button switch 255, wire 607, the now closed contacts of the push button switch 256, wire 608, normally open contact KA1 which is now closed, wire 609, and thence through the energizing coil of relay SF to the wire 356. Energization of the relay SF closes the normally open contacts SF2 and SF3 and opens the normally closed contact SF1. Normally closed contact SF1 is an interlock contact and, when open, prevents the engagement of any other feed during the time that the spindle feed is in operation. Closing of contact SF3 completes the holding circuit around the normally open contacts of the push button switch 256 which may now be released. Closing of contact SF2 completes a circuit from the wire 609 to the normally closed contacts RSTR1, RST1, and the now closed normally open contact SF2 in series, wire 610, normally open contact MF5 which is now closed, wire 611, and thence through the energizing coil of relay SDA to the wire 356. Energization of the wire 608 completes a circuit through the primary 612 of a spindle indicating light transformer 613 to the wire 356 and energizes the spindle indicating light 614 in the push button switch 256. Energization of the relay SDA closes the normally open contacts SDA1, SDA3 and opens the normally closed contact SDA2. Closing of the normally open contact SDA1 completes a circuit from the wire 611 through the wire 616, the energization coil of solenoid 200, wire 617, and the energization coil of solenoid overload relay OL to the wire 356. Energization of the solenoid 200 shifts the clutch 193 into engagement with the gear 196, causing the shaft 188 to rotate and the spindle to feed outwardly in a manner as previously described.

Again assuming that the spindle is rotating in a forward direction and it is desired to have the spindle feed inwardly or to the left, the spindle feed push button 255 is depressed completing a circuit from the wire 606, the normally closed contacts on the push button switch 256, the wire 619, the now closed contact on the push button switch 255, the wire 620, and thence through the energization coil of the relay SFO to the wire 356. Energization of the wire 620 also completes a circuit through the primary 621 of an indicating light transformer 622 illuminating the indicating light 623 in the push button switch 255 on the pendant R, indicating that the spindle feed out circuit has been engaged. Energization of the relay SFO closes the normally open contacts SFO2 and SFO3 and opens the normally closed contact SFO1. Opening of the normally closed contact SFO1 opens the control voltage circuit to the remaining feed switches and prevents operation thereof when the spindle feed is engaged. Closing of contact SFO3 completes a holding circuit for the relay SFO, maintaining it energized when the push button switch 255 is released and its contacts become open. Closing of contact SFO2 completes a circuit from the wire 620, the closed normally open contact KB1, normally closed contacts RST2, RSTR2, the now closed contact SFO2, wire 625, normally open contact MF6 which is now closed, wire 626, and thence through the energization coil of relay SDB to the wire 356. Energization of relay SDB closes normally open contacts SDB1 and SDB3, and opens normally closed contact SDB2. Closing of contact SDB1 completes a circuit from the wire 626 to the wire 627 and thence through the energization coil of solenoid 201, the wire 617, and through the energization coil of overload relay OL, and to the wire 356. Energization of the solenoid 201 shifts the clutch 193 to the left, causing the shaft 188 to rotate in such a direction that the spindle will move to the left.

The spindle feed in either direction may be stopped by depressing the "stop all feeds" push button switch 264 or the stop switch 252, which de-energizes the energized solenoid 201 or 202 as well as the actuating relay SF or SFO, thus breaking the holding circuit around the contacts of the push button switch which had been previously operated. In the event it is desired to stop the spindle feed, means are provided for positively insuring that the clutch 193 will shift to its neutral position, which in the embodiment of the invention shown is the only means of engaging the spindle feed. Thus, if it be assumed that the spindle is rotating in the forward direction and the spindle is feeding to the left by virtue of having pressed the push button switch 255, the normally open contact SDB3 which is now closed by virtue of the energization of relay SDB completes a circuit from the wire 352, the contact SDB3, wire 629, and thence through the energization coil of the relay PRE to the wire 356. Energization of the relay PRE closes normally open contacts PRE1 and PRE2. Limit switch LC1 is positioned on solenoid 201 and closes upon actuation thereof, completing a holding circuit for the relay PRE from wire 352, the now closed contact LC1, wire 631, the now closed contact PRE1, and wire 629. To stop the spindle feed, the stop feed switch 264 is depressed, breaking the circuit between wires 519 and 518, and thus de-energizing relay SFO, solenoid 201, and relay SDB. De-energization of relay SDB permits contact SDB2 to close, thus completing a circuit from the wire 352 through normally closed contact SDA2, wire 632, closed contact SDB2, wire 633, the now closed contact PRE2, to wire 616, thus energizing solenoid 200 and forcefully pulling the clutch 193 to the right and disengaging it. Immediately upon the clutch reaching the neutral position, limit switch LC1 is opened, thus breaking the holding circuit for the relay PRE and opening contact PRE2 and breaking the energization circuit for the solenoid 200.

In a similar manner, if the spindle is feeding to the right with the spindle motor of the spindle rotating in a forward direction, solenoid 200 and relays SF and SDA are energized with contact SDA2 open, contact SDA3 closed, and limit switch LC2 on the solenoid 200 also closed by movement of the clutch 193 to the right. Closing of contact SDA3 completes a circuit through the contact from the wire 352 to the wire 634 and thence through the energization coil of the relay PRD to the wire 356. Energization of the relay PRD closes normally open contacts PRD1 and PRD2, the former of which in conjunction with the limit switch LC2 completes a holding circuit for the relay PRD from wire 352, limit switch LC2, wire 635, contact PRD1, to the wire 634. Thus, when relay SDA is de-energized by depressing the stop feed switch 264, de-energizing solenoid 200 and allowing normally closed contact SDA2 to close, the relay PRD remains energized and a circuit is completed from wire 352 through the now closed contact SDA2, wire 632, closed contact SDB2, wire 633, the now closed contact PRD2, and wire 627, thus energizing solenoid 201 and forcefully shifting the clutch to the left until it reaches the neutral position when the limit switch LC2 is opened, breaking the holding circuit for the relay PRD and opening contact PRD2, thus breaking the energization for solenoid 201.

It will be noted that normally inasmuch as the spindle feed is driven from the spindle shaft, if the direction of rotation of the spindle 11 were reversed the direction of feed would also reverse. Means are provided, however, upon reversal of the direction of rotation of the spindle shaft, to simultaneously shift the feed clutch 193 so that the spindle will feed or continue to feed in the direction indicated or assumed. When the spindle motor 124 is caused to reverse, the relay MF is de-energized and the relay MR energized, opening the normally open contacts MF5, MF6 and closing the normally open contacts MR5, MR6. Assuming that the spindle is feeding towards the right, the opening of normally open contact MF5 breaks the circuit to the relay SDA, allowing contact SDA1 to open and de-energizing solenoid 200. Closing of contact MR6 completes a circuit from the wire 610 to the wire 626 and thence through the energization coil of relay SDB to the wire 356. Energization of the relay SDB closes normally open contact SDB1, opens normally closed contact SDB2, and closes normally open contact SDB3. Closing of normally open contact SDB1 completes a circuit from the wire 626 through the wire 627, through the energization coil of solenoid 201, wire 617, through the overload relay OL, to the wire 356. Thus, the clutch 193 is shifted to the opposite side causing the spindle to continue to feed in the same direction, notwithstanding the fact that the spindle rotation has been reversed.

Similarly, if the spindle has been feeding to the left by virtue of the push button switch 255 having been operated and the direction of rotation of the spindle motor 124 is shifted from a forward direction to a reverse direction by de-energizing the forward motor controlling relay MF and energizing the reverse motor controlling relay MR, the contact MF6 is opened, breaking the energization circuit for the solenoid 201 and relay SDB. Closing of the contact MR5 completes a circuit from the wire 625 through the wire 611, thus energizing the relay SDA which closes the normally open contact SDA1 and energizing solenoid 200, shifting the clutch to the right and causing the spindle to continue to feed in the same direction. Should the clutch fail to disengage for any reason, overload relay OL operates by virtue of the high current flowing therethrough when the solenoid core is not in the coil and opens its normally closed contact OL1, de-energizing wire 358 and stopping the spindle motor 124 from further rotation.

Depressing of the spindle feed rapid traverse push button switch 258, rapid traverses the spindle to the right by completing a circuit from the wire 606, the normally closed contacts of push button switch 257, wire 637, the now closed contacts of push button switch 258, wire 638, contact KA2, wire 639, and thence through the energization coils of the relays RS and RST to the wire 356. Energization of relay RST opens the normally closed contacts RST1 and RST2, thus breaking the circuit from the wire 608 to the wire 610 and the circuit from the wire 620 to the wire 625, respectively. The breaking of these circuits de-energizes either solenoid 200 or solenoid 201, if they may have been actuated without breaking the holding circuit for either the relay SF or SFO, if either one of them had previously been actuated. Thus the clutch 193 is shifted to neutral. Energization of the relay RS closes the normally open contacts RS1, RS2, RS3, energizing the motor 125 from a suitable source of alternating current power through wires 641, 642, 643, the now closed contacts RS1, RS2, RS3, wires 644, 645, 646, all respectively, causing the motor 125 to rotate in such a direction that the spindle will be fed rapidly to the right. Release of the rapid traverse spindle feed push button switch 256 de-energizes the relays RS and RST, thus stopping the motor 125 and permitting the clutch 193 to automatically re-engage and feed the spindle in the direction previously selected, if such had been done.

Similarly, the spindle may be cause to be rapid traversed to the left by depressing the spindle feed rapid traverse push button switch 257, thus completing a circuit from the wire 606 through the normally closed contacts of the push button switch 258, wire 648, the now closed contacts of push button switch 257, wire 649, contacts KB2, wire 650, and thence through the energization coils of relays RSA and RSTR to the wire 356. Energization of the relay RSTR opens normally closed contacts RSTR1 and RSTR2, which contacts are in series with the normally closed contacts RST1 and RST2, respectively, and perform the same function of de-energizing solenoid 200 or solenoid 201 if they had previously been energized. Energization of the relay RSA closes the normally open contacts RSA1, RSA2, RSA3, feeding energy to the rapid traverse motor 125 from the wires 641, 642, 643 to the wires 644, 646, 645, all respectively, such that the motor will rotate in a direction to rapid traverse the spindle to the left. Release of the push button switch 257 de-energizes the relays RSA and RSTR, thus stopping the spindle rapid traverse motor 125 and re-engaging the clutch 193 if such had previously been engaged by operation of either the push button switch 255 or 256.

With the above arrangement of interlocking controls, it will be seen that the spindle can be rotated in either direction by selection of the appropriate push button switch on the pendant R. Similarly, it may be made to feed continuously in either direction by selection of the appropriate push button switch 255 or 256 on the pendant R, and the direction of feed chosen although driven from the spindle feed shaft will be independent of the direction of rotation thereof. It will also be seen that the spindle may be rapid traversed in either direction regardless of whether the spindle is rotating or whether a continuous feed in either direction has previously been selected, and that upon release of the rapid traverse controlling push button switches the spindle will continue to feed in a direction previously selected if such had been done. Further, while limit switches are provided to prevent the spindle from moving too far in either direction, they are so connected that stopping of the spindle in either direction by one of the limit switches does not interfere with operation of the spindle in the opposite direction by operation of the appropriate push button switch.

If it be assumed that it be desired to move the head either upwardly or downwardly, all other feeds must be first disengaged by pressing the "stop all feed" switch 264 to disengage the spindle feed, positioning the combined control 277 to "individual" control and the saddle feed and table feed control switches 261 and 270, respectively, to the "off" position. As has been pointed out previously, the various feeds may not be operated unless the spindle is rotating, or in other words unless either main motor controlling relays MF or MR are energized, thus closing either normally open contact MF8 or MR8, completing a circuit to the head selection switch 261 from the wire 518, through the normally closed contact SFO1, wire 652, normally closed contacts SF1, wire 653, either normally open contacts MF3 or MR3, wire 630, normally closed contact OLZ1, wire 657, normally closed contact OLY1, wire 517, normally closed contact CL1, wire 658, normally closed contact CO10, wire 659, normally closed contact UC1, wire 660, normally closed contact SA8, wire 661, normally closed contact TA9, to wire 662.

Movement of the head beyond certain predetermined limits or beyond limits which may be set on the dial indicator assembly J is prevented by suitable limit switches positioned on the machine and so interconnected and interlocked into the control panel that when the head reaches the predetermined limit of its travel, further travel of the head in that direction only is prevented, the operator still being able to move the head in the opposite direction by operating the appropriate control push button switch. Assuming that the head is in a position intermediate its predetermined length of travel, limit switch LH1 on the machine and limit switch LH2 positioned in the dial assembly J are normally closed completing a circuit from the wire 352 through the energization coil of relay KC, wire 664, limit switch LH1, wire 665', and thence through limit switch LH2, to the wire 356. Limit switches LH3, LH4 control the downward movement of the head and are positioned in the head ways and head dial assembly J, respectively, such that when the head moves beyond the predetermined distance downwardly, the circuit energizing the relay KD which comprises wire 352, the energization coil of relay KD, wire 666', limit switch LH3, wire 667', limit switch LH4, and the wire 356 will be interrupted and further movement of the head in that direction prevented. As will appear hereinafter, the contact KC1 on the relay KC is so positioned as to interrupt the control circuits which move the head upwardly while the contact KD1 of the relay KD is connected such that they interrupt the circuits which control the downward movement of the head.

The head may be made to feed upwardly or downwardly by depressing either the push button switch 262 or the push button switch 263, respectively, whereby if the head feed selection switch 260 is in the "continuous" position the head will continue to feed in that direction until it reaches and operates or opens a limit switch or until it is otherwise stopped by the means described, or, if the selection switch 260 is in the "inch" position, the head will continue in the desired position only so long as the particular push button switch remains depressed. If the latter condition is desired, the selection switch 260 is moved to the "inch" position, thus completing a circuit from the wire 662, through the now closed contacts of the switch 260, to the wire 663, and through the energization coil of the relay HE to the wire 356. Energization of the relay HE closes normally open contacts HE1, HE2, HE3, HE5, HE6, HE7, HE11, and opens normally closed contacts HE4, HE8, HE9, HE10. Normally closed contacts HE4, HE8, HE9, HE10 are interlock contacts which when opened break the circuit to and prevent energization of the spindle, saddle, table, or combined feeds, respectively, even though the appropriate feed control switches on the pendant R should be subsequently erroneously or intentionally operated. Closing of the contacts HE1, HE2, HE3 completes a circuit from the sliders 468a, 469a, 470a through the wires 484, 486, 488, normally open contacts HE1, HE2, HE3 which are now closed, normally closed contacts RT1, RT2, RT3, to the cathode connecting wires 485, 487, 489, all respectively, thus placing the speed of the motor 21 under the control of the sliders just referred to and, accordingly, under the control of the speed control knob 273 on the pendant R. Closing of the normally open contacts HE5, HE6, HE11 completes appropriate circuits intermediate the contacts of the head feed push button switches 262, 263 such that when they are depressed to move the head in the desired direction, the circuits as will be described will be complete.

If it be assumed that it is desired to operate the head in the "up" direction, the speed thereof at which it is desired to operate it is first set by rotating the feed speed controlling knob 273 to the desired speed, which positions the slider 468a and the slider 469a on their respective potentiometers such that the field 458 will receive the proper amount of energization for that speed and so that the armature will receive the proper amount of voltage for that speed when energized. For the purposes of illustration, it will be assumed that it is desired to operate the motor 21 above its base speed, i. e., in a field weakened condition, the field then receiving a voltage less than its rated or normal voltage.

To start the head motor 21 in a direction such that it will drive the head upwardly, the head feed "up" push button switch 262 is depressed, completing a circuit from the wire 662, the energization of which has previously been traced, the now closed contact HE7, wire 665, the now closed contact KC1, wire 666, the normally closed contacts of the push button switch 263, wire 667, the now closed contacts of the push button switch 262, wire 668, the now closed normally open contact HE5, wire 669, and thence through the energization coil of the relay HU to the wire 356. Energization of the relay HU closes the normally open contacts HU1, HU2, HU3, HU4, HU5, HU6, and opens the normally closed contacts HU7, HU8, HU9, HU10. Closing of the normally open contact HU3 completes a circuit from the wire 667 through the now closed contact HU3, wire 670, and thence through the primary 671 to the wire 356 of an indicator light transformer 672 having its secondary connected to an indicating light 673 positioned in the "up" push button switch 262. Energization of the primary 671 illuminates this indicating light, indicating that the "up" feed has been selected. Closing of contact HU4 completes a circuit from the wire 669 to the wire 675, the now closed contact HE11, the wire 676, and thence through the energizing coil of the solenoid 40 to the wire 356. Energization of the solenoid 40 shifts the clutch H such that rotation of the motor 21 will be transmitted through the shaft 30, the clutch H, the shaft 25, and the shaft 20. Contacts HU1, HU2 in closing complete a circuit from the armature supply bus 505 through the armature 456 to the ground bus 306. Since the slider 468a is on the maximum voltage position, the valve 543, if its anode-cathode circuit were completed at this point in the operation, would be fully conducted and the armature thyratrons 462, 463 would tend to supply maximum voltage. The anode circuit of valve 543, however, is open at the contacts ACY3 of the anode contact energizing relay ACY. Consequently, the phase of the grid voltage of the armature thyratrons 462, 463 is fully retarded so that when the contacts ACY1, ACY2 are subsequently closed, the output of armature thyratrons starts from a minimum value. If the anode circuit of the valve 543 were completed and the grid voltage of the armature thyratrons fully advanced when the contacts ACY1, ACY2 were closed, the armature current for the first few cycles might be undesirably high until sufficient voltage had been built up through the current transformer 498 to initiate the operation of the current limiting valves 563, 564.

The closing of contact HU5 completes a circuit from the wire 669 through the now closed normally open contact HU5 to the wire 520, thus energizing the alternating current winding 510 of the saturable core reactor 511, to the remainder of the circuit which has previously been traced.

Contact HU6 in closing completes a circuit from the wire 517 through the now closed normally open contact HU6, the wire 675, and the energization coil of the anode contacting relay ACY to the wire 356.

In response to energization, the anode contacting relay closes its normally open contacts ACY1, ACY2, ACY3, ACY4. Closing of contact ACY4 completes a holding circuit for the relay ACY from the wire 517 to the wire 678. The contacts ACY1, ACY2 in closing complete the anode circuits of the armature thyratrons 462, 463, and contact ACY3 in closing completes the direct current saturating circuit of the armature saturable reactor 511 through the valve 543, and thus armature current is allowed to build up at a time rate determined by the inductance of the direct current winding 541 of the armature saturable reactor 511.

Prior to the opening of the normally closed contact HU7, the junction point between the resistors 470, 569 is connected by wire 680, normally closed contact HD7, wire 681, normally closed contact HU7, to the control voltage bus 393. As a result, a positive voltage is applied to the grids of the armature current limiting control valves 563, 564 so that the circuit is given the impression of operating under conditions of excessive armature current and the control valves tend to de-saturate the armature saturable reactor 511 and to saturate the field saturable reactor 515. When the normally closed contact HU7 is opened this false signal circuit is interrupted, and after the contacts HU1, HU2 have closed the armature current is allowed to build up at a rate determined by the inductance of the direct current winding of the armature saturable reactor 511.

As a result of the completion of the armature circuit, the motor begins to accelerate to a speed determined by the setting of the speed control potentiometers. During acceleration, before the armature countervoltage has built up to a value corresponding to the preset speed which it is desired to maintain, the phase of the grid voltage of the armature thyratrons tends to be fully advanced, and hence the armature thyratrons tend to supply a current to the armature which is many times full load value. The current limiting control, however, acting through valves 563, 564 decreases the output of the armature thyratrons to the value determined by the setting of the slider of the current limiting potentiometer 470. If during acceleration the field control has been set for a speed in the field weakening range, as assumed, then the current limit control acting through valve 563 will tend to maintain full field voltage until the armature current tends to fall below the preset limiting value. Thus, during acceleration to preset speed within the field weakening range, the armature voltage is first allowed to build up at a rate determined by the load on the motor and by the value of the armature current which has been set upon the current limiting potentiometer 470 until full armature voltage is reached. At this point, there is a tendency for the armature current to tend to decrease. This tendency, however, will make the grid voltage of the valve 563 more negative, thereby decreasing the conductivity of the valve and making the voltage of the grid 552c of valve 552 more negative with the result that the field thyratrons 460, 461 will supply less current to the field. This results in maintaining the armature current constant until that preset field weakened speed is reached, at which point the armature current will drop to that value which is necessary to drive the load. Since the system operates to maintain the maximum permissible value of armature current during the acceleration, the load is accelerated to the preselected speed in the minimum possible time consistent with the armature current limit at which the control is set to operate.

If, while the motor is operating at the preselected high speed assumed, it should be desired to reduce the speed to a substantially lower value, the speed controlling potentiometer is moved to a lower speed position. Assuming that the new speed is less than the base speed of the motor, the control will operate to strengthen the field of the motor and to decrease the voltage supplied to the armature. With some types of load, the motor would tend to coast for some time at the higher speed after which the speed would gradually be reduced to the new preset value. Such a delay in changing from a higher speed level to a lower speed level is undesirable, and in the present control this delay is eliminated by means of the dynamic braking circuit which is under the control of the electric valve 585. When the electric valve 543 is conducting and controlling the current through the armature saturable reactor 511, the grid of valve 585 is more positive than the grid of valve 543 owing to its bias adjustment on the resistor 547b. Consequently, the grid of valve 585 will be sufficiently positive to cause valve 585 to conduct sufficient current through the energization coil of dynamic braking relay DBY to maintain the normally closed contact DBY1 open. When the speed control knob 273 is adjusted for a lower speed, the grid of valve 543 is made more negative and the grid of valve 585 becomes sufficiently negative to reduce the current through valve 585 to the value at which the dynamic braking relay DBY drops out and closes its contact DBY1 to complete a dynamic braking circuit for the armature 456 through the dynamic braking resistor 586. As a result, a large braking torque is developed and the speed of the motor is rapidly reduced to the new value. As the speed of the motor reaches the new value, the grid voltage of valve 546 is reduced to a value corresponding to the new setting of slider 468a with the result that valve 546 conducts less current so that the grid voltages of valves 543 and 585 increase. The increase in the grid voltage of valve 585 increases the current conducted by the valve 585 to the value at which the relay DBY picks up and opens its contacts DBY1 to interrupt the dynamic braking circuit for the armature.

Release of the push button switch 262 breaks the circuit from the wire 667 to the wire 668, thus de-energizing the relay HU and interrupting the circuit to the alternating current winding of the armature saturable reactor 511 which was previously traced through the normally open contacts of the push button switch 262. As a result, the phase of the grid voltage of the armature thyratrons 462, 463 is retarded, thereby rendering the armature thyratrons non-conducting so that when the contacts HU1, HU2 open as they will due to the de-energization of the energization coil of the relay HU and the contacts ACY1, ACY2 open due to the de-energization of the energization coil of the relay ACY, the contacts will not be required to interrupt any current. As a result, the construction of the contacts HU1, HU2, ACY1, ACY2 can be of a very light relay construction. De-energization of the relay HU also permits the normally closed contact HU3 to close and complete the dynamic braking circuit through normally closed contact HD2 and the resistor 586 in parallel with the armature 456. As a result, a dynamic braking torque is developed which rapidly brakes the motor 21 to rest.

Should the armature 456 be subjected to an overload such that the overload relay OLY in series with the armature supply voltage bus 505 opens its normally closed contacts OLY1, OLY2, the alternating current circuits of both saturable reactors 511, 515 would be opened with the result that the phase of the grid voltages of both the field thyratrons 460, 461 and the armature thyratrons 462, 463 would be retarded and the armature and field currents would be reduced substantially to zero at a rate dependent upon the decay of inductance in the reactors. Opening of the normally closed contact OLY1 would also effect the de-energization of all of the operating relays for the head or saddle and table drive motors 21, 90, respectively.

If, instead of having the head feed upwardly only when the push button switch 262 is depressed, it be desired to have the head feed continuously after the push button is released, the head feed control switch 260 may be positioned in the "continuous" position thus completing a circuit from the wire 662 through the now closed contacts of the switch 260, wire 633, and thence through the energization coil of the relay HC to the wire 356. Energization of the relay HC closes its normally open contacts HC1, HC2, HC3. Closing of the contact HC1 completes a circuit from the wire 662 through the contact HC1 to the wire 663, energizing relay HE. The effect of the energization of relay HE has been discussed above. The closing of contact HC2 completes a circuit from the wire 670 to the wire 668. Thus when the head "up" push button switch 262 is depressed, energizing, as indicated above, the relay HU and closing contact HU3, a holding circuit is completed around the normally open contacts of the push button switch 262 from the wire 667, the now closed contact HU3, wire 670, the now closed contact HC2, to the wire 668, and the push button switch 262 may now be released, the relay HU remaining energized. If it be desired to have the head feed downwardly, the head down feed push button switch 263 is depressed, thus opening its normally closed contacts and de-energizing the wire 667 and the alternating current winding 510 of the armature saturable core reactor 511 such that the phase of the voltage on the grids of the thyratrons 462, 463 will be immediately retarded to the full amount and the thyratrons will cease to conduct. De-energization of the wire 667 also de-energizes the relay HU, permitting its contacts to return to normal position. The closing of the normally open contacts of the push button switch 263 completes a circuit from the wire 665, the now closed normally open contact KD1, wire 684, the closed contacts of push button switch 262, wire 685, the now closed contacts of push button switch 263, wire 686, the now closed contact HE6, wire 687, and thence through the energization coil of the relay HD to the wire 356. Energization of the relay HD closes its normally open contacts HD1, HD2, HD3, HD4, HD5, HD6, and opens its normally closed contacts HD7, HD8, HD9, HD10. Closing of normally open contact HD3 completes a circuit from the wire 685, the now closed contact HD3, wire 688, and thence through the now closed normally open contact HC3 to the wire 686, completing a holding circuit around the normally open contacts of the push button switch 263, which may now be released, and continuously maintaining the relay HD energized. Energization of the wire 688 also energizes the primary 689 of an indicator light transformer 690, thus energizing an indicator light 690 in the push button switch 263 to which the secondary of the transformer 690 is connected and indicating that the head down feed circuit is energized. Closing of contact HD4 completes a circuit from the wire 687 to the wire 675 and energizes the solenoid 40, thus engaging the armature 456 of the motor 21 as has been described above. Closing of contact HD5 completes a circuit from the wire 687 to the wire 520, with similar results to those described with reference to contact HU5. Contact HU6 performs the same function as contact HD6. Closing of contacts HD1, HD2 connects the armature 456 of the motor 21 between the armature supply bus 505 and the ground bus 306 in the same manner as the contacts HU1, HU2 but with opposite polarity. The opening of contact HD7 interrupts the false signal normally applied to the armature current limiting valves 563, 564 to which the slider 470a is connected as has been previously referred to.

To stop the motor 21, the "stop all feed" switch 264 or the "stop" switch 252 may be depressed or the head feed selection switch 260 may be moved from the "continuous" to the "off" or "inch" position, any one of which operations will interrupt the supply of energy to the wire 665 which serves as a supply bus for the head operating controls. Additionally, movement of the head feed selection switch 260 to the "inch" position opens normally open contacts HC2, HC3, thus interrupting any holding circuit which might exist around the normally and now open contacts of the push button switches 262, 263, respectively. The effect of stopping the head feed by the operation of the above enumerated switches acts in the same way as was described with reference to the push button switch 262 when its operation was described with the selection switch 260 in the "inch" position.

The head feed control circuits are so arranged that if the head should engage and open either of the up feed control limit switches LH1, LH2, thus de-energizing the relay KC, only the feed circuit controlling the upward movement of the head is interrupted, the down feed circuits remaining unaffected. Similarly, if the head should be moved downwardly so as to open the normally closed downwardly feeding limit switches LH3, LH4, de-energizing the relay KD and opening the normally open contact KD1, only the down feed control circuits are interrupted, and the head may still be made to feed upwardly by depressing the up feed selection switch 262.

With the above arrangement, complete control of the movement of the head either upwardly or downwardly or as to the rate of movement may be effected by controls positioned on the pendant R.

As was stated above, the saddle is driven from the motor 21 through the shaft 30, the clutch H, the gear 72, and the threaded feed shaft 65, the clutch H being shifted from the head feed to the saddle feed position by energization of the solenoid 41. As a consequence, for the purpose of simplification, the effect of operating the saddle control feed switches is to energize the solenoid 41, suitable interlock circuits, and the relays HU or HD, depending upon the direction of feed desired, and the circuits are so set up that when it is desired to cause the saddle to feed in either direction or in rapid traverse the operation of the relays HU and HD is completely independent of the head control push button switches. It will be appreciated that a separate saddle feed motor could be provided if desired, either using a separately controlled power supply from that provided for the motor 21 or the same.

To cause the saddle to feed either to the right or to the left, the other feed selection switches must be in the "off" position. If it be desired to operate the saddle continuously upon the selection of either the right or left feed, the feed selection switch 261 must be positioned in the "continuous" position, thus completing a circuit from the wire 517, normally closed contact CO11, wire 693, normally closed contact HE8, wire 694, normally closed contact TA8, wire 695, the now closed contacts of the feed selection switch 261, wire 696, and thence through the energization coil of relay SAC to the wire 356. Energization of the relay SAC closes the normally open contacts SAC1, SAC2, SAC3. Closing of the normally open contact SAC1 completes a circuit from the wire 695 to the wire 697 and thence through the energization coil of relay SA to the wire 356. Energization of the relay SA closes its normally open contacts SA1, SA2, SA3, SA5, SA6, SA7, SA11, and opens normally closed contacts SA4, SA8, SA9, SA10. The opening of normally closed contacts SA4, SA8, SA9, SA10 interrupts the energization circuits to the spindle feed, head feed, table feed, and combined control circuits, preventing operation thereof so long as the relay SA is energized, which as will be apparent from the diagram will be whenever the saddle feed selection switch 261 is in either the "inch" or "continuous" position. The remaining contacts in closing complete circuits through the saddle feed push button switches 266, 267 such that when these switches are depressed the saddle will feed in the appropriate direction at a speed as indicated by the position of the saddle or head feed speed control knob 273.

Movement of the saddle to the right beyond certain predetermined limits is prevented by normally closed limit switch LS1 positioned on the bed or frame A such that when the saddle reaches its predetermined limit of movement to the right the limit switch LS1 will be open. Normally closed limit switch LS2 is positioned on the dial indicator assembly K such that the stopping of the saddle in its movement to the right may be accurately controlled by appropriately adjusting the adjustable dial of the dial indicator assembly K. Movement of the saddle to the left beyond certain predetermined limits is controlled by normally closed limit switch LS3 positioned on the bed or frame A such that it will be opened upon the saddle reaching a predetermined position in its movement to the left. Normally closed limit switch LS4 is positioned on the dial indicator assembly K, with the point at which leftward movement of the saddle will open it being adjustable by suitable adjustment of the dial indicator K in the same manner as the limit switch LS2. As will appear, these limit switches are so positioned and so interlocked that when either the limit switch LS1 or the limit switch LS2 is opened upon rightward movement of the saddle, the operator may still effect a movement of the saddle to the left. Similarly, when either the limit switch LS3 or LS4 is opened by leftward movement of the saddle, the operator may still effect a movement of the saddle to the right.

If it be assumed that it is desired to have the saddle feed to the right continuously, as stated above, the saddle feed selection switch 261 is positioned in the "continuous" position. The right hand feed push button switch 266 may then be depressed, completing a circuit from the wire 695 through the now closed normally open contact SA7, wire 669, normally closed limit switch LS1, wire 700, normally closed limit switch LS2, wire 701, the closed contacts of push button switch 267, wire 702, the now closed contacts of the push button switch 266, wire 703, the now closed contact SA5, wire 669, and thence through the energization coil of the relay HU. Energization of the relay HU, as was stated above, closes normally open contact HU4, completing a circuit from the wire 669 through the now closed contact HU4, wire 675, now closed contact SA11, wire 704, and the energization coil of solenoid 41 to the wire 356. It will be noted that previously energization of the wire 675 energized the solenoid 40, whereas this time it energizes the solenoid 41. The contacts HE11, SA11 are only closed when it is desired to feed either the head or saddle respectively, and thus the relays HE and SA provide interlocks whereby the same motor and same main motor control relays HU, HD may be utilized for causing the head or saddle to feed. Closing of the contact HU11 completes a holding circuit around the normally open contacts of the push button switch 266, which may now be released, from the wire 702, the now closed normally open contact SAC2, wire 705, the now closed contact HU11, to the wire 703, thus maintaining the relay HU continuously energized. Energization of the wire 703 energizes the primary 706 of an indicating light transformer 707 having its secondary connected to an indicating light 708 positioned behind the right hand saddle feed push button switch 266, thus illuminating this push button and indicating that the saddle feed circuits to the right are engaged.

Should it be desired to cause the saddle to feed to the left, the left hand saddle feed push button switch 267 may be depressed, thus opening the normally closed contacts of that push button switch and breaking the circuit from the wire 701 to the wire 702, de-energizing the relay HU and breaking the circuits causing the motor 21 to rotate and causing the saddle to feed to the right. Closing of the normally open contacts of the push button switch 267 completes a circuit from the wire 699 through limit switch LS3, wire 710, limit switch LS4, wire 711, the normally closed contacts of the push button switch 266, wire 712, the now closed contacts of the push button switch 267, wire 713, the now closed contact SA6, wire 697, and thence through the energization coil of the relay HD to the wire 356, closing and opening respectively the normally open and closed contacts thereof and causing the motor 21 to accelerate in a direction to cause the saddle to move to the left. Closing of the normally open contact HD11 completes a circuit from the wire 712 through the now closed contact SA3, wire 714, the now closed contact HD11, to the wire 731, completing a holding circuit around the normally open contacts of the push button switch 267, which may now be released, and maintaining the relay HD continuously energized. Energization of the wire 713 energizes the primary 716 of an indicating light transformer 717 having its secondary connected to an indicating light 718 positioned behind the left hand saddle feed push button switch 267, thus illuminating this push button and indicating that the left hand feed has been engaged.

It will be noted that if the feed selection switch 261 had been positioned in the "inch" position instead of the "continuous" position, the relay SAC would not have been energized and the contacts SAC2, SAC3 would remain open, thus interrupting the holding circuits around the normally open contacts of the push button switches 266, 267 and permitting energization of the wires 703, 713, respectively, only when the respective feed push button switch is depressed.

Should it be desired to cause the table G to feed in either a forward or backward direction, it will be necessary to position the table feed control selection switch 270 in either the "inch" or "continuous" position and position the head and saddle feed switches 260, 261 in the "off" position and the combined control switch 267 in the individual control position. If it be assumed that the table feed selection switch is moved to the "continuous" position, the relay TC will be energized, the circuit being traced from the wire 517, the normally closed contact CO17, wire 720, normally closed contact SA9, wire 721, normally closed contact HE3, wire 722, the now closed contacts of the switch 270, wire 723, and thence through the energization coil of the relay TC to the wire 356. Energization of the relay TC closes its normally open contacts TC1, TC2, TC3. Closing of the contact TC1 completes a circuit from the wire 722 to the wire 724, and thence through the energization coil of the relay TA to the wire 356. Energization of the relay TA closes its normally open contacts TA1, TA2, TA3, TA5, TA6, TA7, and opens normally closed contacts TA4, TA8, TA9, TA10. Opening of normally closed contacts TA4, TA8, TA9, TA10 opens circuits to the spindle feed, head feed, and saddle feed control circuits, preventing operation of these feeding mechanisms when the table feed has been selected. Closing of the normally open contacts TA1, TA2, TA3 completes a circuit from the sliders 471a, 472a, 473a conforming in function to the sliders 468a, 469a, 470a in contact with the resistance element of potentiometers 471, 472, 473 to the wires 485', 487', 489', all respectively. The sliders 471a, 472a, 473a are all preferably ganged on a common shaft and moved over their resistance elements by rotation of the table feed speed control knob 274. Thus, energization of the relay TA connects to the means for supplying the D. C. power to the motor 90 the appropriate speed controlling potentiometers which are to control the speed of the motor 90 when the push button switches 271, 272 are operated.

Movement of the table either forwardly or backwardly beyond certain predetermined limits or beyond certain accurately adjusted limits by movement of the dial indicator M or N therefor is prevented in the backward direction by normally closed limit switches LT1, LT2 and in the forward direction by normally closed limit switches LT3, LT4. In the embodiment of the invention shown, limit switches LT1, LT3 are preferably mounted on the saddle in appropriate position such that movement of the table to the rear opens the normally closed limit switch LT1 and movement of the table to the front opens the normally closed limit switch LT3. Similarly, limit switches LT2 and LT4 are positioned on the dial mechanism M or N whereby they may adjustably be made to open at any desired position of the saddle in a backward or forward direction, respectively. Opening of either the limit switch LT1 or LT2 de-energizes a normally continuously energized relay KE, the circuit to which may be traced from the wire 352 through its energization coil, wire 738, normally closed limit switch LT1, wire 739, normally closed limit switch LT2, to the wire 356. Similarly, the circuit for energizing the relay KF may be traced from the wire 352, through the energization coil of the relay KF, wire 740, normally closed contacts of the limit switch LT3, wire 741, normally closed contacts of the limit switch LT4, to the wire 356. The relay KE has normally open contacts KE1, KE2, the former of which when opened upon de-energization of the relay prevents further feeding movement of the table to the rear but still permitting movement to the front, while the latter is positioned on the circuit for energizing the motors 21, 90 when in combined control. The relay KF has normally open contacts KF1, KF2, the former of which is positioned on the table forward feed circuits whereby when it is de-energized further movement of the table in the forward direction is prevented, and the latter of which de-energizes the combined control energizing circuits.

To operate the table in a forward direction, the forward push button switch 272 is depressed, completing a circuit from the wire 722, the now closed contact TA7, wire 726, normally closed contacts of the push button switch 271, wire 727, the now closed contacts of the push button switch 272, wire 728, the now closed contact TA5, wire 729, and thence through the energization coil of the relay TF to the wire 356. Energization of the relay TF closes normally open contacts TF1, TF2, TF3, TF4, TF5, TF6 and opens normally closed contacts TF7, TF8, TF9, TF10. Closing of normally open contact TF6 completes a holding circuit around the normally open contacts of the push button switch 272, which may now be released, from the wire 727, the now closed contact TC2, wire 731, the now closed contact TF6, to the wire 728. Energization of the wire 728 energizes the primary 732 of an indicating light transformer 733 having its secondary connected to an indicating light 734 positioned behind the push button switch 272, thus illuminating it, indicating that the table forward circuits have been engaged. Closing of the normally open contact TF3 completes a circuit from the wire 729 to wire 736 and thence through the energization coil of the solenoid 100 which actuates the clutch L, mechanically coupling the armature shaft of the motor 90 to the feed screw 93, rotation of which feeds the table in the appropriate direction.

Contacts TF1, TF2 in closing complete a circuit from the armature supply bus 505' through the armature 456' of the motor 90 to the ground bus 306 with such a polarity that when the wire 505' is energized the armature will rotate in the proper direction to feed the table forwardly. At the time these contacts close, however, the supply bus 505' is not energized due to the fact that the anode contacts ACZ1, ACZ2 are open.

The closing of contact TF5 completes a circuit from the wire 729 to the wire 520', thus energizing the alternating current winding 519' of the saturable core reactor 511'.

The closing of contact TF4 completes a circuit from the wire 517 to the wire 744 and thence through the energization coil of the anode contacting relay ACZ. In response to energization, the anode contacting relay ACZ closes its normally open contacts ACZ1, ACZ2, ACZ3, ACZ4. Closing of contact ACZ4 completes a holding circuit for the relay ACZ from the wire 517 to the wire 744. The contacts ACZ1, ACZ2 in closing complete the anode circuits of the armature thyratrons 462', 463', and contact ACZ3 in closing completes the direct current saturating circuit of the armature saturable reactor 511' through the valve 543', and thus armature current is allowed to build up at a time rate determined by the inductance of the direct current winding 451' of the armature saturable reactor 511'.

As a result of the completion of the armature circuit, the motor begins to accelerate to a speed determined by the setting of the speed control knob 274, the valves 563', 564' acting to limit the maximum amount of armature current during this acceleration as well as to maintain the field at full voltage excitation even though the position of the slider 472a on its potentiometer calls for less than full field voltage in the same manner as with the valves 563, 564 for the motor 21. Similarly, after the motor 90 has reached its operating speed, if the speed control knob 274 is then suddenly rotated to a lower speed position, the grid of the valve 585' is driven suddenly negative cutting off its anode current and de-energizing the energization coil of the relay DBZ. The normally closed contact DBZ1 closes and connects the dynamic braking resistor 566' in parallel across the armature 456', which dynamically brakes the armature 456' of the motor 90 down to the new speed now called for by the adjustment of the speed control knob 274. As the armature reaches the new speed, the grid of the valve 585' becomes more positive, allowing the current through the valve to increase and energize the relay DBZ to open its normally closed contact DBZ1.

To stop the motor 90 from rotating, either the "stop all feeds" switch 264 or the table feed selection switch 270 may be positioned in the "off" or "inch" position, thus de-energizing the wire 726 and the main operating relay TF. De-energizing the wire 726 also de-energizes the alternating current winding 510', the circuit to which was previously traced from the wire 517 through the normally open contact TA7. As a result of de-energizing the coil 510', the phase of the grid voltage of the armature thyratrons 462', 463' is immediately retarded and the thyratrons are rendered non-conducting so that when the contacts TF1, TF2 open as they will do due to the de-energization of the energization coil of the relay MF and the contacts ACZ1, ACZ2 open due to the de-energization of the relay ACZ, the contacts thereof will not be required to interrupt any current. As a result, these contacts may be of a very light relay construction. De-energization of the relay TF also permits the closing of normally closed contact TF8, completing a circuit from the wire 506' through the normally closed contact TB8, the now closed normally closed contact TF8, thence through the dynamic braking resistor 586' to the wire 507', placing the resistor 586' in parallel across the armature, thus dynamically braking the armature to a stop.

Should the armature 456' be subjected to an overload greater than the armature current limiting valves 563', 564' can handle, then the overload relay OLZ will be actuated opening its normally closed contacts OLZ1, OLZ2, thus breaking the supply circuits of both saturable reactors 511', 515' and immediately retarding the phase of the grid voltage on the armature and field thyratrons which reduces the armature and field voltage substantially to zero. Opening of these contacts also de-energizes all of the operating relays for the motors 21, 93 and completely stops the head or saddle and table feeds.

To operate the table in the reverse direction, i. e., to the rear, the push button switch 271 is depressed, opening the normally closed contacts and breaking the circuit from the wire 726 to the wire 727 and de-energizing the relay TF which, as indicated above, so energizes the motor 93 as to cause the table to feed forwardly. Closing the normally open contacts of the push button switch 271 completes a circuit from the wire 726, the now closed normally open contact KE1, wire 745, the normally closed contacts of the push button switch 272, wire 746, the now closed contacts of the push button switch 271, wire 747, the now closed normally open contact TA6, and thence through the energization coil of the relay TB to the wire 356.

Energization of the relay TB closes its normally open contacts TB1, TB2, TB3, TB4, TB5, TB6 and opens normally closed contacts TB7, TB8, TB9, TB10, which correspond, respectively, in function to the contacts TF1 to TF10. Closing of contact TB6 completes a circuit from the wire 746 through the now closed normally open contact TB3, wire 748, the now closed contact TB6, to the wire 747, completing a holding circuit around the normally open contacts of the push button switch 271 which may now be released. Energization of the wire 747 also energizes the primary 750 of an indicating light transformer 751 having its secondary connected to an indicating light 752 positioned behind the push button 271 on the pendant R. Energization of the indicating light 752 illuminates the button and indicates that that feed has been engaged. Closing of the contact TB3 completes a circuit from the wire 748 to the wire 736, energizing the solenoid 100. Closing of normally open contact TB5 completes a circuit from the wire 748 to the wire 526' with the results as previously indicated. Closing of normally open contacts TB1, TB2 completes a circuit from the armature supply bus 505' through the armature 456' with such a polarity that the armature when energized will rotate in the opposite direction to the direction caused by the closing of the contacts TF1, TF2.

In the embodiment of the invention shown, the head, saddle, and table are rapid traversed by the same motors which are used for normal feeding operations, the shift from the normal speed feed to the rapid traverse speed feed being effected without the use of change speed feed gears or other high current carrying contactors. For the purposes of illustration, it will be assumed that the head is being fed slowly but continuously in an upward direction with its speed under the control of the sliders 468a, 469a, and thus the speed control knob 273. The rapid traverse push button switch 265 is depressed completing a circuit from the wire 517, through the normally closed contact CO18, the wire 757, the now closed contacts of the push button switch 265, wire 758, and thence through the energization coil of the relay RT to the wire 356. Energization of the relay RT opens the normally closed contacts RT1, RT2, RT3, RT4, RT5, RT6, RT13, RT14 and closes the normally open contacts RT7, RT8, RT9, RT10, RT11, RT12. Opening of the normally closed contacts RT1, RT2, RT3 breaks the circuit from the sliders 468a, 469a, 470a which were previously connected to the wires 485, 487, 489 through the now closed contacts HE1, HE2, HE3, all respectively, thus disengaging from control the respective potentiometer and the speed control knob 273. Simultaneously, the closing of normally open contacts RT7, RT8, RT11 connects the sliders 481a, 481b, 482a to the wires 487, 485, 489, all respectively. The sliders 481a, 481b are adjustably in contact with the resistance element of potentiometer 481 connected between the signal voltage control bus 395 and the ground bus 306. The slider 481a is preferably so positioned on the resistance element of the potentiometer 481 such that it taps off a reference voltage corresponding to the field weakened condition of the field 458 of the motor 21, while the slider 481b taps off a reference voltage corresponding to substantially full armature voltage for the armature 456 of the motor 21. As assumed, the motor 21 has been operating at a relatively low speed so as to feed the head upwardly. The application of new reference voltages to the cathodes of the valves 546, 553 then reacts in a manner previously described to increase the speed of the motor by reducing the voltage supplied to the field 458 and increasing the voltage supplied to the armature 456. The closing of contact RT11 connects the slider 482a to the wire 489, which slider is adjustably positioned on the resistance element of potentiometer 482, connected in series between the wire 568 and the ground bus 306. As previously indicated, the wire 568 leads from the cathode of the valve 562 which rectifies a voltage proportional to the current flowing in the armature thyratron anode circuits. A portion of this voltage is fed from the slider 482a through the now closed contact RT11, to the wire 489, from where it is then applied to the grids of the current limiting control valves 563, 564, which valves act in a manner previously described to prevent excessive amounts of current flowing in the armature circuit until the motor 21 has reached its rapid traverse speed.

Preferably the position of the sliders 481a, 481b, 482a are positioned on their respective potentiometers at the time of installation of the machine and are subsequently left in this position. In this way the number of controls on the pendant R may be reduced and operation of the machine tool simplified.

Release of the rapid traverse push button switch 265 de-energizes the relay RT, disconnecting the sliders 481a, 481b, 482a from their high speed positions on their respective potentiometers and closes the normally closed contacts RT1, RT2, RT3, thus reconnecting the sliders 468a, 469a, 470a which will then supply the cathodes of the valves 546, 553 with a reference voltage corresponding to the previously selected speed of the speed control knob 273 and effecting a reduction of speed of the armature 456 from its high rapid traverse speed. If the speed differentials are sufficient, the relay DBY will drop out closing its normally closed contact DBY1 and placing the dynamic braking resistor 586 in parallel across the armature, bringing it rapidly down to the lower speed, at which time the relay DBY will again pick up and open its normally closed contact.

During the time that the rapid traverse push button switch 265 has been depressed, the holding circuit around the normally open contacts of the push button switch 262 has not been interrupted, assuming that the head has always remained within the limits set by its limit switches LH1, LH2, LH3, or LH4, and upon release of the button 265 the head will continue to feed in the direction and at the speed previously selected.

In a similar manner, if the motor 90 had been rotating so as to feed the table forward, the opening of normally closed contacts RT4, RT5, RT6 would have disconnected the sliders 471a, 472a, 473a from their respective potentiometers, thus disengaging the speed control knob 273, while the closing of normally open contacts RT9, RT10, RT12 would have connected the sliders 481c, 481d, 483a to the wires 487', 485', 489' whereby the armature 456' would have rapidly accelerated to the speed indicated by the position of the sliders 481c, 481d, with the current being limited by the position of the slider 483a on its potentiometer 483. In the embodiment shown, the same potentiometer 481 is used for providing a resistance element for the slider controlling the rapid traverse speed of the motor 21 as well as the motor 90. Only the motor 21 or the motor 90 can be rapid traversed at one time and as, when a motor is not energized or running, the grids of its control valves will be negative with respect to the respective cathodes, very little or no current for these valves will flow in the potentiometer 481 so as to effect the selected voltage reaching the slider controlling the speed of the other motor selected for rapid traverse. It will be appreciated that separate potentiometer elements could be used if desired.

In a similar manner, the potentiometers 468, 469, 470 could be combined, respectively, to the potentiometers 471, 472, 473, thus placing the speeds of the motor 21 and the motor 90 when in independent control under the control of a single speed control knob. If such an alternative construction were utilized, the contacts TA1, TA2, TA3 would provide for engagement of the sliders then used to the appropriate control valves.

Normally the control circuits for the motors 21, 90 are so interlocked that only the saddle, head, or table may be made to feed at any one time on lines of movement which may be referred to as the X, Y, or Z axes, respectively. The invention, however, contemplates the feeding movement of two or more of these machine tool elements in such a controlled manner that the resultant machining operation will be at any angle with respect to the X, Y, or Z axes, the resultant angle being directly proportional to the rate of feed of either of the elements. In the embodiment of the invention shown, the head and the table may be made to feed simultaneously at such a speed and in such a vertical or horizontal transverse direction that the resultant line of movement will be correlated with the position of and parallel to the direction indicating indicia on the direction control knob 276. To accomplish this, the speeds of the motor 21, 90 must vary, respectively, with the cosine and the sine of the angle which the direction indicating indicia makes with the vertical, measured in a clockwise direction, the sign of the quadrant being taken into consideration. The combined or resultant rate of feed in the embodiment shown is controlled by the combined rate speed control knob 275.

The invention also contemplates effecting this resultant angular movement, the control of which will be independent of any other speed control setting for the motors, such as would be obtained by adjustment of the speed control knobs 273 or 274, and yet when it is desired to operate the motors independently permitting control of their speed independent of the direction control knob 276.

In the embodiment shown, only the head and table can be operated simultaneously. As will appear, however, with suitable circuit modifications the table and saddle could be made to feed simultaneously, or, using a separate saddle drive motor and appropriate voltage supplying means therefor, the head and saddle could be made to feed simultaneously. Similarly, the head, saddle, and table could be made to feed simultaneously, thus giving three dimensional control to the operator over the relative angle of movement of the cutting tool with respect to the work to be machined.

To operate the motors 21, 90 simultaneously for driving the head and table with a resultant angle of movement through 360° as indicated by the directional selection knob 276, with a combined resultant speed as indicated by the control knob 275, the combined control selection switch 277 is moved from the individual control position to the combined control position, thus completing a circuit from the wire 517, now closed normally open contact KC2, wire 760, now closed normally open contact KD2, wire 761, now closed normally open contact KE2, wire 762, now closed normally open contact KF2, wire 763, normally closed interlock contact SA10, wire 764, normally closed contact UC2, wire 765, normally closed contact CL2, wire 766, normally closed interlock contact TA10, wire 767, normally closed interlock contact HE10, wire 768, the now closed contacts of the selection switch 277, wire 769, and thence through the energization coil of the relay CO to the wire 356. Energization of the relay CO closes normally open contacts CO1, CO2, CO3, CO4, CO5, CO6, CO12, CO13, CO14, CO15, CO16, CO19 and opens normally closed contacts CO7, CO8, CO9, CO10, CO11, CO17, CO18. Normally closed contacts CO9, CO10, CO11 have been previously referred to and are interlock contacts preventing functioning of any of the other feed control push buttons on the pendant R should they happen to be depressed either intentionally or erroneously.

In brief, when the motors 21, 90 are in combined control, the field voltage supplied to the field 458 of the motor 21 is preferably under the control of the position of the slider 477a on the potentiometer 477 connected between the control signal reference voltage bus 395 and the ground bus 306. The slider 477a taps off a portion of this reference voltage and applies it through wire 773, the now closed normally open contact CO3, and the wire 487 to the field voltage controlling valve 553.

The field voltage applied to the field 458' of the motor 90 is under the control of the position of slider 478a on the potentiometer 478 connected between the wire 395 and the ground bus 306. The slider 478a taps off a portion of the reference voltage on the poentiometer and applies it to wire 774, the now closed normally open contact CO4, and thence through the wire 487' to the field voltage controlling valve 553'. Preferably the position of each of these sliders is adjusted at the time of installation of the machine so that the maximum speed or some intermediate speed of each motor is identical.

The maximum amount of current which may flow in the armature before the current limiting valves 563, 564 commence to take over to limit the armature current is under the control of the position of slider 479a on the potentiometer 479. As shown, the potentiometer 479 is connected at one end to the wire 568 and at the other end through wire 776 and resistor 777 to the ground bus 306. The portion of the voltage between the wire 568 and the ground bus 306 tapped off by the slider 479a is applied through wire 779, the now closed normally open contact CO5, to the wire 489, and thence to the grids of the current limiting control valves 563, 564.

The maximum current which the armature 456' may conduct before the current limiting valves 563', 564' commence to act to limit the armature current is under the control of slider 480a in contact with the resistance portion of potentiometer 480, connected at one end to the wire 568' and at the other end through wire 780 and resistor 781 to the ground bus 306. The slider 480a taps off a portion of the voltage between the wire 568' and the ground bus 306 and applies it through the wire 782, the now closed normally open contact CO6, to the wire 489', and thence to the grids of the current limiting control valves 563', 564'. The sliders 479a, 480a may be adjusted at the time of installation of the machine tool and thereafter allowed to remain in this adjusted position. Preferably the maximum amount of current permitted before the current limiting action for either motor takes place should be relatively high, as any current limiting action will tend to affect the accuracy of the relative movement of the head and table relative to the position of the angular feed control knob 276.

The amount of voltage fed to the armature 456 is under the control of the position of slider 475a on potentiometer 475 and the slider 560a on the potentiometer 560. Preferably the resistance element of the potentiometer 475 is continuous through 360° and the slider 475a is rotatable in contact therewith continuously through 360°. At points 784, 785, which are preferably spaced exactly 180° apart, the resistance element is connected to the ground bus 306. At points 786, 787, which are also preferably 180° apart and spaced 90° from the points 784, 785, the resistance element of potentiometer 475 is connected through wire 788 to the slider 490a in contact with the resistance element of the potentiometer 490 connected between the wire 395 and the ground bus 306. The position of the slider 490a on the potentiometer 490 is under the control of the combined rate control knob 276, and the slider taps off a portion of the reference control voltage which is applied to the resistance element of the potentiometer 475 at the spaced points 786, 787. Thus the slider 475a as is is rotated taps off greater and less portions of the portions of the voltage tapped off by the slider 490a, depending on its angular position. When the slider 475a is in contact with the points 784, 785, it will tap off no voltage and the armature 456 will receive no voltage. When it is in contact with the points 786, 787, it will receive the maximum portion of the portion tapped off by the slider 490a. At intermediate points it will tap off proportionate portions. The speed of rotation of the motor 21 is thus under the control of both the slider 490a and the slider 475a, the portion of the portion of voltage tapped off by the latter being applied through wire 796, the now closed normally open contact CO1 to the wire 435, and thence to the cathode of the armature current controlling valve 546.

The amount of voltage reaching the armature 456' of the motor 90 is under the control of the position of the slider 476a on the resistance element of potentiometer 476, as well as the position of the slider 490a on the potentiometer 490. The construction of the potentiometer 476 is preferably identically equal to the construction of the potentiometer 475 with its resistance element preferably continuous through 360°, and its slider 476a rotatable through an arc of 360° and in contact with the resistance element. As shown, the resistance element is connected at points 792, 793 to the ground bus 306, which points are preferably positioned exactly 180° apart. The resistance element is also connected at points 794, 795 through the wire 788a to the slider 490c on potentiometer 490b, which points are also preferably spaced exactly 180° apart and from the points 792, 793 through an arc of exactly 90°. Thus, as the slider 476a is rotated, it taps off greater or less portions of the portion of the voltage tapped off by the slider 490c, which voltage is applied through wire 797, the now closed normally open contact CO2, and the wire 435, to the cathode of the armature voltage control valve 546'. The sliders 490a, 490c and the rate control knob 276 are preferably ganged on a common shaft 798, with the relative positions of the sliders being coincident, i. e., they tap off equal portions of the reference voltage.

Thus it will be seen that for rotation of the sliders 475a, 476a through an arc of 360°, each motor will have two points in the arc of rotation of minimum speed and two points of maximum speed with intermediate speeds therebetween. The sliders 475a, 476a are preferably ganged on a common shaft 799 under the control of the directional control knob 276, with the sliders so oriented that the maximum speed of one motor coincides with the minimum speed of the other and vice versa. The sliders are oriented with the indicating indicia or arrow on the directional control knob 276 such that when the indicia points vertically upward the head feed motor 21 will be rotating at its maximum speed and the table feed motor 90 is at its minimum speed or preferably stopped, and when the indicia points horizontal the table feed motor will be rotating at maximum speed while the head feed motor will be rotating at minimum speed or preferably stopped. With intermediate positions of the knob 276, the motors 21, 90 will be rotating at intermediate speeds.

The direction of rotation of the motor 21 is preferably under the control of the switch 800, which may be of the single-pole double-throw type, having up feed contacts 801 and down feed contacts 802. The effect of the contacts 801, 802 when closed is to effect operation of the relays HU, HD, which when energized close and open contacts such as to cause the motor 21 to rotate in such a direction that the head will move either upwardly or downwardly respectively. Thus when the contacts 801 are closed, a circuit is completed from the wire 517 through the now closed normally open contact CO12, wire 804, the now closed contacts 801, wire 805, the now closed normally open contact CO13, to the wire 669, and thence through the energization coil of the relay HU to the wire 356. Energization of the relay HU closes and opens its normally open and closed contacts as heretofore described. Closing of contact HU4 completes a circuit from the wire 669 to the wire 675 and thence through the now closed normally open contact CO19, wire 676, and the solenoid 49. When the contacts 802 are closed, a circuit is completed from the wire 804 through the now closed contacts 802, wire 806, now closed normally open contact CO14, to the wire 687, thus energizing the relay HD, closing and opening its normally open and closed contacts with the results which have heretofore been described.

The switch 800 is preferably of the snap action type, i. e., either the contacts 801 are closed or the contacts 802 are closed. It is preferably actuated by a cam member 808 rotatable through 360°, with a lobe of fixed radii extending for approximately 180° of the cam circumference and a dwell of lesser fixed radii extending for the other 180°. The intermediate rises are preferably spaced exactly 180°. Rotation of the cam 808 actuates the switch 800 to close the appropriate contact through a suitable follower rod arrangement 809, which is shown schematically in Fig. 13 for simplicity as the cam and switch organization may take a number of different forms.

The direction of rotation of the motor 90 is preferably under the control of a single-pole double-throw switch 810 having table forward contacts 811 and table back contacts 812. When the switch 810 is in position to cause the table to feed to the front, the contacts 811 are closed completing a circuit from the wire 804, the now closed contacts 811, wire 813, the now closed normally open contact CO16, to the wire 726, and thence through the energization coil of the relay TF, closing and opening its normally open and closed contacts with the results as have been previously described. Closing of the switch contacts 812 completes a circuit from the wire 804 through the now closed contacts 812, wire 814, the now closed normally open contact CO15, to the wire 748, thus energizing the relay TB and closing and opening its normally open and closed contacts with the results which have heretofore been stated. The switch 810 is preferably of the snap action type, of the same type as the switch 800, wherein either the contacts 811 or 812 will always be closed. The switch 810 is preferably actuated by the cam 808 through a follower rod arrangement 815 which preferably engages the cam 808 at a point spaced exactly 90° from the point of engagement of the follower rod 809 and the switch 800. Thus for 360° of rotation of the cam 808, the motors 21, 90 will have each been reversed twice. Preferably the cam 808 is ganged on the same shaft 799 with the sliders 475a, 476a, and thus under the control of the direction control knob 276 with the rise points of the cam 808 so oriented relative to the sliders that the motors will reverse their direction of rotation at the time when their respective sliders are passing through the zero or minimum speed position. The preferred arrangement is clearly shown in Figs. 14 and 15. Thus as the indicia on the knob 276 is rotated in a clockwise direction and passes through the vertical position, at which time the motor 90 will be rotating at a minimum or zero speed, the cam 808 will actuate the switch 810 to open contacts 811 and close contacts 812, thus de-energizing the table forward relay TF and energizing the table back relay TB. At this point the motor 21 is rotating at its maximum speed as determined by the combined rate control knob 275. Continued rotation of the direction control knob in a clockwise direction effects a gradual reduction of speed of the motor 21 and an increase in speed of the motor 90, which continues until the knob reaches the horizontal position pointing to the right, at which time the motor 90 is rotating at maximum speed determined by the position of the combined rate speed knob 275 and the motor 21 is rotating at minimum or zero speed. At this point, the cam 808 actuates the switch 800 to break the up contacts 801 and close the down contacts 802, effecting a reversal of polarity of the voltage applied to the armature 456, causing the armature to rotate in the opposite direction when it is subsequently energized by continued rotation of the knob 276.

As has been previously indicated, the table moves in a horizontal plane transverse to the bed or frame A, which for convenience might be referred to as the Z axis, while the head moves in a vertical plane longitudinally of the vertical spindle head column B or on the Y axis. The resultant motion of the head and table when in the combined control will thus be in a transverse vertical or the Y-Z plane, and the pendant R is preferably so oriented relative to the machine such that the face of the pendant on which the directional indicating indicia 278 on the knob 276 is marked is parallel to this plane. When so oriented as facing this side of the pendant, to the right would be to the rear of the machine. The resultant movement of the head and table will thus be parallel to and in the direction of the indicating indicia 278. If the operator desires to have the work move to the right or rearwardly and the head to move upwardly with a resultant line of movement at at relative angle of 45°, he positions the indicia 278 on the directional control knob 276 at a corresponding angle and direction, which in the embodiment of the invention shown would be between one and two o'clock. So positioning the speed selection knob would cause the sliders 475a, 476a to tap off approximately 50% of the portion of the voltage selected by the slider 490a to cause the motors to rotate at one-half the rated maximum speed preset by the combined rate control knob 275. Similarly, the head up contacts 801 of the switch 800 would be closed, causing the motor 21 to rotate appropriately to feed the head upwardly and the table back contacts 812 of the switch 810 would be closed causing the motor 90 to rotate appropriately to feed the table rearwardly. If desired, the indicia 278 on the directional control knob 276 may be so oriented that it corresponds to the relative movement of the spindle to the work rather than the actual motion of the movable elements as described. The combined rate control knob 275 varies the speed of the motors 21, 90 proportionately, thus preserving the relative rate of rotation set by the direction control knob 276.

The action of the cam 808 on the directional control switches 800, 810 in relation to the position of the direction control knob 276 is shown more clearly in Figs. 16 to 20. As shown in Fig. 16, the indicia 278 on the direction control knob 276 is horizontal and points to the left. When in such position the cam 808 has closed the table forward contacts 811, energizing the motor 90 to rotate in such a direction as to feed the table forwardly, while the slider 476a is in such a position as to rotate the motor 90 at the maximum speed permittted by the position of the slider 490c controlled by the rate control knob 275. The slider 475a is in a position on its potentiometer 475 to call for minimum or zero speed of the motor 21. With the cam 808 in the position shown, the directional contact switch 810 might be either the head up or head down position (but is shown in neither) because of its snap-action, as referred to above, and because the rise of the cam 808 is in engagement with the follower arm 815 which is the point where the switch 810 is normally actuated one way or the other. Whether the switch 810 has either its head up or head down contacts 801, 802, respectively, closed is relatively immaterial because the speed of the motor 21 is zero. Should the directional control knob 276 be moved in either one direction or the other from the position shown, the appropriate contacts 811 or 812 would close to cause rotation of the motor 21 in the appropriate direction.

In Fig. 17 the direction indicating indicia on the directional control knob 276 is directed upwardly and to the left at approximately an angle of 45° with the horizontal. In this position the sliders 475a, 476a are exactly half-way between the high and low speed positions on their respective potentiometers and call for equal speeds of rotation of the motors 21 and 90, the actual speed at which the two motors will rotate being determined by the position of the combined rate control knob 275. The cam 808 has closed the head up contacts 801 and the table forward contacts 811, energizing their respective motors for moving the head up and the table forward.

In Fig. 18 the direction indicating indicia on the angular control knob 276 points vertically. In this position the slider 476a is in such a position on the potentiometer 476 as to call for the maximum speed of the motor as called for by the combined rate control knob 275. The slider 475a is in such a position on the potentiometer 475 as to call for zero speed of the table feed motor 90. Thus only the head drive motor 21 will rotate. The head up contacts 801 of the switch 800 are closed for energizing the motor 21 for rotation in a direction to feed the head upwardly. For reasons similar to those explained with reference to the head contacts when referring to Fig. 16 above, the position of the table motor 90 directional control switch 810 is immaterial.

In Fig. 19 the direction indicating indicia on the angular control knob 276 points upwardly and to the right at an angle of approximately 45° with the horizontal. When in this position the sliders 475a, 476a are positioned on their respective potentiometers to call for one-half the maximum speed of their respective motors, as preset by the combined rate control knob 275. The head up contacts 801 on the switch 800 are closed for energizing the motor 21 to drive the head upwardly. The table back contacts 812 on the switch 810 are closed for energizing the motor 90 to feed the table to the right as viewed in the drawings or to the rear as viewed from the front of the machine.

In Fig. 20 the direction indicating indicia on the angular control knob 276 indicates a direction of feed to the right and in a horizontal direction. The slider 476a is positioned on its potentiometer 476 to call for the maximum speed of the table drive motor as preset by the combined rate control knob 275. The slider 475a is positioned on its potentiometer to call for zero speed of the motor 21. The table contacts 812 of the switch 810 are closed for energizing the motor 90 for rotation in such a direction that the table will feed to the right as viewed in the drawings or to the rear as viewed from the front of the machine.

In the embodiment shown, two resistance elements 475, 476 have been provided for controlling the voltage reaching the armatures 456, 456', respectively. It will be appreciated that a single resistance element could be provided with separate sliders insulated from each other each contacting the common resistance element at points continuously oriented 90° apart. With such an arrangement, as the sliders would never be in exactly the same quadrant of the resistance element, any current flowing through one slider could not effect the portion of the voltage which the other slider would be simultaneously tapping off of the resistance element.

Similarly, the potentiometers 490, 490b might be combined and a common slider might be provided supplying a common voltage to the wires 788, 788a whereby the combined relative rate of the speed of the motors 21 and 90 might be controlled by a single potentiometer element.

Normally the voltage output of grid control thyratron rectifiers is not linear with respect to the degree of phase shift of the voltage on the grids relative to the voltage on the anodes. Also, the phase shift of the voltage applied to the grids will generally not be linear with respect to the saturating currents in the saturable core reactors 511, 511'. In the same manner, other non-linearities will be introduced by non-linear grid voltage plate current curves, or the mutual conductance curves, of the valves. To compensate for such non-linearities, the resistance of the resistance elements of the potentiometers 475, 476 may vary non-linearly in the opposite sense. Further, in addition to compensating for the non-linearity of the voltage supply means, it is preferred that the resistance of the resistance elements vary in each 90° arc in a sinusoidal manner such that the speeds of the armatures 456, 456' for any position of the directional control knob 276 and the sliders 475a, 476a will be equal to the product of the cosine of the angle of the respective slider from its maximum or high speed position and the maximum speed permitted by the combined rate control knob 275. The proportioning of the variation of the resistance may be determined by experiment. Thus the resulting speeds and direction of rotation of the motors and movements of the head and table will be a trigonometric function of the position of the direction control knob 276 and the speeds will combine vectorially to produce a resultant direction of movement parallel to the direction indicating indicia 278 on the knob 276. In this connection it may be pointed out that the algebraic sign of the cosine function is negative in what may be termed the second and third quadrants. The rate of speed variation of the motors 21, 90 per degree of rotation of the direction control knob 276 is the same but 90° out of phase.

It will be appreciated that other methods could be utilized to reverse the direction of rotation of the motors as the movement of the directional control knob 276 moves the sliders 475a, 476a through the zero speed position for their respective motors. Thus, it is possible to use non-snap-action switches for the switches 809, 810, the position of which is controlled by the cam surface. Such switches are illustrated in Figs. 14 to 20 for simplicity. With such a type switch there would be a small arc of one or two degrees in the rotation of the cam when either the up or down actuating relays HU or HD for the motor 21 or the front or back actuating relays TF or TB for the motor 90 would not be energized. Thus the motor would be de-energized at this point. It is generally difficut and considered undesirable to operate variable speed electric motors at speeds below 50 R. P. M., and, if one of the feed drive motors 21 or 90 were stopped when the speed required to produce the relative movement called for by the directional control knob was less than 50 R. P. M., relatively small inaccuracies of control would result. At this point the other motor would be operating at approximately its maximum speed, which for most motors of the type which it is preferred to use would be approximately 1800 R. P. M. Thus, stopping the motor when the speed called for was less than 50 R. P. M. would effect a maximum angular error of plus or minus 1½°.

Alternatively, a semi-circular contact plate could be substituted for the cam 808 which would make contact with suitable contacts and energize suitable relays upon rotation of the direction control knob 276, which relays would have contacts taking the place of the head up contacts 801, the head down contacts 802, the table forward contacts 811, aand the table back contacts 812.

It will be appreciated that should it be desired to cause the head, saddle, and table to feed simultaneously, it would be preferred to use separate drive motors for each element, separate voltage supply means for each driving motor, and separate speed controlling potentiometers suitably simultaneously controlled for each voltage supply means. To obtain parallelism of the resultant line of movement with the direction indicating indicia on a suitable directional controlling means, it would be necessary to mount the knob and associated speed and direction control equipment on universal mountings with the axis of rotation of the respective speed controlling potentiometers all positioned at right angles to each other. Alternatively, the table and saddle, the saddle and head, or the spindle feed and any of the movable members could be simultaneously driven in their respective paths of movement to produce an angular path of movement of the work to be machined relative to a cutting tool suitably mounted or supported.

As was previously stated, as the head C moves upwardly and downwardly, the back rest block E moves simultaneously therewith. The head and the back rest block E may be locked in any adjusted position by actuation of the clamping lever 248, actuation of which mechanically locks the head C to the ways 9, 10 of the vertical spindle head column B and at the same time actuates a snap-action type switch 818 having a pair of contacts 819, 820, the latter of which is closed when the lever 248 is in the clamped position and the former of which is closed when the lever is in the unclamped position. Closing of the switch 820 completes a circuit from the wire 352 to the now closed switch 820, wire 821, and thence through the energization coil of relay CL to the wire 356. Energization of the relay CL opens normally closed contacts CL1, CL2, CL6, and closes normally open contacts CL3, CL4, CL5. Opening of normally closed contacts CL1, CL2 interrupts the energization circuits of the head and combined feed controls, preventing operation thereof. Closing of the normally open contacts CL3, CL4, CL5 completes a circuit from alternating current supply wires 641, 643, 642 to the wires 822, 823, 824, all respectively, which in turn energize a torque type back rest clamping motor 826, preferably of the polyphase alternating current type, causing it to rotate in such a direction as to clamp the back rest block E to the back rest column D such that the back rest block E cannot be moved vertically. Preferably the torque motor 826 remains energized whenever the lever 250 is in the clamped position. Rotation of the motor 826 to the clamping position allows normally closed limit switch LC1 to close.

Positioning of the lever 250 in the unclamped position opens switch 820 and closes switch 819, thus de-energizing the relay CL and allowing its normally closed contact CL6 to close. Closing of the contact 819 completes a circuit from the wire 352 to the now closed limit switch LC1, wire 827, the now closed contacts of switch 819, wire 828, the normally closed contact CL6, wire 829, and thence through the energization coil of the relay UC to the wire 356. Energization of the relay UC opens normally closed contacts UC1, UC2, and closes normally open contacts UC3, UC4, UC5. Closing of normally open contacts UC3, UC4, UC5 completes a circuit from the wires 641, 642, 643 to the wires 822, 823, 824, all respectively, reversing one of the phases and causing the torque motor 826 to rotate in the opposite direction and to unclamp the back rest block E. When the motor 826 has rotated a sufficient number of revolutions and has reached the unclamped position, the normally closed limit switch LC1 opens, thus breaking the energization circuit of the relay UC, de-energizing the torque motor 826 and allowing the normally closed contacts UC1, UC2 to close. The normally closed contacts UC1, UC2, are interlock contacts and their closing permits energization of the head or combined feed control circuits.

Thus is will be seen that I have described a new and improved machine taking if desired, but not necessarily, the form of a horizontal boring mill having a plurality of movable members, which performs and accomplishes the objects of the invention, provides the operator with a maximum degree of control of the movable members, has provision for accurate speed control of the various driving motors conveniently positioned relative to the operator, has a plurality of speed controls for each motor each usable without disturbing the adjustment of any other control and automatically selectable dependent on the type of speed control desired by the operator to give a maximum degree of control over the speed of movement of the movable members, has electronic valves for supplying and controlling the electrical energy for the various driving motors at a value corresponding to the desired movable member speed, and has an angular directional control for effecting a movement of the work or piece to be machined at a desired angle relative to the cutting tool or tools corresponding to the angle indicated by the directional control or preferably in parallelism therewith, or both, in conjunction with a speed control for varying the relative speed of movement of the work to be machined relative to the cutting tool or tools along the angle effected and indicated by the directional control.

For the purposes of simplicity and such brevity as is possible with a machine of the type described, the invention has been described only in a preferred embodiment. Modifications, in addition to the ones briefly alluded to in the body of this specification, differing materially in appearance, structure, type of apparatus, or method of control or operation will occur to those skilled in the arts referred to or involved in a device of this type upon a reading and understanding of the invention herein disclosed by means of the single embodiment. Such modifications without being limited thereto may comprise the use of constant speed driving motors or a single motor in conjunction with variable ratio driving transmission or linkages, either mechanical, electric, or hydraulic, and either electrically, electronically, or otherwise controlled, for varying the speed of movement of the movable members, and independent speed controls the position of which is correlated by the operator or by suitable linkages. As a further alternative construction the machine tool elements may be moved by hydraulic motors actuated by fluid supplied by a constant volume pump connected to variable speed drives controlled in the manner herein described.

As a still further alternative construction, two or more potentiometers controlling motors effecting movement between machine tool elements in paths transverse to each other, such as the potentiometers 475, 476, may be connected to a tracer control and the tool caused to reproduce a two or more, depending on the number of feed drive motors and corresponding speed controlling potentiometers, dimensional pattern on the work piece. When applied to a horizontal boring, milling, and drilling machine the spindle feed is preferably actuated by a separate motor which is one of the motors so controlled. If complete and continuous 360° control of the direction of feed is not necessary or desired, the resistance elements of the potentiometers ned not be made continuous or circular but may be formed in a straight line or in any other desired shape and one or more of the direction reversing contactors associated with the cam plate 808 omitted together with the corresponding minimum speed points on the potentiometers. It is my intention to cover such suggested modifications and others insofar as they come within the scope of the appended claims.

Having thus described my invention, I claim:

1. In a control system for a plurality of variable speed power means, variable speed controls for each means, each speed control having high, low, and intermediate speed positions of similar values for their respective power means, means interconnecting said speed controls for simultaneous adjustment and with the low speed position of one control coinciding with the high speed position of another control whereby said controls are adjusted simultaneously and effect a decrease in speed for one power means and an increase in speed for another power means and vice versa, the relative speed of said power means corresponding to the relative position of said variable speed controls, and another variable speed control means for said power means operatively associated with said first mentioned speed controls, said other variable speed control means comprising separate variable speed controls interconnected for simultaneous adjustment and having coinciding high and low speed positions for each power means whereby adjustment thereof effects similar proportional adjustments in the speeds effected by positioning of the first mentioned speed controls without changing the relative speeds of said power means.

2. In a motor control for a variable speed electric motor, a source of electrical energy, means for controlling the amount of electrical energy reaching the motor and the speed of the motor between maximum and minimum limits including a resistance element having spaced terminals connected together and to one terminal of said control means and an intermediate terminal connected to another terminal of said control means of different potential, a member adjustably in contact with said resistance element the relative position of which determines the speed of said motor, one of said resistance terminals being a point of minimum speed, another being a point of maximum speed, those interconnected being of the same speed, and means for reversing the direction of rotation of said motor as said member passes through a minimum speed position.

3. A motor control device for a pair of variable speed electric motors including means for supplying electrical energy, means for controlling the amount of electrical energy reaching said motors including adjustable control elements for each motor having maximum and minimum speed positions, means interconnecting said control elements for simultaneous adjustment and with the maximum speed position of the control element for one motor being coincident with the minimum speed position of the control element for the other motor and vice versa, and means operatively connected to said control elements for automatically reversing the direction of rotation of each motor as the control element therefor passes through its respective minimum speed position.

4. A motor control device for a pair of variable speed reversible electric motors including means for supplying electrical energy, means for controlling the amount of electrical energy reaching said motors including simultaneously adjustable rotatable control elements for each motor having maximum and minimum speed positions, means interconnecting said control elements for simultaneous adjustment and with the maximum speed position of the control element for one motor being coincident with the minimum speed position of the control element for the other motor and vice versa, said control elements effecting a variation in speed of each motor generally proportional to the cosine of the relative angle of displacement of the control elements from their respective maximum speed positions.

5. A motor control device for a pair of variable speed electric motors including a source of electrical energy, means for controlling the amount of electrical energy reaching said motors including at least one resistance element having opposite points connected to one terminal of a voltage source forming a high speed terminal and intermediate opposite points connected to another terminal of said voltage source forming a low speed terminal, spaced members for each motor in contact with said resistance element adapted to vary the speed of said motors as they are adjustably moved over said resistance element, and means interconnecting said members for simultaneous adjustment, said members being so oriented that the maximum speed position of one motor coincides with the minimum speed position of the other motor.

6. In a motor control for a variable speed reversible electric motor, a reversible rotatable combined speed and directional control member having a pair of maximum speed positions spaced 180° from each other and a pair of minimum speed positions each spaced 90° from a maximum speed position, and directional control means operatively associated with said control member for automatically reversing the direction of rotation of said motor as the control means is rotated through a minimum speed position.

7. In a motor control system for a plurality of variable speed reversible electric motors, a rotatable combined speed and directional control member having for each motor a pair of maximum speed positions spaced 180° and a pair of minimum speed positions each spaced 90° from a maximum speed position, the maximum speed position of said member for one motor being oriented 90° from the maximum speed position of said member for the other motor, and directional means operatively connected to said control member for automatically reversing the direction of rotation of said motors when said control member is rotated through the minimum speed position of that motor.

8. A motor control device for a plurality of variable speed reversible electric motors adapted respectively to drive separately movable members of a machine tool along transverse paths, a single reversible rotatable control member, control means operatively connected to said control member for controlling the resultant direction of movement of said movable members by controlling the relative speed and direction of rotation of each motor, said control means having minimum and maximum speed positions for each motor, the maximum speed positions of said control means for each motor being oriented 90° from the maximum speed position of another of said motors and from their respective minimum speed position and the variation in speed of each motor as the control means therefor is moved from a maximum to a minimum speed position varying as the cosine of the angle of displacement of the control means from the respective maximum speed position.

9. In a machine tool, the combination of a work support, a tool support, a plurality of individual variable speed reversible power means for effecting relative movement between said supports in opposite directions and in separate paths each at right angles to the other, a single control device for said power means, control means operatively connected to said control device for varying the relative speeds of a plurality of said power means for effecting relative movement between said supports in different directions, means operatively connected to said control means for maintaining the speed of said relative movement between said supports constant, and means operatively connected to said control means for changing the rate of speed at which said relative movement between said supports is maintained constant.

10. A machine tool having a frame and including a tool supporting member and a work supporting member supported thereon for relative movement in transverse directions in movable relationship to each other, in combination with variable speed power actuators for moving the members at variable and correlated speeds in their respective paths of movement whereby a desired resultant angle of movement may be obtained, speed controls for each of said power actuators, a rotatable member operatively connected to said speed controls for simultaneously adjusting said speed controls, said speed controls each having high and low speed positions spaced through 90° of rotation for said rotatable member with intermediate speed positions therebetween, the low speed position of one of said speed controls coinciding with the high speed position of another of said speed controls whereby simultaneous adjustment of said speed controls upon rotation of said rotatable member effects a decrease in speed for one of said power actuators and an increase in speed for the other of said power actuators and vice versa.

11. A machine tool having a frame and including a tool supporting member and a work supporting member supported thereon for relative movement in transverse directions, in combination with means for moving the members at variable and correlated speeds in their respective paths of movement whereby a desired resultant angle of movement may be obtained, said means including adjustable speed controls for each member, a rotatable member operatively connected to said speed controls for simultaneously adjusting said speed controls, each speed control having for its respective member a pair of high speed positions of similar values spaced through 180° of rotation of said rotatable member a pair of low speed positions of similar values each spaced through 90° of rotation of said rotatable member from a high speed position and intermediate speed positions between the high and low speed positions having values varying approximately as a function of the cosine of the angle of displacement of said rotatable member from a high speed position, the low speed position of said rotatable member for one control coinciding with the high speed position of another control whereby simultaneous adjustment of said controls by rotation of said rotatable member effects a decrease in speed for one member and an increase in speed for the other member and vice versa, the relative speeds for said members corresponding to the relative position of said rotatable member.

12. A machine tool having a frame and including a tool supporting member and a work supporting member supported thereon for relative movement in transverse directions, in combination with power means for moving the members at variable and correlated speeds whereby a desired resultant movement may be obtained, said power means including speed controls for each member, a rotatable control member operatively connected to said speed controls for simultaneously adjusting said speed controls, each speed control having high, low, and intermediate speed positions, the low speed position of one speed control coinciding with the high speed position of another speed control whereby simultaneous adjustment of said speed controls upon rotation of said control member effects a decrease in speed for one member and an increase in speed for another member and vice versa, the relative speed of said members corresponding to the relative position of said speed controls, a second control member, speed controls for said members connected to said second control member and having coinciding high and low speed positions for each member operatively connected with said first mentioned speed controls, said second speed control member upon adjustment effecting similar proportional adjustments in the speeds effected by positioning of the first mentioned speed controls, whereby the speed of said members may be continuously varied in the same proportions.

13. A machine having a frame and including two members supported thereon for relative movement in transverse directions, in combination with power means for moving the members at variable and correlated speeds whereby a desired resultant movement may be obtained, said power means including speed controls for each member, a rotatable control member operatively connected to said speed controls for simultaneously adjusting said speed controls, each speed control having high, low, and intermediate speed positions, the low speed position of one speed control coinciding with the high speed position of another speed control whereby simultaneous adjustment of said speed controls upon rotation of said control member effects a decrease in speed for one member and an increase in speed for another member and vice versa, the relative speed of said members corresponding to the relative position of said speed controls, and another control member, speed controls for said members connected to said other control member and having coinciding high and low speed positions for each member operatively connected with said first mentioned speed controls, said other speed control member upon adjustment effecting similar proportional adjustments in the speeds effected by positioning of the first mentioned speed controls, whereby the speed of said members may be continuously varied in the same proportions.

14. A machine tool having a frame and including a tool supporting member and a work supporting member supported thereon for relative movement in transverse directions, in combination with power means for moving the members at variable and correlated speeds whereby a desired resultant movement may be obtained, said power means including speed controls for each member, a control member operatively connected to said speed controls for simultaneously adjusting said speed controls, each speed control having high, low, and intermediate speed positions of similar values for their respective members, the low speed position of one speed control coinciding with the high speed position of another speed control whereby simultaneous adjustment of said speed controls by movement of said control member effects a decrease in speed for one member and an increase in speed for another member and vice versa with the relative speeds of said members corresponding to the relative positions of said speed controls, and directional controls for each of said members associated with each speed control operable when the respective speed control is adjusted through a low speed position for reversing the direction of movement of the respective member.

15. A machine tool having a frame and including a tool supporting member and a work supporting member supported thereon for relative movement in transverse directions, in combination with power means for moving the members at variable and correlated speeds whereby a desired feed movement may be obtained between the tool and work, said power means including a control member having operatively connected thereto speed controls and direction of movement controls for each member, the speed controls having high, low, and intermediate speed positions of generally similar values for their respective members, the directional controls having means for reversing the direction of movement of each member as the speed control therefor is adjusted through the low speed position for that member.

16. A machine tool having a frame and including a tool supporting member and a work supporting member supported thereon for relative movement in transverse directions, in combination with power means for moving the members at variable and correlated speeds whereby a desired resultant movement may be obtained, said power means including speed controls for each member, a control member operatively connected to said speed controls for simultaneously adjusting said speed controls, each speed control having high, low, and intermediate speed positions of similar values for their respective members, the low speed position of one speed control coinciding with the high speed position of another speed control whereby simultaneous adjustment of said speed controls upon movement of said control member effects a decrease in speed for one member and an increase in speed for another member and vice versa, the relative speeds of said members corresponding to the relative positions of said speed controls, directional controls for each of said members operatively connected with each speed control and operable when the respective speed control is adjusted through a low speed position to reverse the direction of movement of the respective member, another control member having additional speed control for said members operatively connected thereto, said additional speed controls having coinciding high and low speed positions for each member and being operatively connected with said first mentioned speed controls, said other control member upon adjustment effecting similar proportional adjustments in the speeds effected by positioning of the first mentioned speed controls, whereby the speed of said members may be continuously varied in the same proportions.

17. A machine tool having a frame and including a tool supporting member and a work supporting member supported thereon for relative movement in transverse directions, in combination with power means for moving the members at variable and correlated speeds whereby a desired feed movement may be obtained between the tool and work, said power means including a control member operatively connected to speed controls and direction of movement controls for each member, the speed controls having high, low, and intermediate speed positions of similar values for their respective members, the directional controls reversing the direction of movement of a member as the speed

81 control is adjusted through the low speed position for that member, and another control member operatively connected to further speed controls for said members having coinciding high and low speed positions for each member operatively connected with said first mentioned controls, said other speed control member upon adjustment effecting similar proportional adjustments in the speeds effected by positioning of the first mentioned speed controls, whereby the speed of said members may be continuously varied in the same proportions.

18. In a horizontal boring, drilling, and milling machine having a frame, a spindle, a vertically movable spindle head rotatably supporting said spindle, a transversely horizontally movable work supporting table, individual variable speed electric motors for moving said head and table simultaneously at relative speeds to effect a desired angular movement between said spindle and said work, a rotatable angular direction control member connected to speed controls for said motors adjustment of which member varies the speed of rotation of said head and table moving motors from a maximum to a minimum in 90° of movement, the maximum speed position of the head moving motor on said control member being oriented relatively 90° from the maximum speed position of the table moving motor on said control member, and directional contactors controlled by said control member for reversing the direction of rotation of said head and table moving motors as the speed control member passes through the minimum speed position of the respective motor whereby the relative direction of movement of said head and table will be in a direction responsive to the general position of said direction control.

19. In a horizontal boring, drilling, and milling machine having a frame, a spindle, a vertically movable spindle head rotatable supporting said spindle, a transversely horizontally movable work supporting table, a longitudinally horizontally movable saddle movably supporting said table, variable speed power means for moving said head, table, and saddle in their respective paths of movement, and an angularly adjustable control member having operatively connected thereto speed controls for a plurality of said power means, adjustment of which control member controls the speed of said power means with the speed of movement of said members varying from a maximum to a minimum or from a minimum to a maximum in every relative 90° of movement of said control member, the maximum and minimum speed positions of said speed control member for each of said power means being oriented 90° respectively from the maximum and minimum speed positions of another of said power means.

20. In a horizontal boring, drilling, and milling machine having a frame, a spindle, a vertically movable spindle head rotatably supporting said spindle, a transversely horizontally movable work supporting table, individual variable speed electric motors for moving said head and table simultaneously at relative speeds to effect a desired angular movement between said spindle and said work, a rotatable angular direction control member having operatively connected thereto speed controls and adjustment of which control member varies the speed of rotation of said head and table moving motors from a maximum to a minimum in 90° of movement, the maximum speed position of the control member

82 for the head moving motor being oriented relatively 90° from the maximum speed position of said member for the table moving motor, said direction control member also having operatively connected thereto directional contactors which reverse the direction of rotation of said head and table moving motors as the control member passes through a minimum speed position for a respective motor whereby the relative direction of movement of said head and table will be in a direction responsive to the position of said direction control, and a second control member having further speed controls connected thereto, said further speed controls being operatively connected to the first mentioned speed controls whereby speed control member adjustment of second control member simultaneously varies the speeds of rotation of said motors in the same proportion throughout their range.

21. In a horizontal boring, drilling, and milling machine including a frame, a saddle longitudinally movable thereon, a table transversely movable on said saddle, a head vertically movable on said base, and a tool support rotatably mounted in said head, a control station for effecting movement of said head, saddle, or table in their respective planes of movement including head feed, saddle feed, and table feed speed controls therefor, and a rapid traverse control, operation of said rapid traverse control effecting engagement of a separate speed controlling means for the motor selected for operation by either said head, saddle, or table direction controls, said last mentioned speed controlling means being adjusted for relatively high speed operation of the head, saddle, or table feed drive motors.

22. In a machine tool, the combination of a plurality of movable members, means including electric motors for moving said members, said machine tool having a control station for controlling said motors, said station having directional controls and manually operable speed controls, operation of any one of the directional controls selecting for movement one of said members at a speed corersponding to the adjustment of said speed control, said motors having independendt high speed controls, said controls having a single rapid traverse selection switch, operation of which disengages the manually operable speed controls and engages said high speed controls whereby said electric motor moves the selected member at a high speed in the direction selected by said directional selection switches.

23. In a machine tool, the combination of a plurality of movable members, means including electric motors for moving said members, controls for individually selecting the direction of movement, speed controls for controlling the speed of movement, controls for effecting rapid traverse in the selected direction, speed controls for controlling the rapid traverse speed, operation of the rapid traverse control effecting a shift to the rapid traverse speed control for moving at high speeds the selected member in the direction indicated by the directional selection controls, release of the rapid traverse control effecting a shift to the first mentioned speed control for continuing movement of the selected member at the lower speed and in the direction previously selected by the directional selection controls.

24. In a control system for a plurality of variable speed reversible power means, a reversible rotatable control member, adjustable speed controls for each power means, each speed control having high, low, and intermediate speed positions of similar values for their respective means, means for operatively connecting said speed controls to said control member with the low speed position of one speed control coinciding with the high speed position of another speed control, whereby simultaneous adjustment of said controls effects a decrease in speed for one power means and an increase in speed for another power means and vice versa, and means operatively connected to said control member for reversing the direction of movement of each of said power means when said control member is moved through a minimum speed position for that means.

25. In a control system for a plurality of variable speed power means, a reversible control member, adjustable speed controls for each power means, each speed control having high, low, and intermediate speed positions of similar values for their respective power means, means for operatively connecting said speed controls to said control member with the low speed position of one control coinciding with the high speed position of another control whereby simultaneous adjustment of said controls effects a decrease in speed for one means and an increase in speed for another means and vice versa, and means operatively connected to said control member for reversing the direction of movement of each of said power means when said control member is moved through a minimum speed position for that means, and another control member having operatively connected thereto further speed controls for said power means having coinciding high and low speed positions for each member operatively connected with said first mentioned speed controls, said other speed control upon adjustment effecting similar proportional adjustments in the speeds effected by positioning of the first mentioned speed controls, whereby the relative speed of said means remains the same but the resultant vectorial speed may be varied.

HALLIS N. STEPHAN.

REFERENCES CITED

The following references are of record in the file of this patent:

UNITED STATES PATENTS

| Number | Name | Date |
|---|---|---|
| 1,796,332 | Johnson | Mar. 17, 1931 |
| 2,025,748 | Howe | Dec. 31, 1935 |
| 2,029,335 | Oberhoffken et al. | Feb. 4, 1936 |
| 2,350,174 | Lucas et al. | May 30, 1944 |
| 2,387,820 | Armitage et al. | Oct. 30, 1945 |
| 2,466,198 | Berthiez | Apr. 5, 1949 |